(12) United States Patent
Fukushima et al.

(10) Patent No.: US 11,558,606 B2
(45) Date of Patent: Jan. 17, 2023

(54) MOVING IMAGE ENCODING DEVICE, MOVING IMAGE ENCODING METHOD, MOVING IMAGE ENCODING PROGRAM, MOVING IMAGE DECODING DEVICE, MOVING IMAGE DECODING METHOD, AND MOVING IMAGE DECODING PROGRAM

(71) Applicant: Godo Kaisha IP Bridge 1, Tokyo (JP)

(72) Inventors: Shigeru Fukushima, Yokohama (JP); Toru Kumakura, Yokohama (JP); Hiroya Nakamura, Yokohama (JP); Hideki Takehara, Yokohama (JP); Satoru Sakazume, Yokohama (JP); Hiroyuki Kurashige, Yokohama (JP)

(73) Assignee: GODO KAISHA IP BRIDGE 1, Tokyo (JP)

( * ) Notice: Subject to any disclaimer, the term of this patent is extended or adjusted under 35 U.S.C. 154(b) by 0 days.

(21) Appl. No.: 17/269,942

(22) PCT Filed: Dec. 20, 2019

(86) PCT No.: PCT/JP2019/050004
§ 371 (c)(1),
(2) Date: Feb. 19, 2021

(87) PCT Pub. No.: WO2020/137848
PCT Pub. Date: Jul. 2, 2020

(65) Prior Publication Data
US 2021/0185311 A1    Jun. 17, 2021

(30) Foreign Application Priority Data

Dec. 28, 2018  (JP) .............................. JP2018-247405
Apr. 24, 2019  (JP) .............................. JP2019-082763

(51) Int. Cl.
*H04N 19/105*    (2014.01)
*H04N 19/137*    (2014.01)
(Continued)

(52) U.S. Cl.
CPC ......... *H04N 19/105* (2014.11); *H04N 19/137* (2014.11); *H04N 19/176* (2014.11); *H04N 19/51* (2014.11); *H04N 19/119* (2014.11)

(58) Field of Classification Search
None
See application file for complete search history.

(56) References Cited

U.S. PATENT DOCUMENTS 9,538,197 B2    1/2017  Xu et al.
2013/0077691 A1  3/2013  Zheng et al.
(Continued)

FOREIGN PATENT DOCUMENTS

CN    103609118 A    2/2014
CN    103999468 A    8/2014
(Continued)

OTHER PUBLICATIONS

International Search Report for related PCT App No. PCT/JP2019/050004 dated Feb. 18, 2020, 6 pgs.
(Continued)

*Primary Examiner* — Christopher G Findley
(74) *Attorney, Agent, or Firm* — Procopio, Cory, Hargreaves & Savitch LLP

(57) ABSTRACT

In order to provide low-load, efficient coding technology, a moving-picture decoding device includes a spatial motion information candidate derivation unit configured to derive a spatial motion information candidate from motion information of a block neighboring a decoding target block in a space domain and a history-based motion information candidate derivation unit configured to derive a history-based
(Continued)

motion information candidate from a memory where motion information of a decoded block is retained, wherein the history-based motion information candidate derivation unit preferentially derives old motion information without making a comparison of the motion information with the spatial motion information candidate.

6 Claims, 41 Drawing Sheets

(51) Int. Cl.
*H04N 19/176* (2014.01)
*H04N 19/51* (2014.01)
*H04N 19/119* (2014.01)

(56) References Cited

U.S. PATENT DOCUMENTS

| | | | |
|---|---|---|---|
| 2013/0114723 | A1 | 5/2013 | Bici et al. |
| 2014/0133570 | A1 | 5/2014 | Lee |
| 2014/0294320 | A1 | 10/2014 | Kokaram et al. |
| 2015/0163508 | A1 | 6/2015 | Bici et al. |
| 2015/0350664 | A1 | 12/2015 | Kyakuno |
| 2017/0127082 | A1 | 5/2017 | Chen et al. |
| 2020/0036997 | A1* | 1/2020 | Li ............ H04N 19/521 |
| 2020/0154114 | A1* | 5/2020 | Zhao ............ H04N 19/70 |
| 2020/0186821 | A1* | 6/2020 | Park ............ H04N 19/105 |
| 2020/0359049 | A1* | 11/2020 | Zhao ............ H04N 19/513 |

FOREIGN PATENT DOCUMENTS

| | | |
|---|---|---|
| CN | 104054350 A | 9/2014 |
| CN | 104412587 A | 3/2015 |
| CN | 105122803 A | 12/2015 |
| CN | 105939475 A | 9/2016 |
| CN | 106471806 A | 3/2017 |
| EP | 3895427 A1 | 5/2014 |
| EP | 3310049 A1 | 4/2018 |
| JP | H09172644 A | 6/1997 |
| RU | 2577207 C2 | 3/2016 |
| WO | 2020003275 A1 | 1/2020 |
| WO | 2020/123223 A1 | 6/2020 |

OTHER PUBLICATIONS

Lee, H., et al., Non-CE4: HMVP unification between the Merge and MVP list, Joint Video Experts Team (JVET) of ITU-T SG 16 WP 3 and ISO/IEC JTC 1/SC 29/WG 11, JVET-N0373_v2, 14th Meeting: Geneva, CH, Mar. 2019, pp. 1-6.

Xu, W., et al., CE4-related: Constraint of Pruning in History-based Motion Vector Prediction, Joint Video Experts Team (JVET) of ITU-T SG 16 WP 3 and ISO/IEC JTC 1/SC 29/WG 11, JVET-L0448-v2, 12th Meeting: Macao, CN, Oct. 2018, pp. 1-5.

Zhang, L., et al., CE4-related: History-based Motion Vector Prediction, Joint Video Experts Team (JVET) of ITU-T SG 16 WP 3 and ISO/IEC JTC 1/SC 29/WG 11, JVET-K0104-v5, 11th Meeting: Ljubljana, SI, Jul. 2018, pp. 1-7.

Zhang, L., et al., CE4: History-based Motion Vector Prediction (Test 4.4.7), Joint Video Experts Team (JVET) of ITU-T SG 16 WP 3 and ISO/IEC JTC 1/SC 29/WG 11, JVET-L0266-v2, 12th Meeting: Macao, CN, Oct. 2018, pp. 1-6.

Zhang, L., et al., History-based Motion Vector Prediction in Versatile Video Coding, 2019 Data Compression Conference (DCC), Mar. 2019, pp. 43-52.

Notice of Allowance dated Jan. 18, 2022 from counterpart RU Patent Application No. 2021118523, 19 pages.

Office Action dated Jan. 21, 2022 from counterpart IN Patent Application No. 202117006677, 6 pages.

Yang, Haitao, et al., BoG report on CE4 related contributions. Joint Video Experts Team (JVET) of ITU-T SG 16 WP 3 and ISO/IEC JTC 1/SC 29/WG 11 12th Meeting: Macao, CN, Oct. 3-12, 2018 Document: JVET-L0691-v1.

Solovyev, Timofey, et al., CE4-related: History-based MVP without using the last lookup table entry, Joint Video Experts Team (JVET) of ITU-T SG 16 WP 3 and ISO/IEC JTC 1/SC 29/WG 11 12th Meeting: Macao, CN, Oct. 3-12, 2018 Document: JVET-L0425-v6.

Li Zhang et al., CE4-related: History-based Motion Vector Prediction, Joint Video Experts Team (JVET) of ITU-T SG 16 WP 3 and ISO/IEC JTC 1/SC 29/WG 11, 11th Meeting: Ljubljana, SI, Jul. 10-18, 2018, Document: JVET-K0104-v2.

Chinese Office Action for CN application 202110118037.4, dated Sep. 10, 2021. (16 pages).

Chen J et al: "Algorithm description for Versatile Video Coding and Test Model 3 (VTM 3)", 12. JVET Meeting Oct. 3, 2018-Oct. 12, 2018; Macao; (The Joint Video Exploration Team of ISO/IEC JTC1/SC29/WG11 and ITU-T SG.16), No. JVET-L1002, Dec. 24, 2018 (Dec. 24, 2018), XP030251962, Retrieved from the Internet: URL:http://phenix.int-evry.fr/jvet/doc_end_user/documents/12_Macao/wg11/JVET-L1002-v2.zip JVET-L1002-v2.docx[retrieved on Dec. 24, 2018].

European Search Report in Application No. 19904995.8, dated Sep. 29, 2022, in 10 pages.

* cited by examiner

| 0 | | 1 | |
|---|---|---|---|
| | | | |
| | | | |
| | | | |

| 0 | 1 | | 2 |
|---|---|---|---|
| | | | |
| | | | |
| | | | |

FIG. 9

```
coding_quadtree() {
    qt_split
    if(qt_split) {
        coding_quadtree(0)
        coding_quadtree(1)
        coding_quadtree(2)
        coding_quadtree(3)
    }
    else {
        multi_type_tree()
    }
}
```

```
multi_type_tree() {
    mtt_split
    if(mtt_split) {
        mtt_split_vertical
        mtt_split_binary
        if(mtt_split_binary) {
            multi_type_tree(0, mtt_split_vertical)
            multi_type_tree(1, mtt_split_vertical)
        } else {
            multi_type_tree(0, mtt_split_vertical)
            multi_type_tree(1, mtt_split_vertical)
            multi_type_tree(2, mtt_split_vertical)
        }
    } else {
        // end split
    }
}
```

FIG. 12

```
coding_unit() {
    pred_mode_flag
    if( MODE_INTRA ) {
        intra_pred_mode
    }
    else { // MODE_INTER
        merge_flag
        if( merge_flag ) {
            merge_affine_flag
            if(merge_affine_flag==0) {
                umve_flag
            }
        } else {
            inter_affine_flag
            if( inter_affine_flag ) {
                cu_affine_type_flag
            }
        }
    }
}
```

FIG. 13

| merge_flag | merge_affine_flag | inter_affine_flag | Selected Mode |
|---|---|---|---|
| 1 | 0 | N/A | Merge Mode |
| 1 | 1 | N/A | Affine Merge Mode |
| 0 | N/A | 0 | Inter Pred Mode |
| 0 | N/A | 1 | Inter Affine Mode |

FIG. 31A
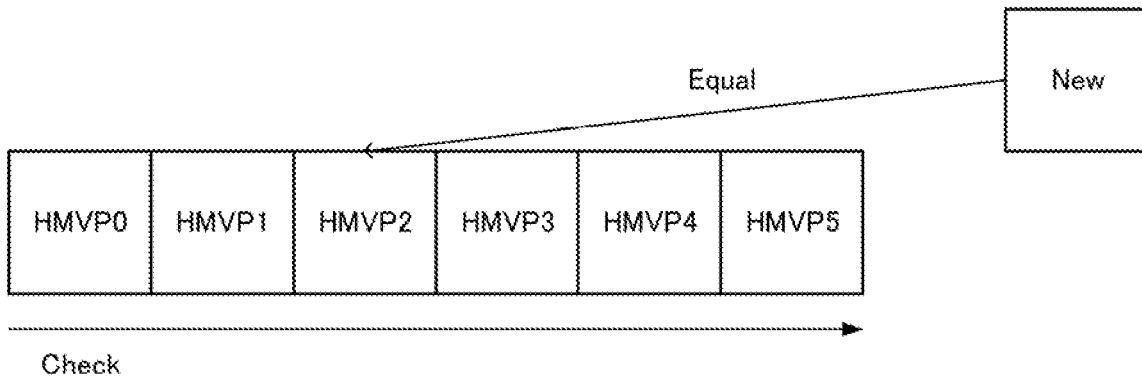
FIG. 31B
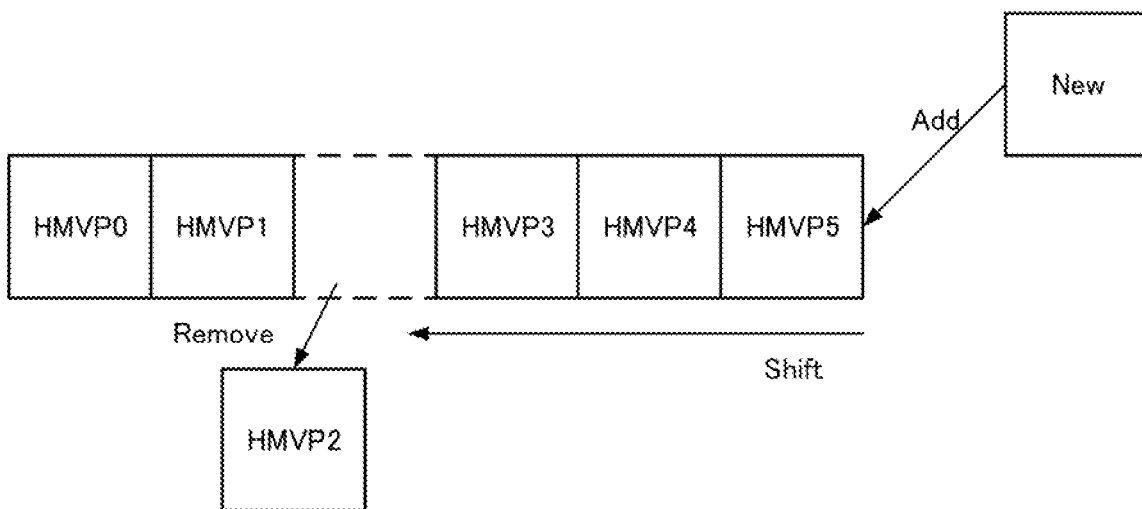
FIG. 31C

MOVING IMAGE ENCODING DEVICE, MOVING IMAGE ENCODING METHOD, MOVING IMAGE ENCODING PROGRAM, MOVING IMAGE DECODING DEVICE, MOVING IMAGE DECODING METHOD, AND MOVING IMAGE DECODING PROGRAM

CROSS-REFERENCE TO RELATED APPLICATIONS

This application is a U.S. National Stage entry of PCT Application No: PCT/JP2019/050004 filed on Dec. 20, 2019, which claims priority to Japanese Patent Application Nos. 2018-247405 filed Dec. 28, 2018 and 2019-082763 filed Apr. 24, 2019, the contents of which are incorporated herein by reference.

TECHNICAL FIELD

The present invention relates to picture coding and decoding technology for dividing a picture into blocks and performing prediction.

BACKGROUND ART

In picture coding and decoding, a target picture is divided into blocks, each of which is a set of a prescribed number of samples, and a process is performed in units of blocks. Coding efficiency is improved by dividing a picture into appropriate blocks and appropriately setting intra picture prediction (intra prediction) and inter picture prediction (inter prediction).

In moving-picture coding/decoding, coding efficiency is improved by inter prediction for performing prediction from a coded/decoded picture. Patent Literature 1 describes technology for applying an affine transform at the time of inter prediction. It is not uncommon for an object to cause deformation such as enlargement/reduction and rotation in moving pictures, and efficient coding is enabled by applying the technology of Patent Literature 1.

CITATION LIST

Patent Literature

[Patent Literature 1]
Japanese Unexamined Patent Application, First Publication No. H9-172644

SUMMARY OF INVENTION

Technical Problem

However, because the technology of Patent Literature 1 involves a picture transform, there is a problem that the processing load is great. In view of the above problem, the present invention provides efficient coding technology with a low load.

Solution to Problem

According to an aspect of the present invention for solving the above-described problems, there is provided a moving-picture coding device including: a spatial motion information candidate derivation unit configured to derive a spatial motion information candidate from motion information of a block neighboring a coding target block in a space domain; and a history-based motion information candidate derivation unit configured to derive a history-based motion information candidate from a memory where motion information of a coded block is retained, wherein the history-based motion information candidate derivation unit preferentially derives old motion information without making a comparison of the motion information with the spatial motion information candidate.

Also, according to another aspect of the present invention, there is provided a moving-picture coding method including: a first process of deriving a spatial motion information candidate from motion information of a block neighboring a coding target block in a space domain; and a second process of deriving a history-based motion information candidate from a memory where motion information of a coded block is retained, wherein the second process includes preferentially deriving old motion information without making a comparison of the motion information with the spatial motion information candidate.

Also, according to yet another aspect of the present invention, there is provided a moving-picture coding program for causing a computer to operate as: a spatial motion information candidate derivation unit configured to derive a spatial motion information candidate from motion information of a block neighboring a coding target block in a space domain; and a history-based motion information candidate derivation unit configured to derive a history-based motion information candidate from a memory where motion information of a coded block is retained, wherein the history-based motion information candidate derivation unit preferentially derives old motion information without making a comparison of the motion information with the spatial motion information candidate.

Also, according to still another aspect of the present invention, there is provided a picture decoding device including: a spatial motion information candidate derivation unit configured to derive a spatial motion information candidate from motion information of a block neighboring a decoding target block in a space domain; and a history-based motion information candidate derivation unit configured to derive a history-based motion information candidate from a memory where motion information of a decoded block is retained, wherein the history-based motion information candidate derivation unit preferentially derives old motion information without making a comparison of the motion information with the spatial motion information candidate.

Also, according to still another aspect of the present invention, there is provided a picture decoding method including: a first process of deriving a spatial motion information candidate from motion information of a block neighboring a decoding target block in a space domain; and a second process of deriving a history-based motion information candidate from a memory where motion information of a decoded block is retained, wherein the second process includes preferentially deriving old motion information without making a comparison of the motion information with the spatial motion information candidate.

Also, according to still another aspect of the present invention, there is provided a picture decoding program for causing a computer to operate as: a spatial motion information candidate derivation unit configured to derive a spatial motion information candidate from motion information of a block neighboring a decoding target block in a space domain; and a history-based motion information candidate derivation unit configured to derive a history-based motion information candidate from a memory where motion information of a decoded block is retained, wherein the history-based motion information candidate derivation unit preferentially derives old motion information without making a comparison of the motion information with the spatial motion information candidate.

Advantageous Effects of Invention

According to the present invention, it is possible to implement a highly efficient picture coding/decoding process with a low load.

BRIEF DESCRIPTION OF DRAWINGS

FIG. 6B is a diagram showing a divided shape of a block.

FIG. 6C is a diagram showing a divided shape of a block.

FIG. 6D is a diagram showing a divided shape of a block.

FIG. 6E is a diagram showing a divided shape of a block.

FIG. 9 is syntax for expressing a shape of a block split.

FIG. 12 is syntax for expressing a coding block prediction mode.

FIG. 13 is a diagram showing correspondence between a syntax element related to inter prediction and a mode.

FIG. 31A is an explanatory diagram showing an example of a history-based motion vector predictor candidate list update process.

FIG. 31B is an explanatory diagram showing an example of a history-based motion vector predictor candidate list update process.

FIG. 31C is an explanatory diagram showing an example of a history-based motion vector predictor candidate list update process.

DESCRIPTION OF EMBODIMENTS

Technology and technical terms used in the embodiment will be defined.

<Tree Block>

Figure 4:
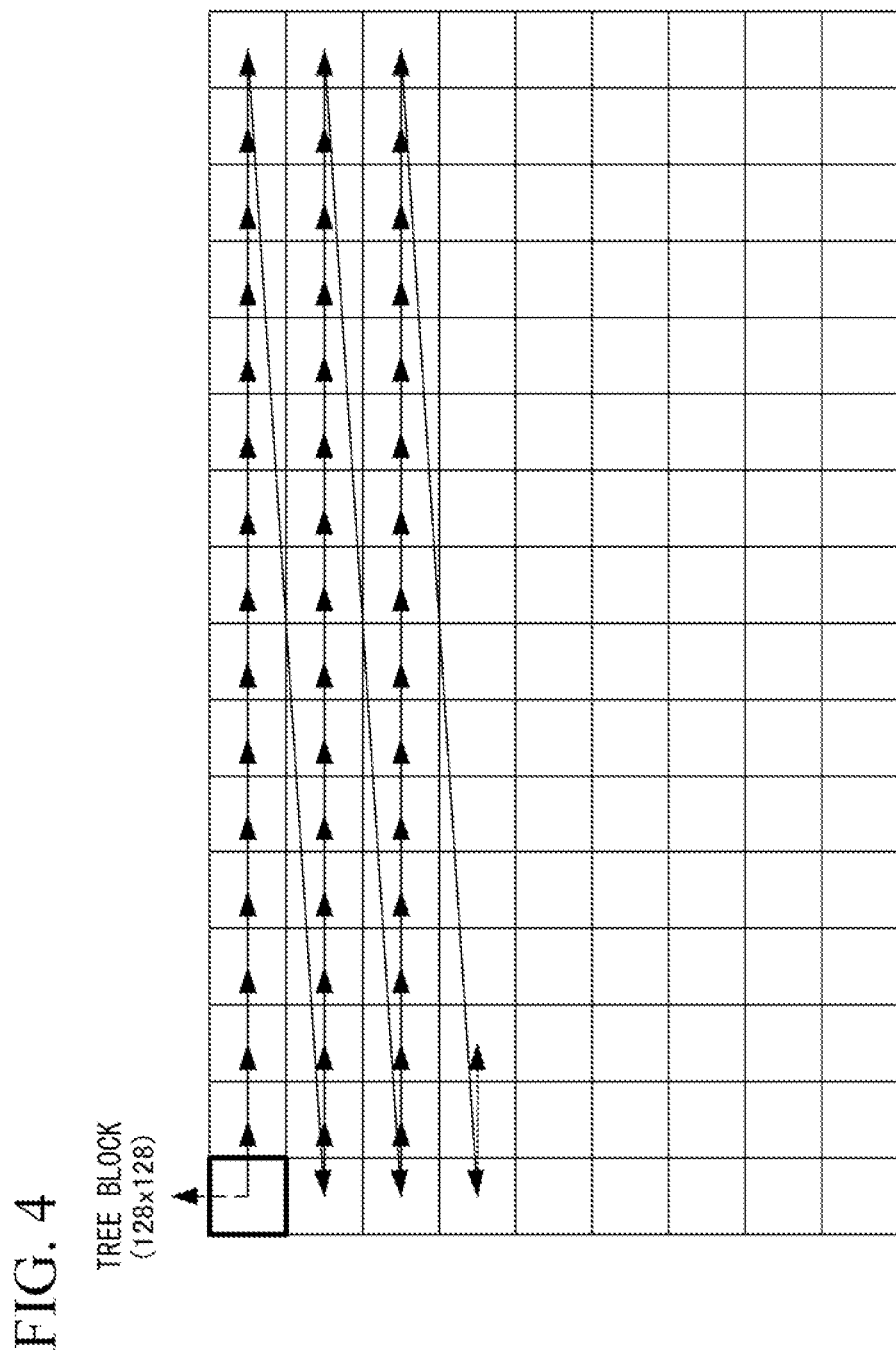
FIG. 4 is a diagram showing a state in which an input picture is divided into tree blocks.

In the embodiment, a coding/decoding target picture is equally divided into units of a predetermined size. This unit is defined as a tree block. Although the size of the tree block is 128×128 samples in FIG. 4, the size of the tree block is not limited thereto and any size may be set. The tree block of a target (corresponding to a coding target in a coding process or a decoding target in the decoding process) is switched in a raster scan order, i.e., from left to right and from top to bottom. The inside of each tree block can be further recursively divided. A block which is a coding/decoding target after the tree block is recursively divided is defined as a coding block. Also, a tree block and a coding block are collectively defined as blocks. Efficient coding is enabled by performing an appropriate block split. The tree block size may be a fixed value predetermined by the coding device and the decoding device or the tree block size determined by the coding device may be configured to be transmitted to the decoding device. Here, a maximum size of the tree block is 128×128 samples and a minimum size of the tree block is 16×16 samples. Also, a maximum size of the coding block is 64-64 samples and a minimum size of the coding block is 4×4 samples.

<Prediction Mode>

Switching is performed between intra prediction (MODE_INTRA) in which prediction is performed from a processed picture signal of the target picture and inter prediction (MODE_INTER) in which prediction is performed from a picture signal of a processed picture in units of target coding blocks.

The processed picture is used for a picture, a picture signal, a tree block, a block, a coding block, and the like obtained by decoding a signal completely coded in the coding process and is used for a picture, a picture signal, a tree block, a block, a coding block, and the like obtained by completing decoding in a decoding process.

The mode in which the intra prediction (MODE_INTRA) and the inter prediction (MODE_INTER) are identified is defined as the prediction mode (PredMode). The prediction mode (PredMode) has intra prediction (MODE_INTRA) or inter prediction (MODE_INTER) as a value.

<Inter Prediction>

In inter prediction in which prediction is performed from a picture signal of a processed picture, a plurality of processed pictures can be used as reference pictures. In order to manage a plurality of reference pictures, two types of reference lists of L0 (reference list 0) and L1 (reference list 1) are defined, and a reference picture is identified using each reference index. In a P slice, L0-prediction (Pred_L0) can be used. In a B slice, L0-prediction (Pred_L0), L1-prediction (Pred_L1), and bi-prediction (Pred_BI) can be used. The L0-prediction (Pred_L0) is inter prediction that refers to a reference picture managed in L0, and the L1-prediction (Pred_L1) is inter prediction that refers to a reference picture managed in L1. The bi-prediction (Pred_BI) is inter prediction in which both the L0-prediction and the L1-prediction are performed and one reference picture managed in each of L0 and L1 is referred to. Information for identifying the L0-prediction, the L1-prediction, and the bi-prediction is defined as an inter prediction mode. In the subsequent processing, constants and variables with the subscript LX in the output are assumed to be processed for each of L0 and L1.

<Motion Vector Predictor Mode>

The motion vector predictor mode is a mode for transmitting an index for identifying a motion vector predictor, a motion vector difference, an inter prediction mode, and a reference index and determining inter prediction information of a target block. The motion vector predictor is derived from a motion vector predictor candidate derived from a processed block neighboring the target block or a block located at the same position as or in the vicinity of (near) the target block among blocks belonging to the processed picture and an index for identifying a motion vector predictor.

<Merge Mode>

The merge mode is a mode in which inter prediction information of a target block is derived from inter prediction information of a processed block neighboring a target block or a block located at the same position as or in the vicinity of (near) the target block among blocks belonging to the processed picture without transmitting a motion vector difference and a reference index.

The processed block neighboring the target block and the inter prediction information of the processed block are defined as spatial merging candidates. The block located at the same position as or in the vicinity of (near) the target block among the blocks belonging to the processed picture and inter prediction information derived from the inter prediction information of the block are defined as temporal merging candidates. Each merging candidate is registered in a merging candidate list, and a merging candidate used for prediction of a target block is identified by a merge index.

<Neighboring Block>

Figure 11:
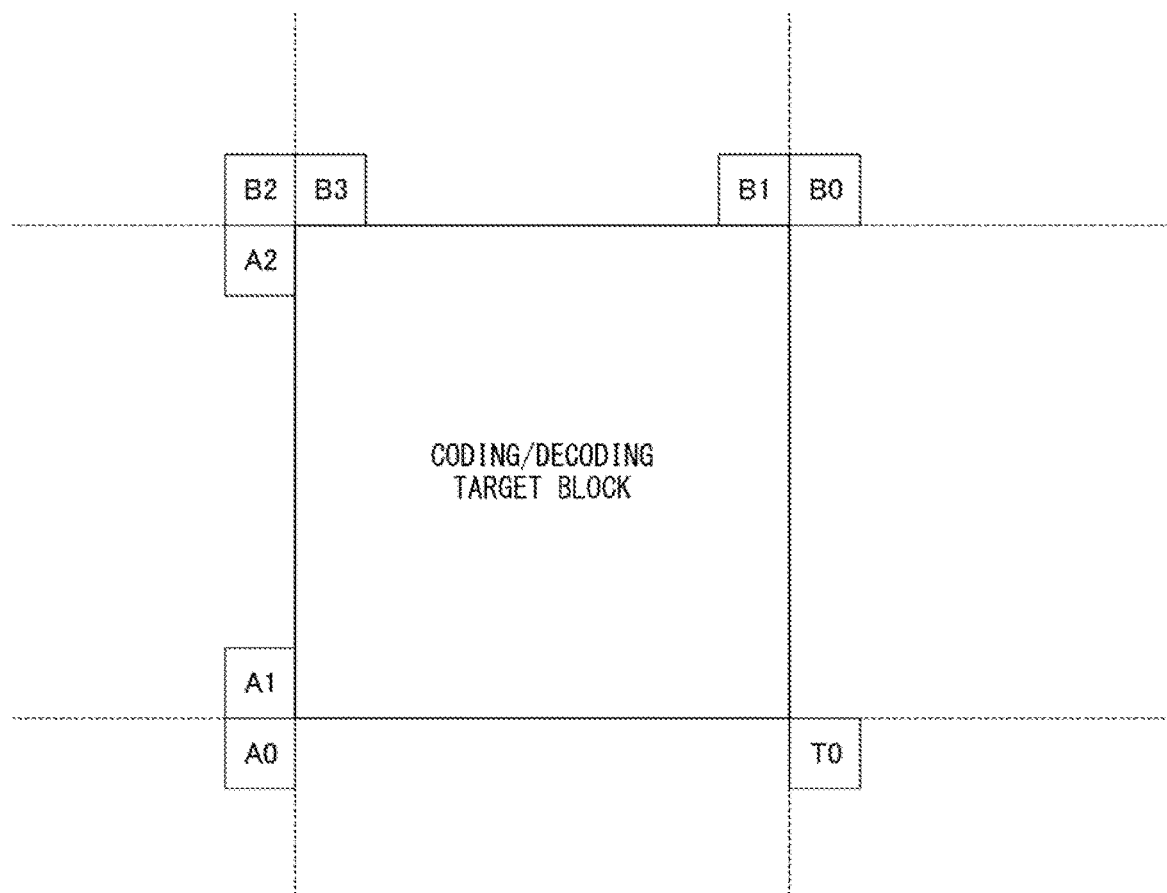
FIG. 11 is an explanatory diagram showing a reference block of inter prediction.

FIG. 11 is an explanatory diagram showing a reference block that is referred to in deriving inter prediction information in the motion vector predictor mode and the merge mode. A0, A1, A2, B0, B1, B2, and B3 are processed blocks neighboring the target block. TO is a block located at the same position as or in the vicinity of (near) the target block in the target picture among blocks belonging to the processed picture.

A1 and A2 are blocks located on the left side of the target coding block and neighboring the target coding block. B1 and B3 are blocks located on the upper side of the target coding block and neighboring the target coding block. A0, B0, and B2 are blocks located at the lower left, upper right, and upper left of the target coding block, respectively.

Details of how to handle neighboring blocks in the motion vector predictor mode and the merge mode will be described below.

<Affine Motion Compensation>

The affine motion compensation is a process of performing motion compensation by dividing a coding block into subblocks of a predetermined unit and individually determining a motion vector for each of the subblocks into which the coding block is divided. The motion vector of each subblock is derived on the basis of one or more control points derived from inter prediction information of a processed block neighboring the target block or a block located at the same position as or in the vicinity of (near) the target block among blocks belonging to the processed picture. Although the size of the subblock is 4×4 samples in the present embodiment, the size of the subblock is not limited thereto and a motion vector may be derived in units of samples.

Figure 14:
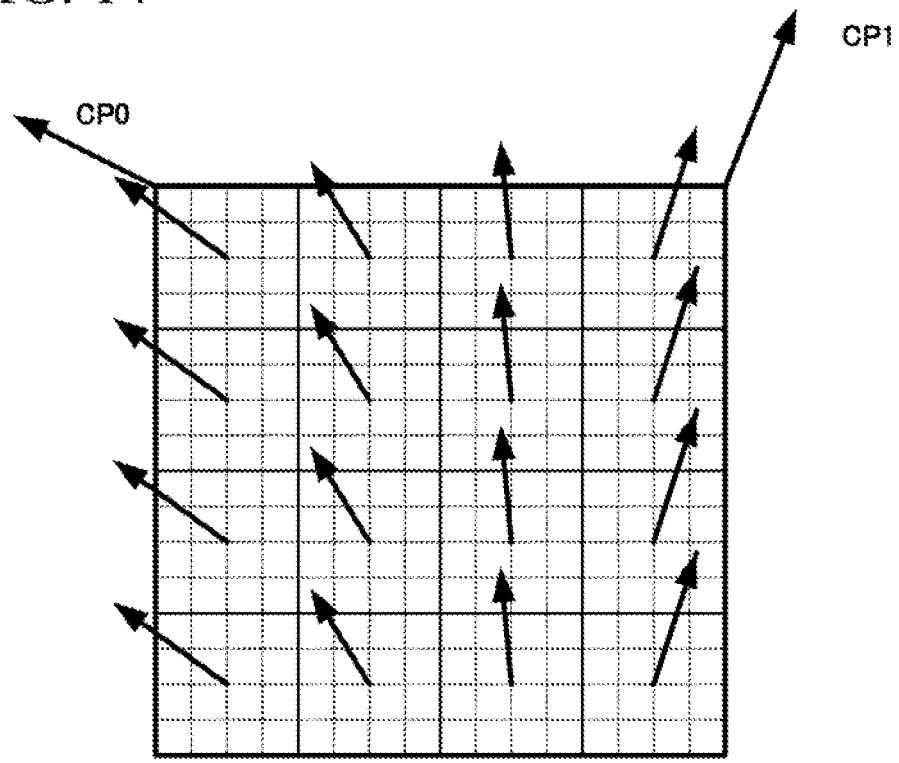
FIG. 14 is an explanatory diagram showing affine motion compensation of two control points.

An example of affine motion compensation in the case of two control points is shown in FIG. 14. In this case, the two control points have two parameters of a horizontal direction component and a vertical direction component. Thus, an affine transform in the case of two control points is referred to as a four-parameter affine transform. CP1 and CP2 of FIG. 14 are control points.

Figure 15:
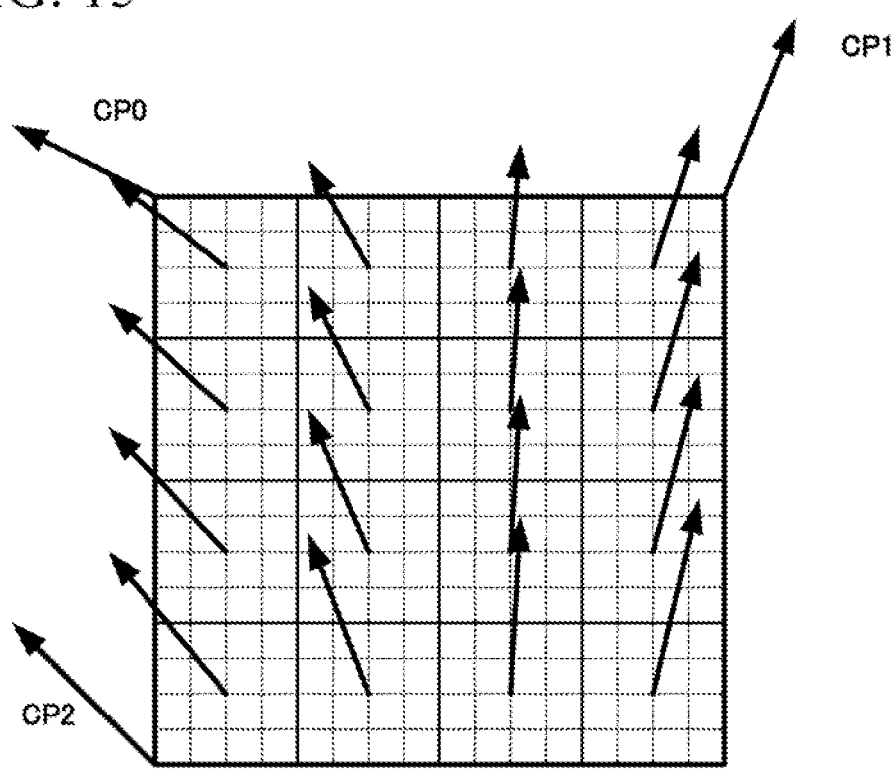
FIG. 15 is an explanatory diagram showing affine motion compensation of three control points.

An example of affine motion compensation in the case of three control points is shown in FIG. 15. In this case, the three control points have two parameters of a horizontal direction component and a vertical direction component. Thus, an affine transform in the case of three control points is referred to as a six-parameter affine transform. CP1, CP2, and CP3 of FIG. 15 are control points.

Affine motion compensation can be used in both the motion vector predictor mode and the merge mode. A mode in which the affine motion compensation is applied in the motion vector predictor mode is defined as a subblock-based motion vector predictor mode, and a mode in which the affine motion compensation is applied in the merge mode is defined as a subblock-based merge mode.

<Inter Prediction Syntax>

The syntax related to inter prediction will be described using FIGS. 12 and 13.

The flag merge_flag in FIG. 12 indicates whether the target coding block is set to the merge mode or the motion vector predictor mode. The flag merge_affine_flag indicates whether or not the subblock-based merge mode is applied to the target coding block of the merge mode. The flag inter_affie_flag indicates whether or not to apply the subblock-based motion vector predictor mode to the target coding block of the motion vector predictor mode. The flag cu_affine_type_flag is used to determine the number of control points in the subblock-based motion vector predictor mode.

FIG. 13 shows a value of each syntax element and a prediction method corresponding thereto. The normal merge mode corresponds to merge_flag=1 and merge_affine_flag=0 and is not a subblock-based merge mode. The subblock-based merge mode corresponds to merge_flag=1 and merge_affine_flag=1. The normal motion vector predictor mode corresponds to merge_flag=0 and inter_affine_flag=0. The normal motion vector predictor mode is a motion vector predictor merge mode that is not a subblock-based motion vector predictor mode. The subblock-based motion vector predictor mode corresponds to merge_flag=4 and inter_affine_flag=1. When merge_flag=0 and inter_affine_flag=1, cu_affine_type_flag is further transmitted to determine the number of control points.

<POC>

A picture order count (POC) is a variable associated with a picture to be coded and is set to a value that is incremented by 1 according to an output order of pictures. According to the POC value, it is possible to discriminate whether pictures are the same, to discriminate an anteroposterior relationship between pictures in the output order, or to derive the distance between pictures. For example, if the POCs of two pictures have the same value, it can be determined that they are the same picture. When the POCs of two pictures have different values, it can be determined that the picture with the smaller POC value is the picture to be output first. A difference between the POCs of the two pictures indicates an inter-picture distance in a time axis direction.

First Embodiment

The picture coding device 100 and the picture decoding device 200 according to the first embodiment of the present invention will be described.

Figure 1:
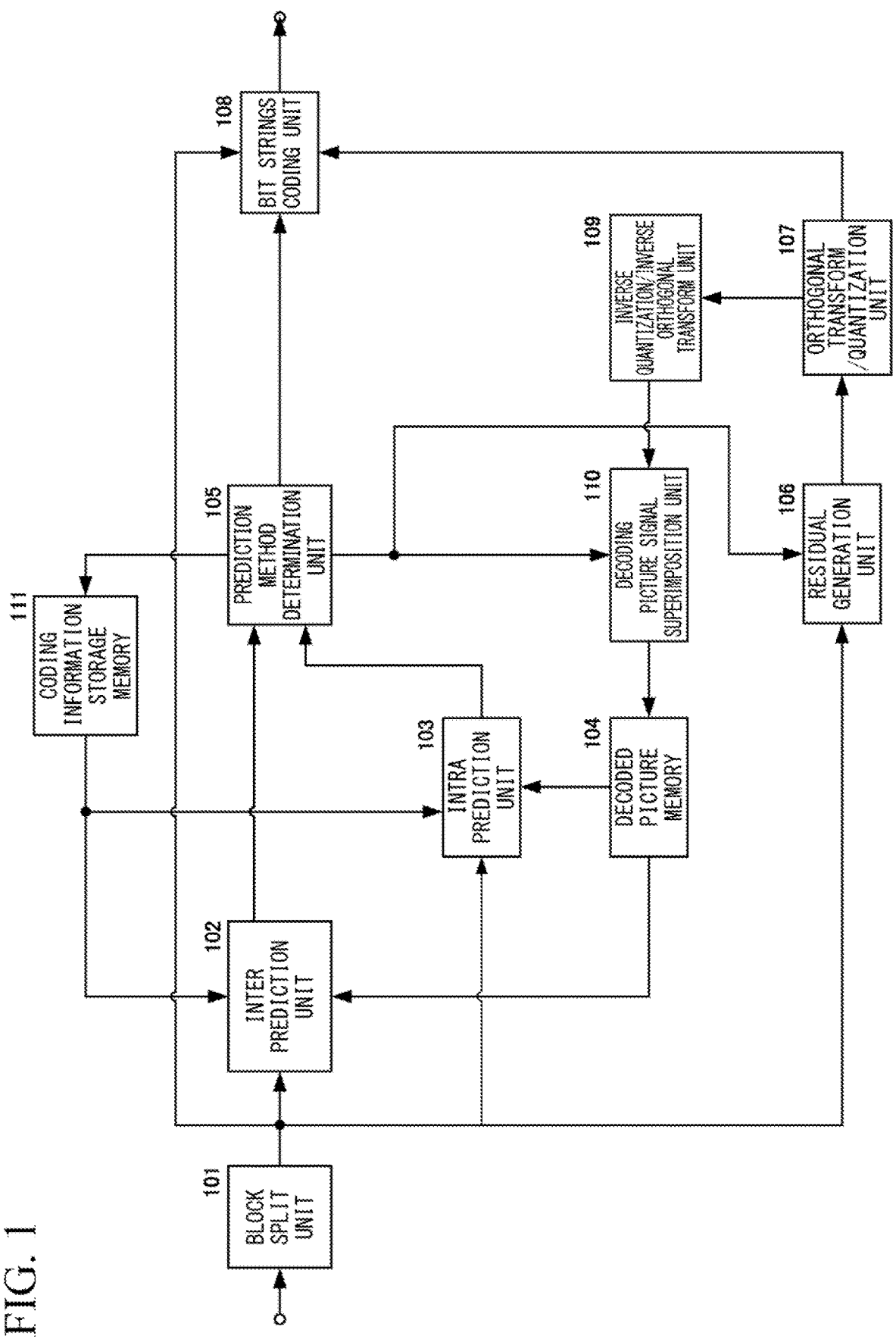
FIG. 1 is a block diagram of a picture coding device according to an embodiment of the present invention.

FIG. 1 is a block diagram of a picture coding device 100 according to the first embodiment. The picture coding device 100 according to the embodiment includes a block split unit 101, an inter prediction unit 102, an intra prediction unit 103, a decoded picture memory 104, a prediction method determination unit 105, a residual generation unit 106, an orthogonal transform/quantization unit 107, a bit strings coding unit 108, an inverse quantization/inverse orthogonal transform unit 109, a decoding picture signal superimposition unit 110, and a coding information storage memory 111.

The block split unit 101 recursively divides the input picture to generate a coding block. The block split unit 101 includes a quad split unit that divides a split target block in the horizontal direction and the vertical direction and a binary-ternary split unit that divides the split target block in either the horizontal direction or the vertical direction. The block split unit 101 sets the generated coding block as a target coding block and supplies a picture signal of the target coding block to the inter prediction unit 102, the intra prediction unit 103, and the residual generation unit 106. Also, the block split unit 101 supplies information indicating a determined recursive split structure to the bit strings coding unit 108. The detailed operation of the block split unit 101 will be described below.

The inter prediction unit 102 performs inter prediction of the target coding block. The inter prediction unit 102 derives a plurality of inter prediction information candidates from the inter prediction information stored in the coding information storage memory 111 and the decoded picture signal stored in the decoded picture memory 104, selects a suitable inter prediction mode from the plurality of derived candidates, and supplies the selected inter prediction mode and a predicted picture signal according to the selected inter prediction mode to the prediction method determination unit 105. A detailed configuration and operation of the inter prediction unit 102 will be described below.

The intra prediction unit 103 performs intra prediction of the target coding block. The intra prediction unit 103 refers to a decoded picture signal stored in the decoded picture memory 104 as a reference sample and generates a predicted picture signal according to intra prediction based on coding information such as an intra prediction mode stored in the coding information storage memory 111. In the intra prediction, the intra prediction unit 103 selects a suitable intra prediction mode from among a plurality of intra prediction modes and supplies a selected intra prediction mode and a predicted picture signal according to the selected intra prediction mode to the prediction method determination unit 105.

Figure 10A:
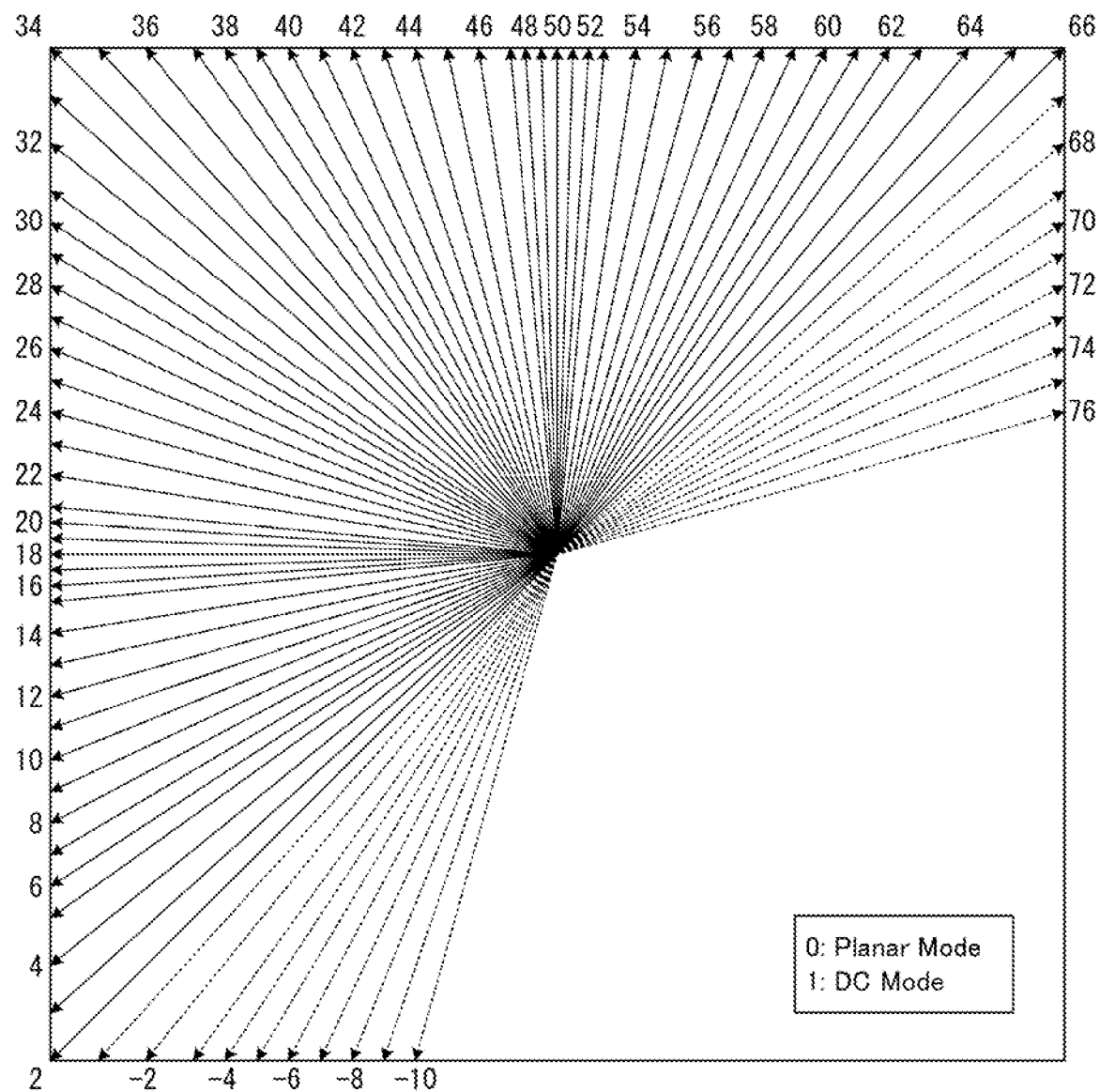
FIG. 10A is an explanatory diagram showing intra prediction.
Figure 10B:
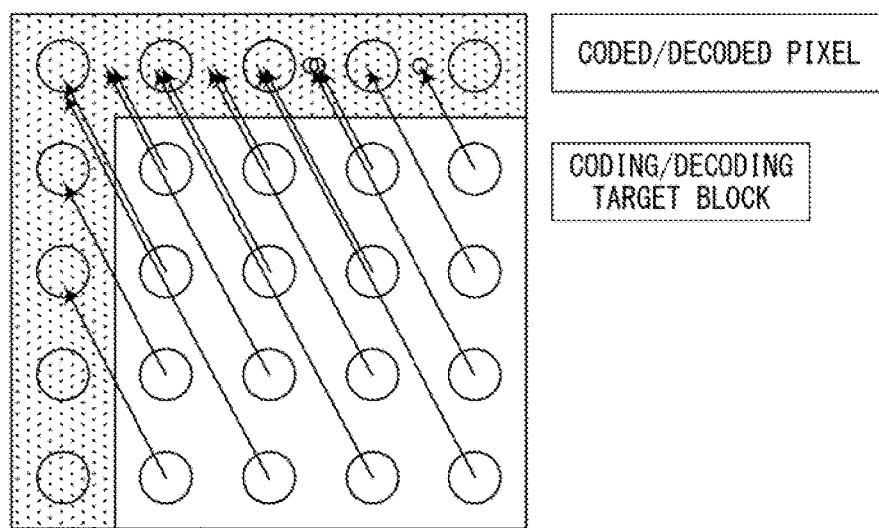
FIG. 10B is an explanatory diagram showing intra prediction.

Examples of intra prediction are shown in FIGS. 10A and 10B. FIG. 10A shows the correspondence between a prediction direction of intra prediction and an intra prediction mode number. For example, in intra prediction mode 50, an intra prediction picture is generated by copying reference samples in the vertical direction. Intra prediction mode 1 is a DC mode and is a mode in which all sample values of the target block are an average value of reference samples. Intra prediction mode 0 is a planar mode and is a mode for creating a two-dimensional intra prediction picture from reference samples in the vertical and horizontal directions. FIG. 10B is an example in which an intra prediction picture is generated in the case of intra prediction mode 40. The intra prediction unit 103 copies the value of the reference sample in the direction indicated by the intra prediction mode with respect to each sample of the target block. When the reference sample of the intra prediction mode is not at an integer position, the intra prediction unit 103 determines a reference sample value according to an interpolation from reference sample values of neighboring integer positions.

The decoded picture memory 104 stores a decoded picture generated by the decoding picture signal superimposition unit 110. The decoded picture memory 104 supplies the stored decoded picture to the inter prediction unit 102 and the intra prediction unit 103.

The prediction method determination unit 105 determines the optimum prediction mode by evaluating each of intra prediction and inter prediction using coding information, a residual code amount, an amount of distortion between a predicted picture signal and a target picture signal, and the like. In the case of intra prediction, the prediction method determination unit 105 supplies intra prediction information such as an intra prediction mode as the coding information to the bit strings coding unit 108. In the case of the inter prediction merge mode, the prediction method determination unit 105 supplies inter prediction information such as a merge index and information indicating whether or not the mode is a subblock-based merge mode (a subblock-based merge flag) as the coding information to the bit strings coding unit 108. In the case of the motion vector predictor mode of inter prediction, the prediction method determination unit 105 supplies inter prediction information such as the inter prediction mode, a motion vector predictor index, reference indices of L0 and L1, a motion vector difference, and information indicating whether or not the mode is a subblock-based motion vector predictor mode (a subblock-based motion vector predictor flag) as the coding information to the bit strings coding unit 108. Further, the prediction method determination unit 105 supplies the determined coding information to the coding information storage memory 111. The prediction method determination unit 105 supplies a predicted picture signal to the residual generation unit 106 and the decoding picture signal superimposition unit 110.

The residual generation unit 106 generates a residual by subtracting the predicted picture signal from the target picture signal and supplies the residual to the orthogonal transform/quantization unit 107.

The orthogonal transform/quantization unit 107 performs an orthogonal transform and quantization on the residual in accordance with the quantization parameter to generate an orthogonally transformed/quantized residual and supplies the generated residual to the bit strings coding unit 108 and the inverse quantization/inverse orthogonal transform unit 109.

The bit strings coding unit 108 codes coding information according to the prediction method determined by the prediction method determination unit 105 for each coding block in addition to information of units of sequences, pictures, slices, and coding blocks. Specifically, the bit strings coding unit 108 codes the prediction mode PredMode for each coding block. When the prediction mode is inter prediction (MODE_INTER), the bit strings coding unit 108 codes coding information (inter prediction information) such as a flag for discriminating whether or not the mode is a merge mode, a subblock-based merge flag, a merge index when the mode is the merge mode, an inter prediction mode when the mode is not the merge mode, a motion vector predictor index, information about a motion vector difference, and a subblock-based motion vector predictor flag in accordance with specified syntax (a bit strings syntax rule), and generates first bit strings. When the prediction mode is intra prediction (MODE_INTRA), coding information (intra prediction information) such as the intra prediction mode is coded in accordance with specified syntax (a bit strings syntax rule) and first bit strings are generated. Also, the bit strings coding unit 108 entropy-codes the orthogonally transformed and quantized residual in accordance with specified syntax to generate second bit strings. The bit strings coding unit 108 multiplexes the first bit strings and the second bit strings in accordance with specified syntax and outputs a bitstream.

The inverse quantization/inverse orthogonal transform unit 109 calculates the residual by performing inverse quantization and an inverse orthogonal transform on the orthogonally transformed/quantized residual supplied from the orthogonal transform/quantization unit 107 and supplies the calculated residual to the decoding picture signal superimposition unit 110.

The decoding picture signal superimposition unit 110 superimposes the predicted picture signal according to the determination of the prediction method determination unit 105 and the residual inversely quantized and inversely orthogonally transformed by the inverse quantization/inverse orthogonal transform unit 109 to generate a decoded picture and stores the decoded picture in the decoded picture memory 104. Also, the decoding picture signal superimposition unit 110 may store the decoded picture in the decoded picture memory 104 after performing a filtering process of reducing distortion such as block distortion due to coding on the decoded picture.

The coding information storage memory 111 stores coding information such as a prediction mode (inter prediction or intra prediction) determined by the prediction method determination unit 105. In the case of the inter prediction, the coding information stored in the coding information storage memory 111 includes inter prediction information such as a determined motion vector, reference indices of reference lists L0 and L1, and a history-based motion vector predictor candidate list. Also, in the case of the inter prediction merge mode, the coding information stored in the coding information storage memory 111 includes inter prediction information such as a merge index and information indicating whether or not the mode is the subblock-based merge mode (a subblock-based merge flag) in addition to the above-described information. Also, in the case of the motion vector predictor mode of the inter prediction, the coding information stored in the coding information storage memory 111 includes inter prediction information such as an inter prediction mode, a motion vector predictor index, a motion vector difference, and information indicating whether or not the mode is the subblock-based motion vector predictor mode (a subblock-based motion vector predictor flag) in addition to the above-described information. In the case of the intra prediction, the coding information stored in the coding information storage memory 111 includes intra prediction information such as the determined intra prediction mode.

Figure 2:
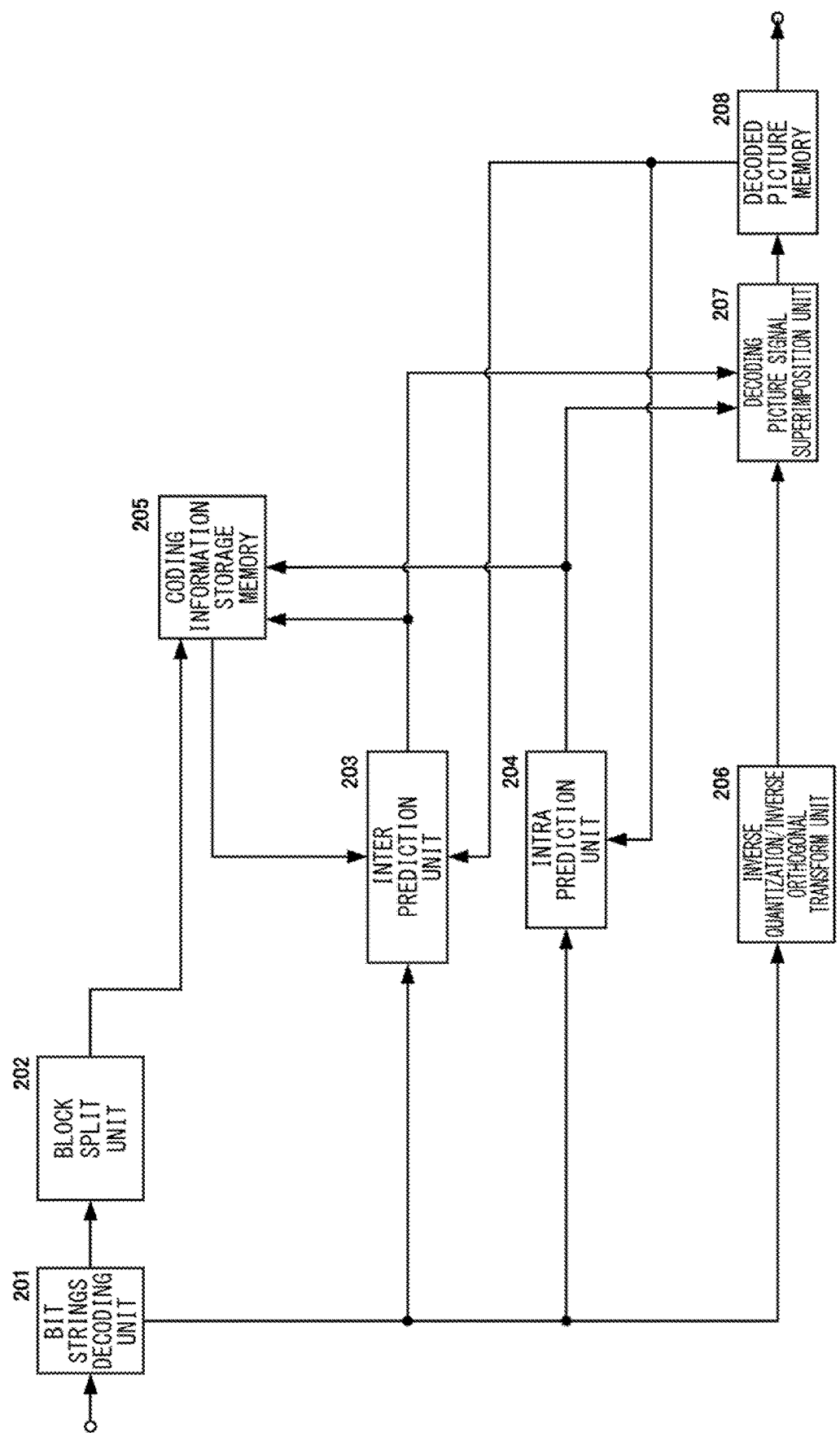
FIG. 2 is a block diagram of a picture decoding device according to an embodiment of the present invention.

FIG. 2 is a block diagram showing a configuration of the picture decoding device according to the embodiment of the present invention corresponding to the picture coding device of FIG. 1. The picture decoding device according to the embodiment includes a bit strings decoding unit 201, a block split unit 202, an inter prediction unit 203, an intra prediction unit 204, a coding information storage memory 205, an inverse quantization/inverse orthogonal transform unit 206, a decoding picture signal superimposition unit 207, and a decoded picture memory 208.

Because a decoding process of the picture decoding device of FIG. 2 corresponds to a decoding process provided in the picture coding device of FIG. 1, the components of the coding information storage memory 205, the inverse quantization/inverse orthogonal transform unit 206, the decoding picture signal superimposition unit 207, and the decoded picture memory 208 of FIG. 2 have functions corresponding to the components of the coding information storage memory 111, the inverse quantization/inverse orthogonal transform unit 109, the decoding picture signal superimposition unit 110, and the decoded picture memory 104 of the picture coding device of FIG. 1.

A bitstream supplied to the bit strings decoding unit 201 is separated in accordance with a specified syntax rule. The bit strings decoding unit 201 decodes a separated first bit string, and obtains information of units of sequences, pictures, slices, coding blocks, and coding information of units of coding blocks. Specifically, the bit strings decoding unit 201 decodes a prediction mode PredMode for discriminating inter prediction (MODE_INTER) or intra prediction (MODE_INTRA) in units of coding blocks. When the prediction mode is inter prediction (MODE_INTER), the bit strings decoding unit 201 decodes coding information (inter prediction information) about a flag for discriminating whether or not the mode is a merge mode, a merge index when the mode is the merge mode, a subblock-based merge flag, an inter prediction mode when the mode is a motion vector predictor mode, a motion vector predictor index, a motion vector difference, a subblock-based motion vector predictor flag, and the like in accordance with specified syntax, and supplies the coding information (the inter prediction information) to the coding information storage memory 205 via the inter prediction unit 203 and the block split unit 202. When the prediction mode is intra prediction (MODE_INTRA), coding information (intra prediction information) such as the intra prediction mode is decoded in accordance with specified syntax, and the coding information (the intra prediction information) is supplied to the coding information storage memory 205 via the inter prediction unit 203 or the intra prediction unit 204 and the block split unit 202. The bit strings decoding unit 201 decodes separated second bit strings to calculate an orthogonally transformed/quantized residual and supplies the orthogonally transformed/quantized residual to the inverse quantization/inverse orthogonal transform unit 206.

When the prediction mode PredMode of the target coding block is the motion vector predictor mode in the inter prediction (MODE_INTER), the inter prediction unit 203 derives a plurality of motion vector predictor candidates using coding information of the previously decoded picture signal stored in the coding information storage memory 205 and registers the plurality of derived motion vector predictor candidates in the motion vector predictor candidate list to be described below. The inter prediction unit 203 selects a motion vector predictor according to the motion vector predictor index decoded and supplied by the bit strings decoding unit 201 from among the plurality of motion vector predictor candidates registered in the motion vector predictor candidate list, calculates a motion vector from the motion vector difference decoded by the bit strings decoding unit 201 and the selected motion vector predictor, and stores the calculated motion vector in the coding information storage memory 205 together with other coding information. The coding information of the coding block supplied/stored here is a prediction mode PredMode, flags predFlagL0[xP][yP] and predFlagL1[xP][yP] indicating whether or not to use L0-prediction and L1-prediction, reference indices refIdxL0 [xP][yP] and refIdxL1[xP][yP] of L0 and L1, motion vectors mvL0[xP][yP] and mvL1[xP][yP] of L0 and L1, and the like. Here, xP and yP are indices indicating a position of an upper left sample of the coding block within the picture. When the prediction mode PredMode is inter prediction (MODE_INTER) and the inter prediction mode is L0-prediction (Pred_L0), the flag predFlagL0 indicating whether or not to use L0-prediction is 1, and the flag predFlagL1 indicating whether or not to use L1-prediction is 0. When the inter prediction mode is L1-prediction (Pred_L1), the flag predFlagL0 indicating whether or not to use L0-prediction is 0, and the flag predFlagL1 indicating whether or not to use L1-prediction is 1. When the inter prediction mode is bi-prediction (Pred_BI), both the flag predFlagL0 indicating whether or not to use L0-prediction and the flag predFlagL1 indicating whether or not to use L1-prediction are 1. Further, merging candidates are derived in the merge mode in which the prediction mode PredMode of the coding block of the target is inter prediction (MODE_INTER). A plurality of merging candidates are derived using the coding information of the previously decoded coding blocks stored in the coding information storage memory 205 and are registered in a merging candidate list to be described below, a merging candidate corresponding to a merge index to be decoded and supplied by the bit strings decoding unit 201 is selected from among the plurality of merging candidates registered in the merging candidate list, and inter prediction information such as the flags predFlagL0[xP][yP] and predFlagL1[xP][yP] indicating whether or not to use L0-prediction and L1-prediction of the selected merging candidate, the reference indices refIdxL0[xP][yP] and refIdxL1[xP][yP] of L0 and L1, and the motion vectors mvL0[xP][yP] and mvL1[xP] [yP] of L0 and L1 is stored in the coding information storage memory 205. Here, xP and yP are indices indicating the position of the upper left sample of the coding block in the picture. A detailed configuration and operation of the inter prediction unit 203 will be described below.

The intra prediction unit 204 performs intra prediction when the prediction mode PredMode of the coding block of the target is intra prediction (MODE_INTRA). The coding information decoded by the bit strings decoding unit 201 includes an intra prediction mode. The intra prediction unit 204 generates a predicted picture signal according to intra prediction from the decoded picture signal stored in the decoded picture memory 208 in accordance with the intra prediction mode included in the coding information decoded by the bit strings decoding unit 201 and supplies the generated predicted picture signal to the decoding picture signal superimposition unit 207. Because the intra prediction unit 204 corresponds to the intra prediction unit 103 of the picture coding device 100, a process similar to that of the intra prediction unit 103 is performed.

The inverse quantization/inverse orthogonal transform unit 206 performs an inverse orthogonal transform and inverse quantization on the orthogonally transformed/quantized residual decoded by the bit strings decoding unit 201 and obtains the inversely orthogonally transformed/inversely quantized residual.

The decoding picture signal superimposition unit 207 decodes a decoding picture signal by superimposing a predicted picture signal inter-predicted by the inter prediction unit 203 or a predicted picture signal intra-predicted by the intra prediction unit 204 and the residual inversely orthogonally transformed/inversely quantized by the inverse quantization/inverse orthogonal transform unit 206 and stores the decoded decoding picture signal in the decoded picture memory 208. At the time of storage in the decoded picture memory 208, the decoding picture signal superimposition unit 207 may store a decoded picture in the decoded picture memory 208 after a filtering process of reducing block distortion or the like due to coding is performed on the decoded picture.

Figure 3:
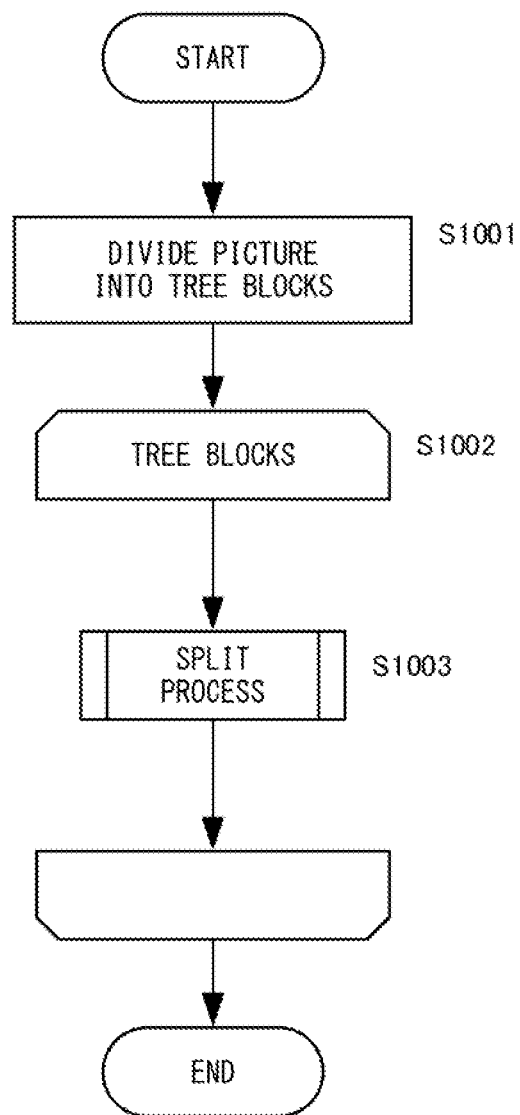
FIG. 3 is an explanatory flowchart showing an operation of dividing a tree block.

Next, an operation of the block split unit 101 in the picture coding device 100 will be described. FIG. 3 is a flowchart showing an operation of dividing a picture into tree blocks and further dividing each tree block. First, an input picture is divided into tree blocks having a predetermined size (step S1001). Each tree block is scanned in a predetermined order, i.e., raster scan order (step S1002), and the inside of the tree block of a target is divided (step S1003).

Figure 7:
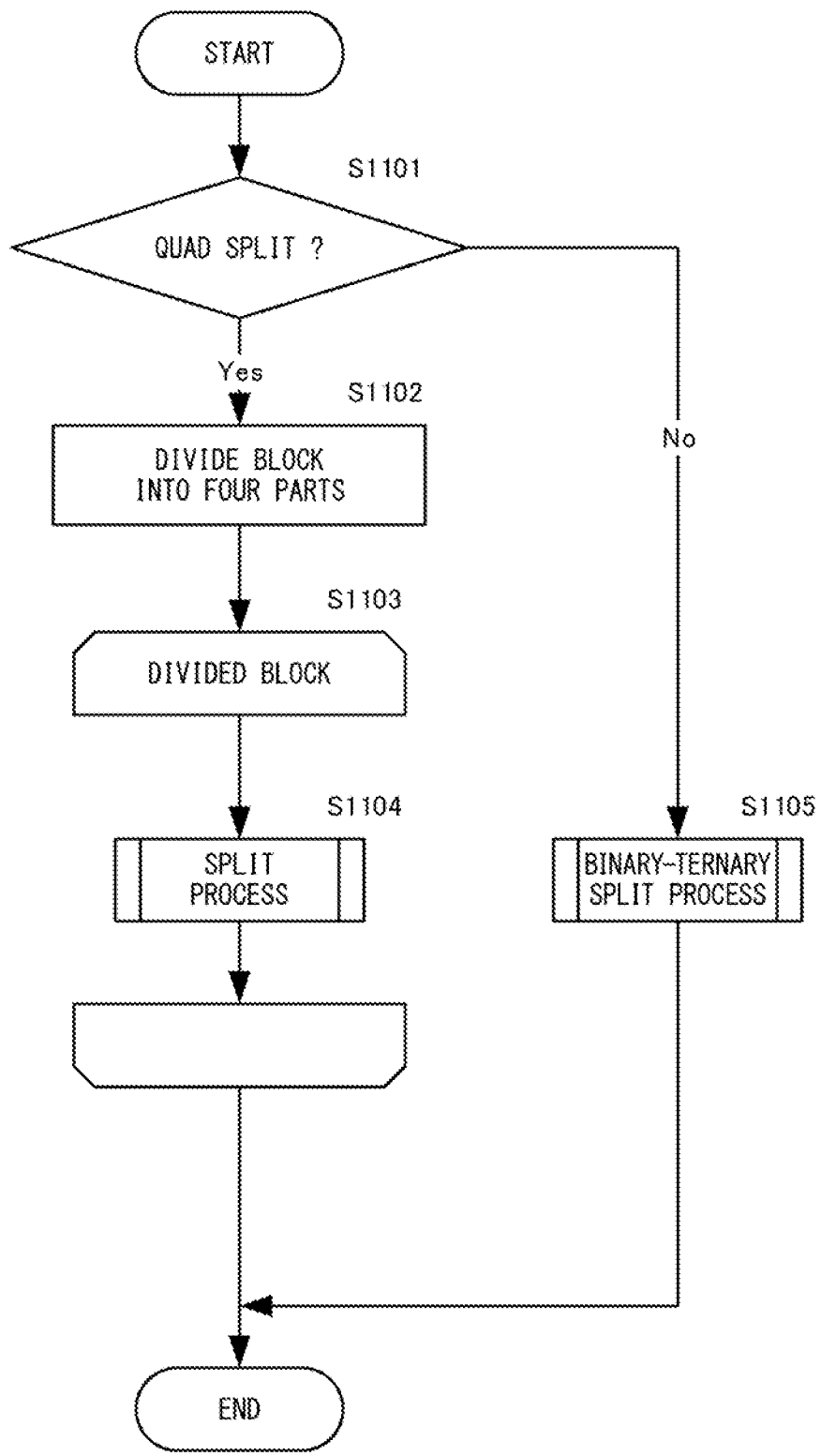
FIG. 7 is an explanatory flowchart showing an operation of dividing a block into four parts.

FIG. 7 is a flowchart showing a detailed operation of a split process of step S1003. First, it is determined whether or not a target block will be divided into four parts (step S1101).

Figure 5:
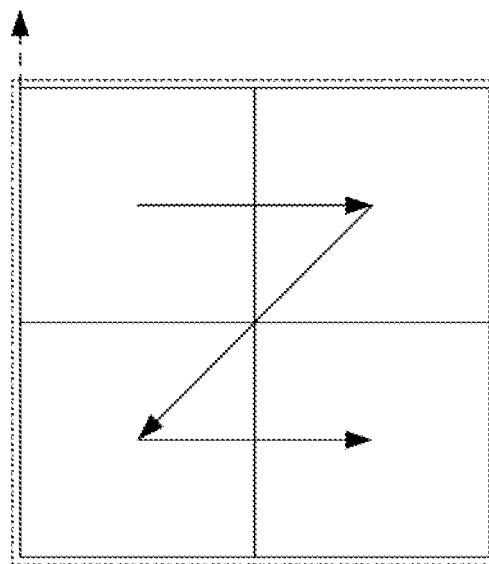
FIG. 5 is an explanatory diagram showing Z-scan.
Figure 6A:
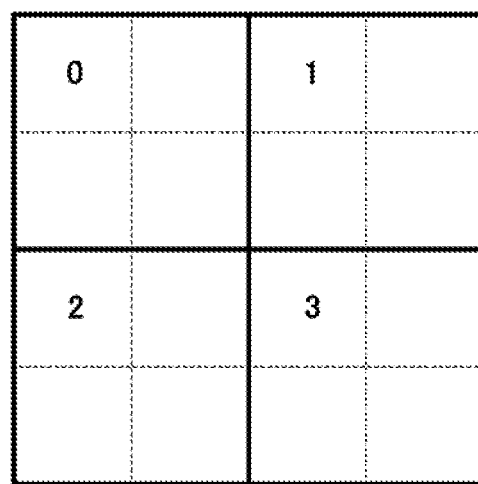
FIG. 6A is a diagram showing a divided shape of a block.

When it is determined that the target block will be divided into four parts, the target block is divided into four parts (step S1102). Each block obtained by dividing the target block is scanned in a Z-scan order, i.e., in the order of upper left, upper right, lower left, and lower right (step S1103). FIG. 5 shows an example of the Z-scan order, and reference numeral 601 of FIG. 6A shows an example in which the target block is divided into four parts. Numbers 0 to 3 of reference numeral 601 of FIG. 6A indicate the order of processing. Then, the split process of FIG. 7 is recursively executed for each block from the division in step S1101 (step S1104).

When it is determined that the target block will not be divided into four parts, a binary-ternary split is performed (step S105).

Figure 8:
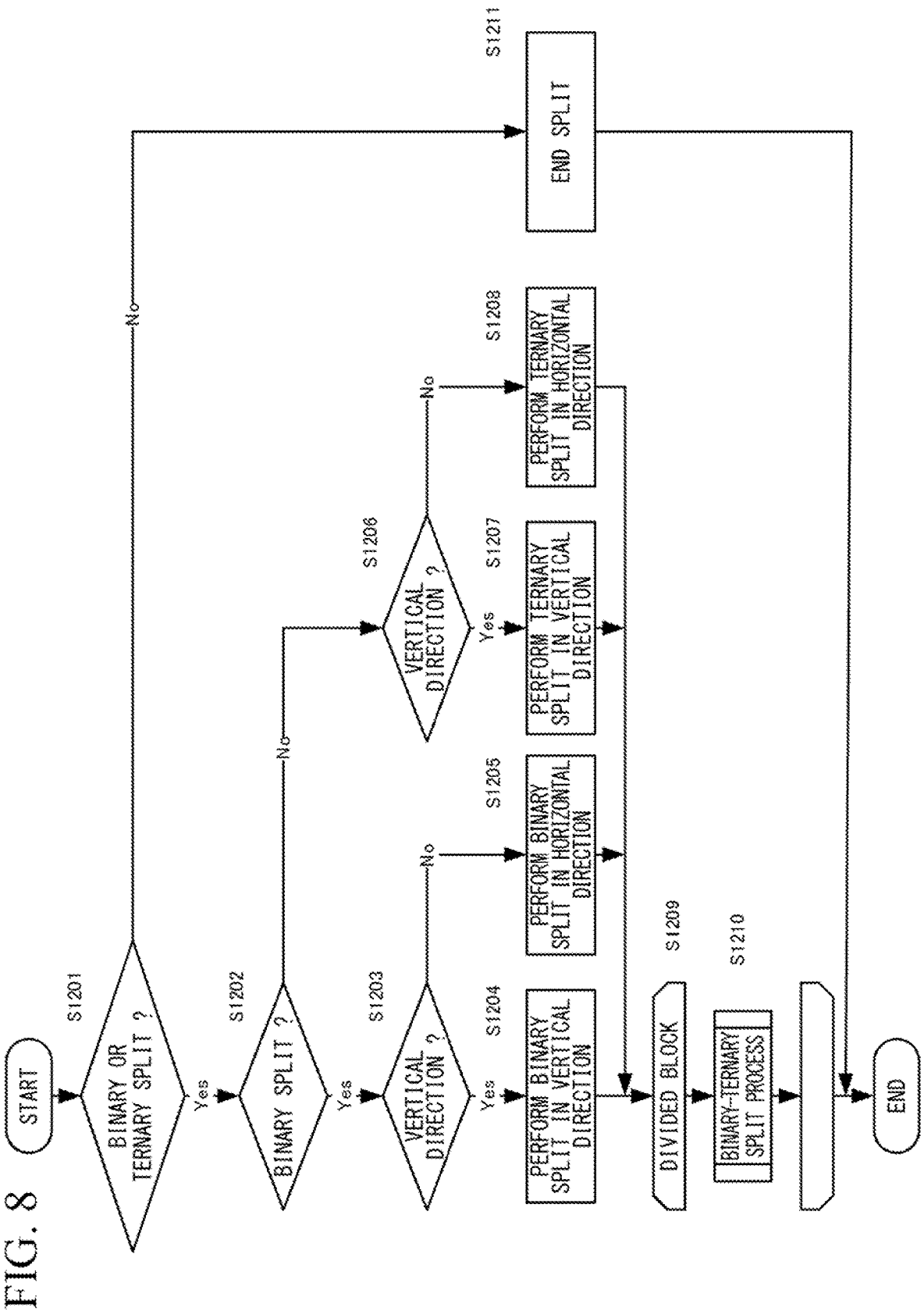
FIG. 8 is an explanatory flowchart showing an operation of dividing a block into two or three parts.

FIG. 8 is a flowchart showing the detailed operation of a binary-ternary split process of step S1105. First, it is determined whether or not a target block will be divided into two or three pans, i.e., whether or not either a binary or ternary split will be performed (step S1201).

When it is not determined that the target block will be divided into two or three parts, i.e., when it is determined that the target block will not be divided, the split ends (step S1211). That is, a recursive split process is not further performed on blocks divided according to the recursive split process.

When it is determined that the target block will be divided into two or three parts, it is further determined whether or not the target block will be divided into two parts (step S1202).

Figures 6B, 6C:
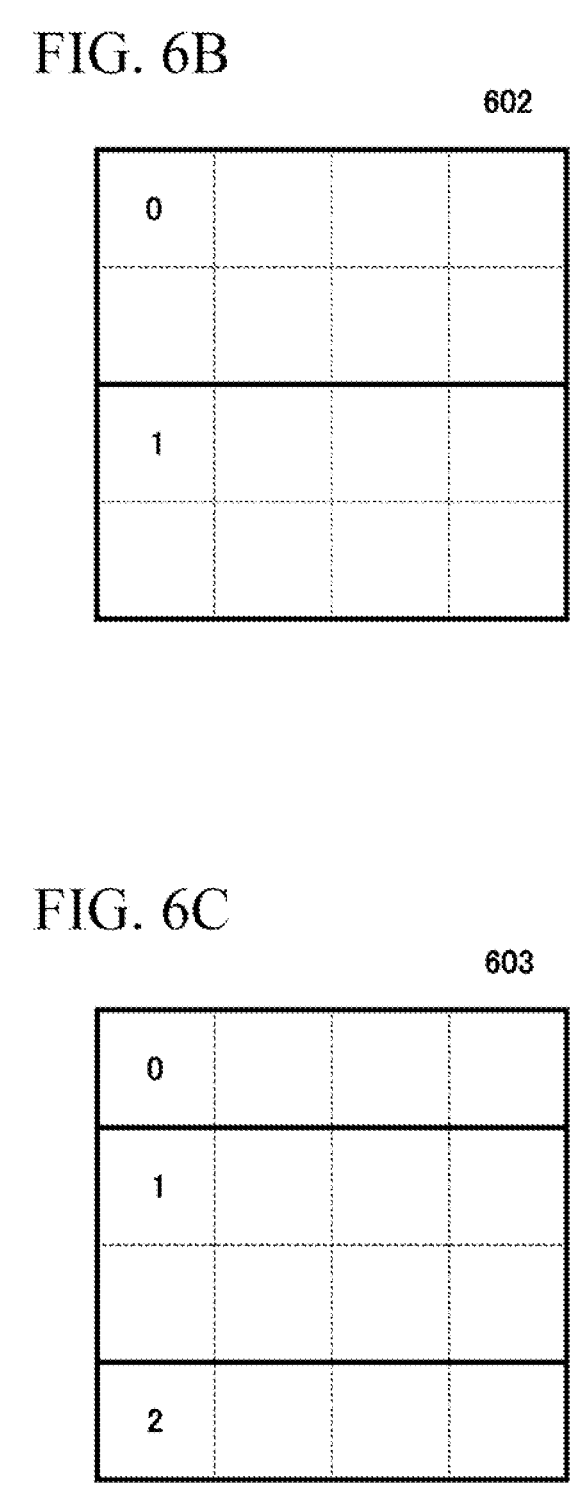
Figures 6D, 6E:
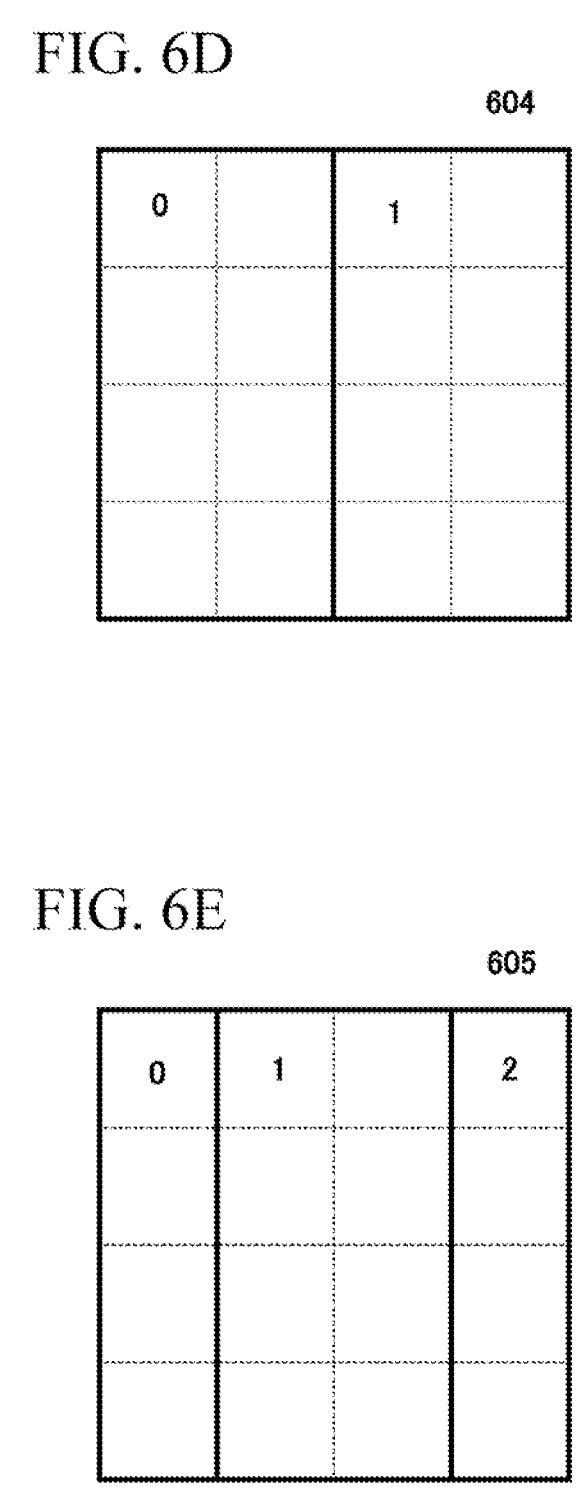

When it is determined that the target block will be divided into two parts, it is determined whether or not the target block will be divided into upper and lower parts (in a vertical direction)(step S1203). On the basis of a determination result, the target block is divided into two parts that are upper and lower parts (in the vertical direction) (step S1204), or the target block is divided into two parts that are left and right parts (in a horizontal direction)(step S1205). As a result of step S1204, the target block is divided into two parts that are upper and lower parts (in the vertical direction) as indicated by reference numeral 602 in FIG. 68. As a result of step S205, the target block is divided into two parts that are left and right parts (in the horizontal direction) as indicated by reference numeral 604 of FIG. 6D.

When it is not determined that the target block will be divided into two parts, i.e., when it is determined that the target block will be divided into three parts, in step S1202, it is determined whether or not the target block will be divided into upper, middle, and lower parts (in the vertical direction)(step S1206). On the basis of a determination result, the target block is divided into three parts that are upper, middle, and lower parts (in the vertical direction) (step S1207), or the target block is divided into three parts that are left, middle, and right parts (in the horizontal direction)(step S208). As a result of step S1207, the target block is divided into three parts that are upper, middle, and lower parts (in the vertical direction) as indicated by reference numeral 603 of FIG. 6C. As a result of step S1208, the target block is divided into three parts that are left, middle, and right parts (in the horizontal direction) as indicated by reference numeral 605 of FIG. 6E.

After any one of steps S1204, S1205, S1207, and S1208 is executed, each of the blocks into which the target block is divided is scanned in order from left to right and from top to bottom (step S1209). Numbers 0 to 2 of reference numerals 602 to 605 of FIGS. 6B to 6E indicate the order of processing. For each of the blocks into which the target block is divided, a binary-ternary split process of FIG. 8 is recursively executed (step S1210).

The recursive block split described here may limit the necessity of a split according to the number of splits or a size of the target block or the like. Information that limits the necessity of a split may be implemented by a configuration in which information is not delivered by making an agreement between the coding device and the decoding device in advance or implemented by a configuration in which the coding device determines information that limits the necessity of a split, records the information in a bit string, and delivers the information to the decoding device.

When a certain block is divided, a block before the split is referred to as a parent block, and each block after the split is referred to as a child block.

Next, an operation of the block split unit 202 in the picture decoding device 200 will be described. The block split unit 202 divides the tree block according to a processing procedure similar to that of the block split unit 101 of the picture coding device 100. However, there is a difference in that the block split unit 101 of the picture coding device 100 applies an optimization technique such as estimation of an optimum shape based on picture recognition or distortion rate optimization to determine an optimum block split shape, whereas the block split unit 202 of the picture decoding device 200 determines a block split shape by decoding the block split information recorded in the bit string.

Syntax (a bit strings syntax rule) related to a block split according to the first embodiment is shown in FIG. 9. coding_quadtree( ) represents syntax related to a quad split process on the block. multi_type_tree( ) represents syntax related to a binary or ternary split process on the block. qt_split is a flag indicating whether or not the block is divided into four parts. qt_split=1 when the block is divided into four parts, and qt_split=(when the block is not divided into four pans. When the block is divided into four parts (qt_split=1), a quad split process is recursively performed on blocks, each of which has been divided into four parts (coding_quadtree(0), coding_quadtree(1), coding_quadtree (2), coding_quadtree(3), and arguments 0 to 3 correspond to numbers indicated by reference numeral 601 of FIG. 6A). When the block is not divided into four parts (qt_split=0), the subsequent split is determined according to multi_type_ tree( ). mtt_split is a flag indicating whether or not a split is further performed. When a split is further performed (mtt_ split=1), mtt_split_vertical which is a flag indicating whether the block is divided vertically or horizontally and mtt_split_binary which is a flag for determining whether a binary or ternary split is performed are transmitted. mtt_ split_vertical=1 indicates a split in the vertical direction, and mtt_split_vertical=0 indicates a split in the horizontal direction. mtt_split_binary=1 indicates a binary split, and mtt_ split_binary=0 indicates a ternary split. In the binary split (mtt_split_binary=1), a split process is recursively performed on blocks, each of which is divided into two parts (multi_type_tree(0), multi_type_tree(1), and arguments 0 to 1 correspond to numbers indicated by reference numeral 602 or 604 in FIGS. 6B to 6D). In the case of the ternary split (mtt_split_binary=0), a split process is recursively performed on blocks, each of which is divided into three parts (multi_type_tree(0), multi_type_tree(1), multi_type_tree(2), and arguments 0 to 2 correspond to numbers indicated by reference numeral 603 of FIG. 6B or numbers indicated by reference numeral 605 of FIG. 6E). Until mtt_split=0 is reached, a hierarchical block split is performed by recursively calling multi_type_tree.

<Inter Prediction>

An inter prediction method according to the embodiment is performed in the inter prediction unit 102 of the picture coding device of FIG. 1 and the inter prediction unit 203 of the picture decoding device of FIG. 2.

The inter prediction method according to the embodiment will be described with reference to the drawings. The inter prediction method is performed in both coding and decoding processes in units of coding blocks.

<Description of Inter Prediction Unit 102 of Coding Side>

Figure 16:
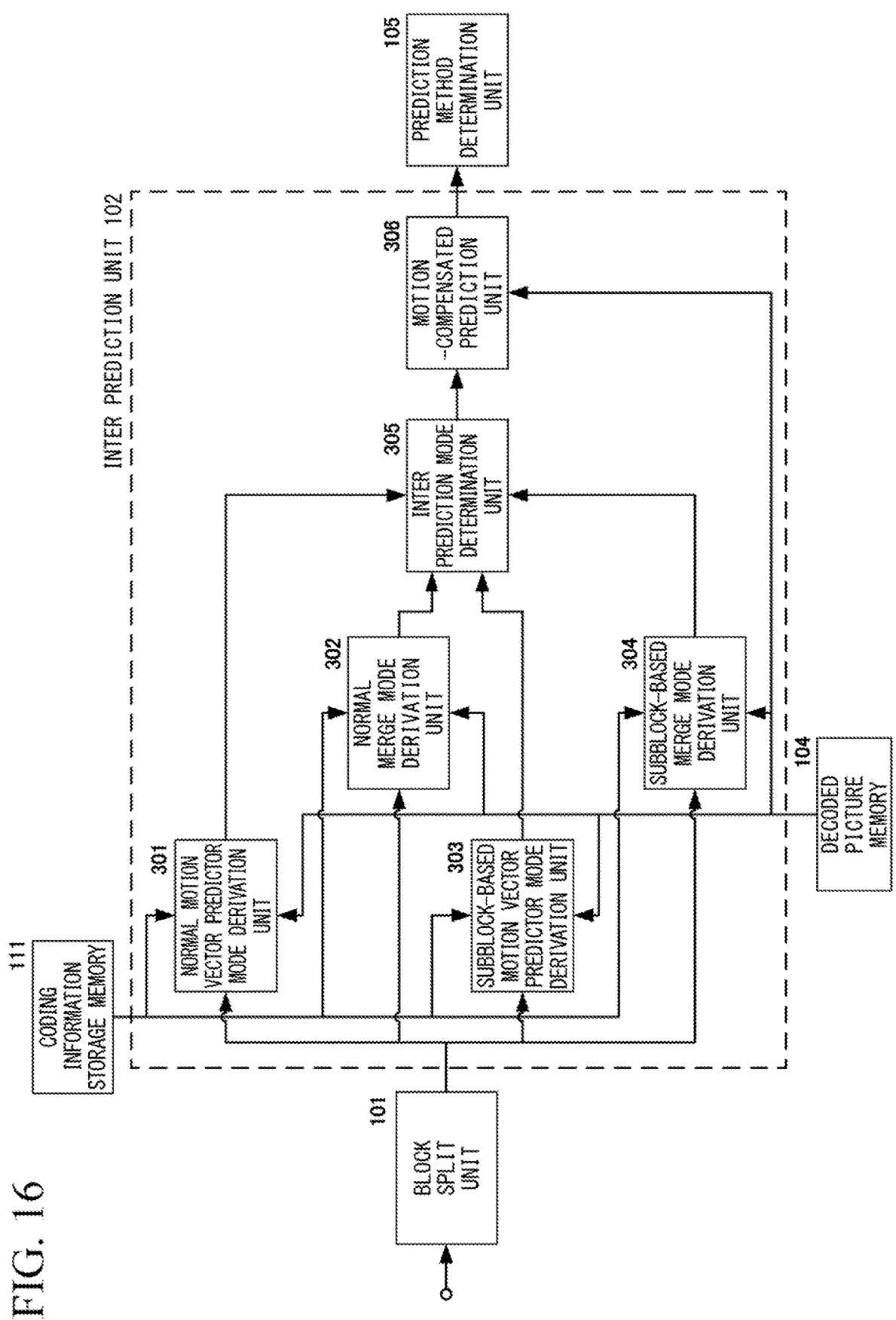
FIG. 16 is a block diagram of a detailed configuration of an inter prediction unit 102 of FIG. 1.

FIG. 16 is a diagram showing a detailed configuration of the inter prediction unit 102 of the picture coding device in FIG. 1. The normal motion vector predictor mode derivation unit 301 derives a plurality of normal motion vector predictor candidates to select a motion vector predictor, and calculates a motion vector difference between the selected motion vector predictor and a detected motion vector. A detected inter prediction mode, reference index, and motion vector and the calculated motion vector difference become inter prediction information of the normal motion vector predictor mode. This inter prediction information is supplied to the inter prediction mode determination unit 305. A detailed configuration and a process of the normal motion vector predictor mode derivation unit 301 will be described below.

The normal merge mode derivation unit 302 derives a plurality of normal merging candidates to select a normal merging candidate and obtains inter prediction information of the normal merge mode. This inter prediction information is supplied to the inter prediction mode determination unit 305. A detailed configuration and a process of the normal merge mode derivation unit 302 will be described below.

A subblock-based motion vector predictor mode derivation unit 303 derives a plurality of subblock-based motion vector predictor candidates to select a subblock-based motion vector predictor and calculates a motion vector difference between the selected subblock-based motion vector predictor and the detected motion vector. A detected inter prediction mode, reference index, and motion vector and the calculated motion vector difference become the inter prediction information of the subblock-based motion vector predictor mode. This inter prediction information is supplied to the inter prediction mode determination unit 305.

The subblock-based merge mode derivation unit 304 derives a plurality of subblock-based merging candidates to select a subblock-based merging candidate, and obtains inter prediction information of the subblock-based merge mode. This inter prediction information is supplied to the inter prediction mode determination unit 305.

The inter prediction mode determination unit 305 determines inter prediction information on the basis of the inter prediction information supplied from the normal motion vector predictor mode derivation unit 301, the normal merge mode derivation unit 302, the subblock-based motion vector predictor mode derivation unit 303, and the subblock-based merge mode derivation unit 304. Inter prediction information according to the determination result is supplied from the inter prediction mode determination unit 305 to the motion-compensated prediction unit 306.

The motion-compensated prediction unit 306 performs inter prediction on the reference picture signal stored in the decoded picture memory 104 on the basis of the determined inter prediction information. A detailed configuration and a process of the motion-compensated prediction unit 306 will be described below.

<Description of Inter Prediction Unit 203 of Decoding Side>

Figure 22:
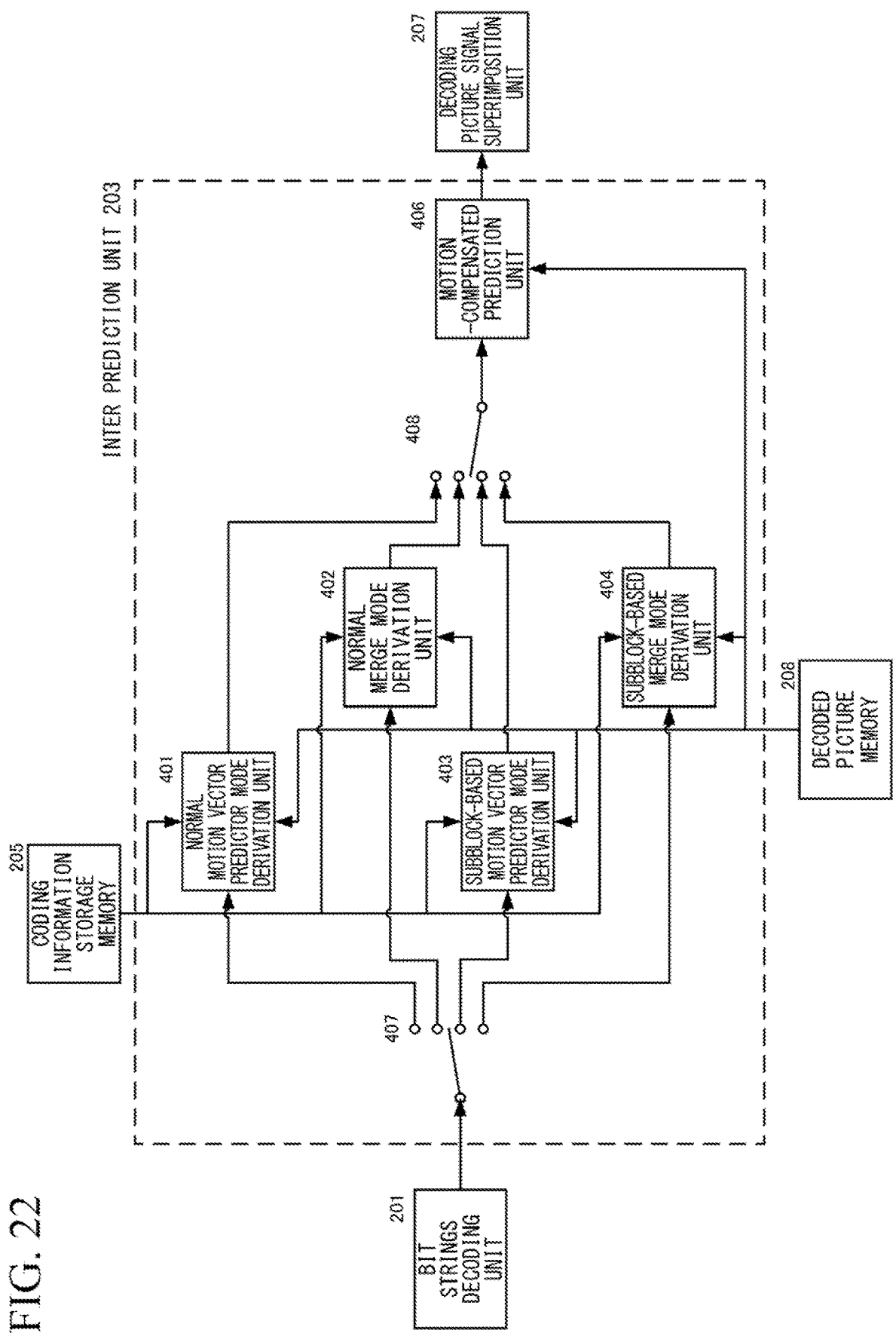
FIG. 22 is a block diagram of a detailed configuration of an inter prediction unit 203 of FIG. 2.

FIG. 22 is a diagram showing a detailed configuration of the inter prediction unit 203 of the picture decoding device of FIG. 2.

A normal motion vector predictor mode derivation unit 401 derives a plurality of normal motion vector predictor candidates to select a motion vector predictor, calculates a sum of the selected motion vector predictor and the decoded motion vector difference, and sets the calculated sum as a motion vector. A decoded inter prediction mode, reference index, and motion vector become inter prediction information of the normal motion vector predictor mode. This inter prediction information is supplied to a motion-compensated prediction unit 406 via the switch 408. A detailed configuration and a process of the normal motion vector predictor mode derivation unit 401 will be described below.

A normal merge mode derivation unit 402 derives a plurality of normal merging candidates to select a normal merging candidate and obtains inter prediction information of the normal merge mode. This inter prediction information is supplied to the motion-compensated prediction unit 406 via the switch 408. A detailed configuration and a process of the normal merge mode derivation unit 402 will be described below.

A subblock-based motion vector predictor mode derivation unit 403 derives a plurality of subblock-based motion vector predictor candidates to select a subblock-based motion vector predictor, calculates a sum of the selected subblock-based motion vector predictor and the decoded motion vector difference, and sets the calculated sum as a motion vector. A decoded inter prediction mode, reference index, and motion vector become the inter prediction information of the subblock-based motion vector predictor mode. This inter prediction information is supplied to the motion-compensated prediction unit 406 via the switch 408.

A subblock-based merge mode derivation unit 404 derives a plurality of subblock-based merging candidates to select a subblock-based merging candidate and obtains inter prediction information of the subblock-based merge mode. This inter prediction information is supplied to the motion-compensated prediction unit 406 via the switch 408.

The motion-compensated prediction unit 406 performs inter prediction on the reference picture signal stored in the decoded picture memory 208 on the basis of the determined inter prediction information. A detailed configuration and a process of the motion-compensated prediction unit 406 are similar to those of the motion-compensated prediction unit 306 of the coding side.

<Normal Motion Vector Predictor Mode Derivation Unit (Normal AMVP)>

Figure 17:
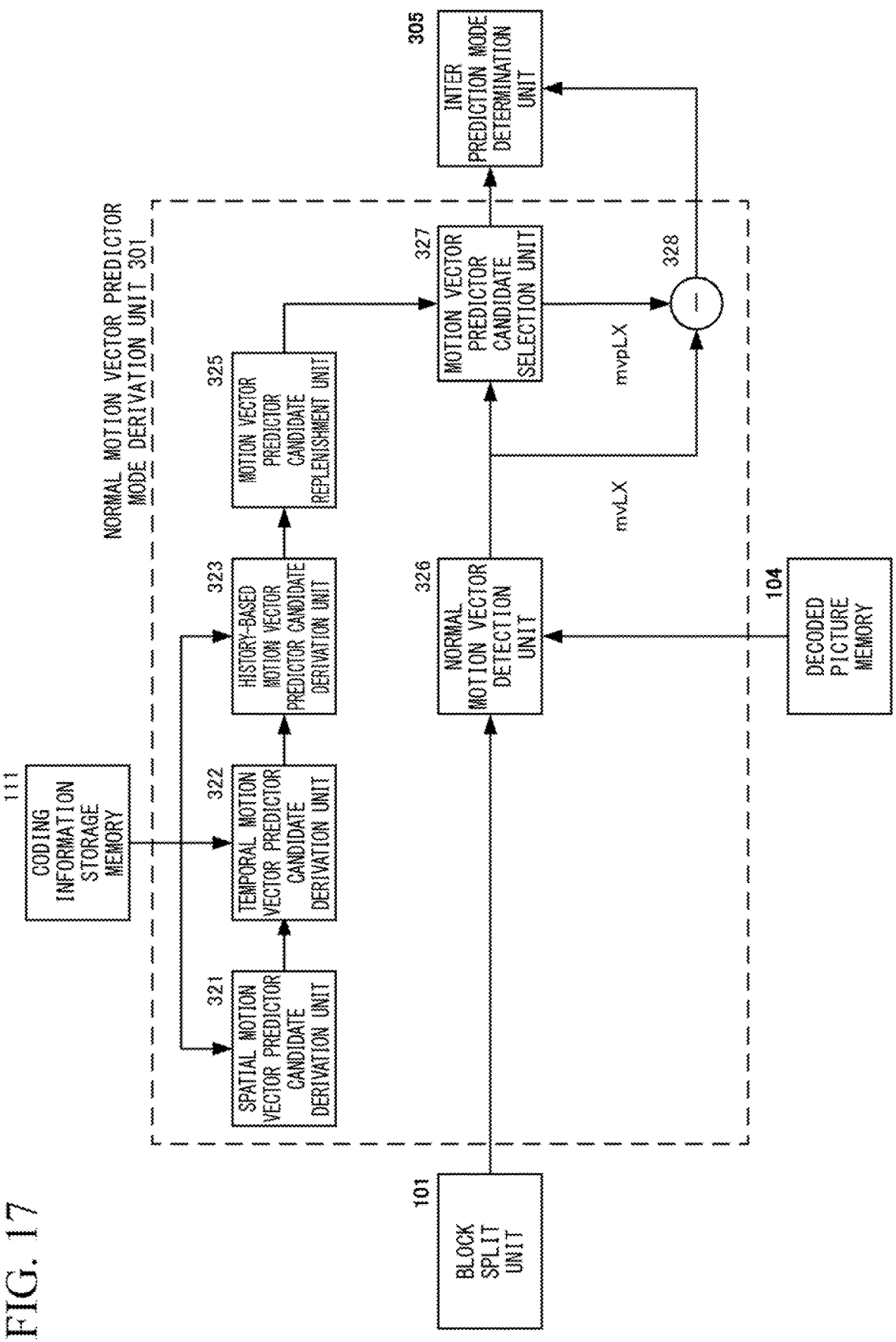
FIG. 17 is a block diagram of a detailed configuration of a normal motion vector predictor mode derivation unit 301 of FIG. 16.

The normal motion vector predictor mode derivation unit 301 of FIG. 17 includes a spatial motion vector predictor candidate derivation unit 321, a temporal motion vector predictor candidate derivation unit 322, a history-based motion vector predictor candidate derivation unit 323, a motion vector predictor candidate replenishment unit 325, a normal motion vector detection unit 326, a motion vector predictor candidate selection unit 327, and a motion vector subtraction unit 328.

Figure 23:
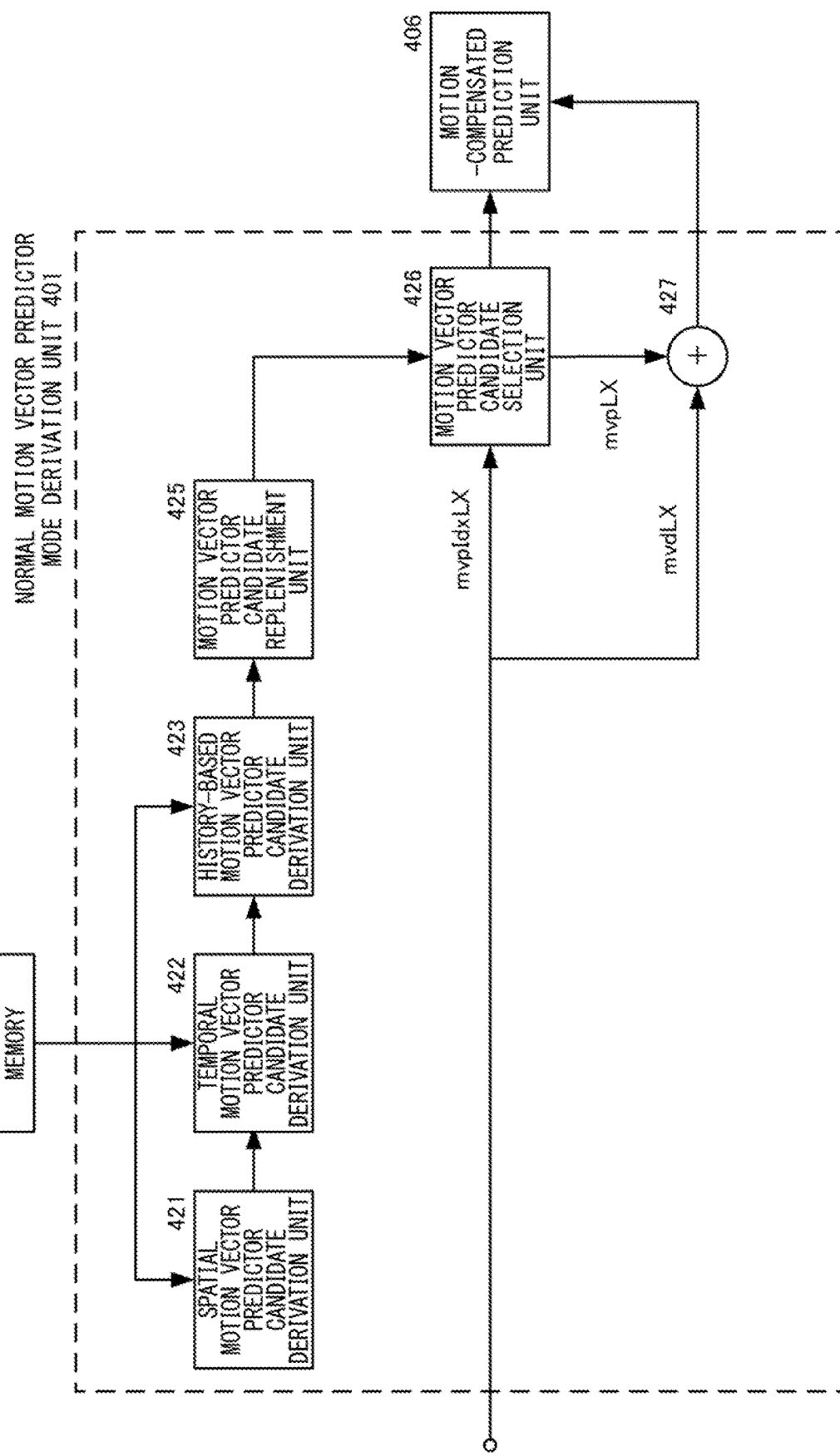
FIG. 23 is a block diagram of a detailed configuration of a normal motion vector predictor mode derivation unit 401 of FIG. 22.

The normal motion vector predictor mode derivation unit 401 of FIG. 23 includes a spatial motion vector predictor candidate derivation unit 421, a temporal motion vector predictor candidate derivation unit 422, a history-based motion vector predictor candidate derivation unit 423, a motion vector predictor candidate replenishment unit 425, a motion vector predictor candidate selection unit 426, and a motion vector addition unit 427.

Figure 19:
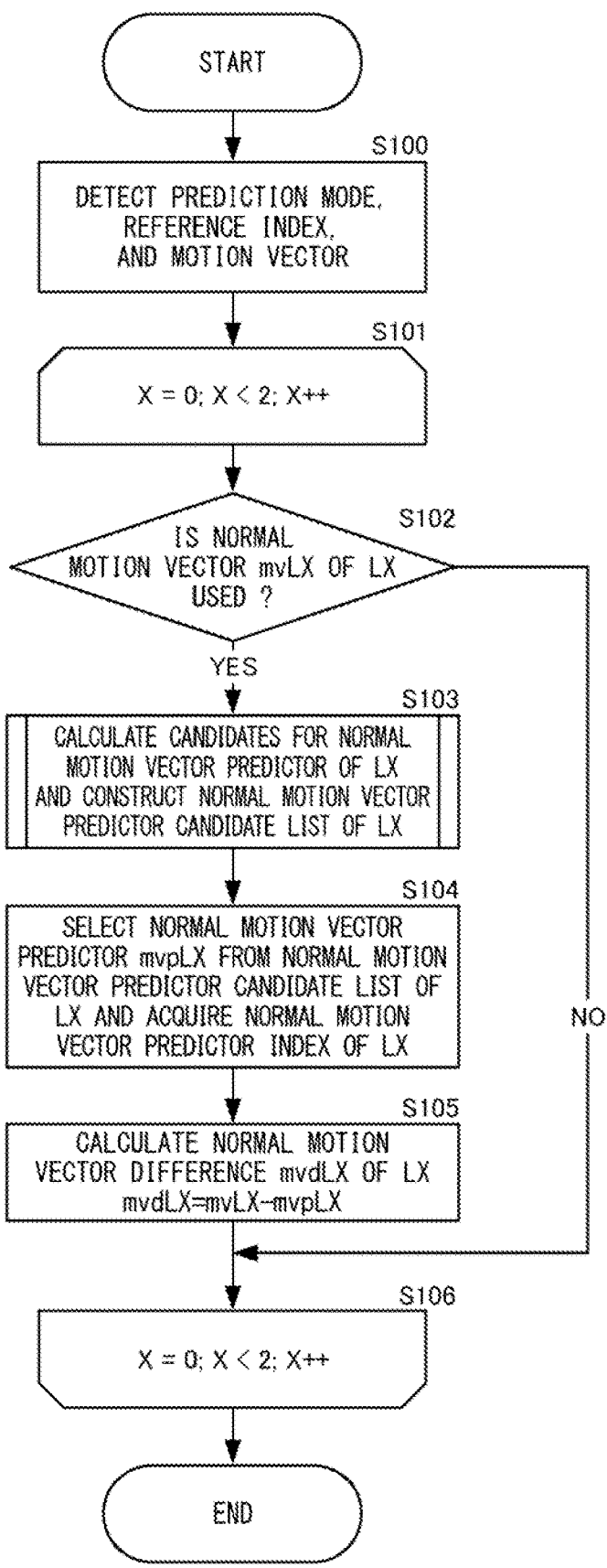
FIG. 19 is an explanatory flowchart showing a normal motion vector predictor mode derivation process of the normal motion vector predictor mode derivation unit 301 of FIG. 16.
Figure 25:
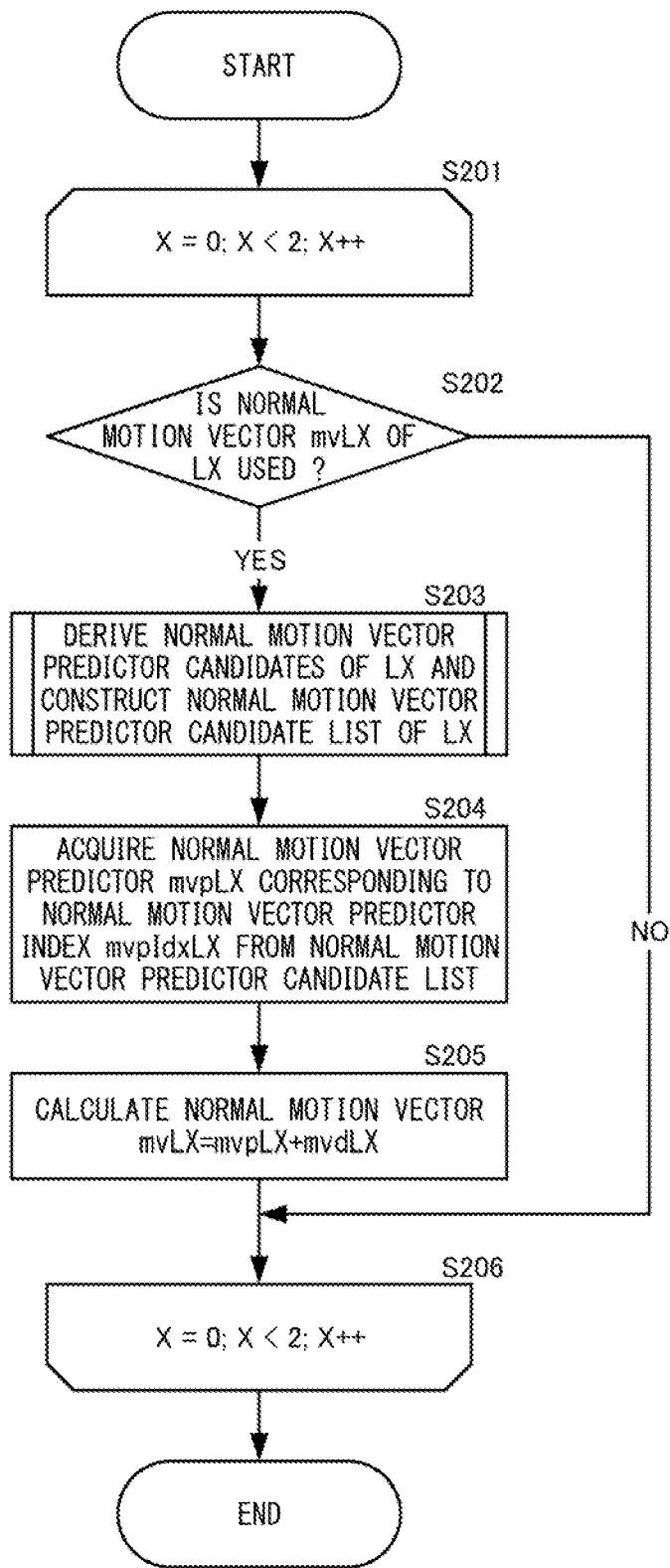
FIG. 25 is an explanatory flowchart showing a normal motion vector predictor mode derivation process of the normal motion vector predictor mode derivation unit 401 of FIG. 22.

Processing procedures of the normal motion vector predictor mode derivation unit 301 of the coding side and the normal motion vector predictor mode derivation unit 401 of the decoding side will be described using the flowcharts of FIGS. 19 and 25, respectively. FIG. 19 is a flowchart showing a normal motion vector predictor mode derivation processing procedure of the normal motion vector predictor mode derivation unit 301 of the coding side, and FIG. 25 is a flowchart showing a normal motion vector predictor mode derivation processing procedure of the normal motion vector predictor mode derivation unit 401 of the decoding side.

<Normal Motion Vector Predictor Mode Derivation Unit (Normal AMVP): Description of Coding Side>

The normal motion vector predictor mode derivation processing procedure of the coding side will be described with reference to FIG. 19. In the description of the processing procedure of FIG. 19, the term "normal" shown in FIG. 19 may be omitted.

First, the normal motion vector detection unit 326 detects a normal motion vector for each inter prediction mode and each reference index (step S100 of FIG. 19). Subsequently, in the spatial motion vector predictor candidate derivation unit 321, the temporal motion vector predictor candidate derivation unit 322, the history-based motion vector predictor candidate derivation unit 323, the motion vector predictor candidate replenishment unit 325, the motion vector predictor candidate selection unit 327, and the motion vector subtraction unit 328, a motion vector difference of a motion vector used for inter prediction of the normal motion vector predictor mode is calculated for each of L0 and L1 (steps S101 to S106 of FIG. 19). Specifically, when the prediction mode PredMode of the target block is inter prediction (MODE_INTER) and the inter prediction mode is L0-prediction (Pred_L0), the motion vector predictor candidate list mvpListL0 of L0 is calculated to select the motion vector predictor mvpL0, and the motion vector difference mvdL0 of the motion vector mvL0 of L0 is calculated. When the inter prediction mode of the target block is L1-prediction (Pred_L1), the motion vector predictor candidate list mvpListL1 of L1 is calculated to select the motion vector predictor mvpL1, and the motion vector difference mvdL1 of the motion vector mvL1 of L1 is calculated. When the inter prediction mode of the target block is bi-prediction (Pred_BI), both L0-prediction and L1-prediction are performed, the motion vector predictor candidate list mvpListL0 of L0 is calculated to select a motion vector predictor mvpL0 of L0, the motion vector difference mvdL0 of a motion vector mvL0 of L0 is calculated, the motion vector predictor candidate list mvpListL1 of L1 is calculated to select a motion vector predictor mvpL1 of L1, and a motion vector difference mvdL1 of a motion vector mvL1 of L1 is calculated.

Although a motion vector difference calculation process is performed for each of L0 and L1, the motion vector difference calculation process becomes a process common to both L0 and L1. Therefore, in the following description, L0 and L1 are represented as common LX. X of LX is 0 in the process of calculating the motion vector difference of L0, and X of LX is 1 in the process of calculating the motion vector difference of L1. Also, when information of another list instead of LX is referred to during the process of calculating the motion vector difference of LX, the other list is represented as LY.

When the motion vector mvLX of LX is used (step S102 of FIG. 19: YES), the motion vector predictor candidates of LX are calculated to construct the motion vector predictor candidate list mvpListLX of LX (step S103 of FIG. 19). In the spatial motion vector predictor candidate derivation unit 321, the temporal motion vector predictor candidate derivation unit 322, the history-based motion vector predictor candidate derivation unit 323, and the motion vector predictor candidate replenishment unit 325 of the normal motion vector predictor mode derivation unit 301, a plurality of motion vector predictor candidates are derived to construct the motion vector predictor candidate list mvpListLX. The detailed processing procedure of step S103 of FIG. 19 will be described below using the flowchart of FIG. 20.

Subsequently, the motion vector predictor candidate selection unit 327 selects a motion vector predictor mvpLX of LX from the motion vector predictor candidate list mvpListLX of LX (step S104 of FIG. 19). Here, one element (an $i^{th}$ element when counted from a $0^{th}$ element) in the motion vector predictor candidate list mvpListLX is represented as mvpListLX[i]. Each motion vector difference that is a difference between the motion vector mvLX and each motion vector predictor candidate mvpListLX[i] stored in the motion vector predictor candidate list mvpListLX is calculated. A code amount when the motion vector differences are coded is calculated for each element (motion vector predictor candidate) of the motion vector predictor candidate list mvpListLX. Then, a motion vector predictor candidate mvpListLX[i] that minimizes the code amount for each motion vector predictor candidate among the elements registered in the motion vector predictor candidate list mvpListLX is selected as the motion vector predictor mvpLX and its index i is acquired. When there are a plurality of motion vector predictor candidates having the smallest generated code amount in the motion vector predictor candidate list mvpListLX, a motion vector predictor candidate mvpListLX[i] represented by a smaller number in the index i in the motion vector predictor candidate list mvpListLX is selected as an optimum motion vector predictor mvpLX and its index i is acquired.

Subsequently, the motion vector subtraction unit 328 subtracts the selected motion vector predictor mvpLX of LX from the motion vector mvLX of LX and calculates a motion vector difference mvdLX of LX as mvdLX=mvLX−mvpLX (step S105 of FIG. 19).

<Normal Motion Vector Predictor Mode Derivation Unit (Normal AMVP): Description of Decoding Side>

Next, the normal motion vector predictor mode processing procedure of the decoding side will be described with reference to FIG. 25. On the decoding side, in the spatial motion vector predictor candidate derivation unit 421, the temporal motion vector predictor candidate derivation unit 422, the history-based motion vector predictor candidate derivation unit 423, and the motion vector predictor candidate replenishment unit 425, a motion vector for use in inter prediction of the normal motion vector predictor mode is calculated for each of L0 and L1 (steps S201 to S206 of FIG. 25). Specifically, when the prediction mode PredMode of the target block is inter prediction (MODE_INTER) and the inter prediction mode of the target block is L0-prediction (Pred_L0), the motion vector predictor candidate list mvpListL0 of L0 is calculated to select the motion vector predictor mvpL0, and a motion vector mvL0 of L0 is calculated. When the inter prediction mode of the target block is L1-prediction (Pred_L1), the motion vector predictor candidate list mvpListL1 of L1 is calculated to select the motion vector predictor mvpL1, and the motion vector mvL1 of L1 is calculated. When the inter prediction mode of the target block is bi-prediction (Pred_BI), both L0-prediction and L1-prediction are performed, the motion vector predictor candidate list mvpListL0 of L0 is calculated to select a motion vector predictor mvpL0 of L0, a motion vector mvL0 of L0 is calculated, the motion vector predictor candidate list mvpListL1 of L1 is calculated to select a motion vector predictor mvpL1 of L1, and each motion vector mvL1 of L1 is calculated.

Although a motion vector calculation process is performed for each of L0 and L1 on the decoding side as on the coding side, the motion vector calculation process becomes a process common to both L0 and L1. Therefore, in the following description, L0 and L1 are represented as common LX. LX represents an inter prediction mode for use in the inter prediction of a target coding block. X is 0 in the process of calculating the motion vector of L0, and X is 1 in the process of calculating the motion vector of L1. Also, when information of another reference list instead of a reference list identical to that of LX of a calculation target is referred to during the process of calculating the motion vector of LX, the other reference list is represented as LY.

When the motion vector mvLX of LX is used (step S202 of FIG. 25: YES) the motion vector predictor candidates of LX are calculated to construct the motion vector predictor candidate list mvpListLX of LX (step S203 of FIG. 25). In the spatial motion vector predictor candidate derivation unit 421, the temporal motion vector predictor candidate derivation unit 422, the history-based motion vector predictor candidate derivation unit 423, and the motion vector predictor candidate replenishment unit 425 of the normal motion vector predictor mode derivation unit 401, a plurality of motion vector predictor candidates are calculated to construct a motion vector predictor candidate list mvpListLX. A detailed processing procedure of step S203 of FIG. 25 will be described below using the flowchart of FIG. 20.

Subsequently, the motion vector predictor candidate mvpListLX[mvpIdxLX] corresponding to the index mvpIdxLX of the motion vector predictor decoded and supplied by the bit strings decoding unit 201 from the motion vector predictor candidate list mvpListLX is extracted as a selected motion vector predictor mvpLX in the motion vector predictor candidate selection unit 426 (step S204 of FIG. 25).

Subsequently, the motion vector addition unit 427 sums the motion vector difference mvdLX of LX that is decoded and supplied by the bit strings decoding unit 201 and the motion vector predictor mvpLX of LX and calculates the motion vector mvLX of LX as mvLX=mvpLX+mvdLX (step S205 of FIG. 25).

<Normal Motion Vector Predictor Mode Derivation Unit (Normal AMVP): Motion Vector Prediction Method>

Figure 20:
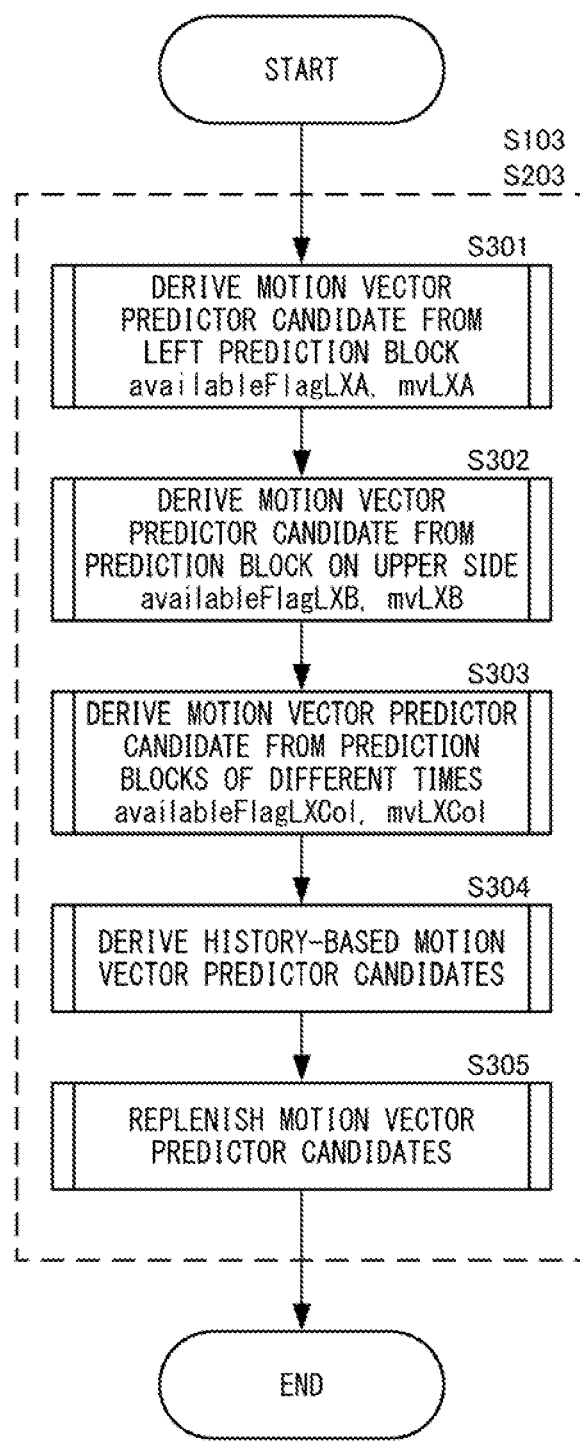
FIG. 20 is a flowchart showing a processing procedure of the normal motion vector predictor mode derivation process.

FIG. 20 is a flowchart showing a processing procedure of a normal motion vector predictor mode derivation process having a function common to the normal motion vector predictor mode derivation unit 301 of the picture coding device and the normal motion vector predictor mode derivation unit 401 of the picture decoding device according to the embodiment of the present invention.

The normal motion vector predictor mode derivation unit 301 and the normal motion vector predictor mode derivation unit 401 include a motion vector predictor candidate list mvpListLX. The motion vector predictor candidate list mvpListLX has a list structure and is provided with a storage area where a motion vector predictor index indicating the location inside the motion vector predictor candidate list and a motion vector predictor candidate corresponding to the index are stored as elements. The number of the motion vector predictor index starts from 0, and motion vector predictor candidates are stored in the storage area of the motion vector predictor candidate list mvpListLX. In the present embodiment, it is assumed that at least two motion vector predictor candidates (inter prediction information) can be registered in the motion vector predictor candidate list mvpListLX. Furthermore, a variable numCurrMvpCand indicating the number of motion vector predictor candidates registered in the motion vector predictor candidate list mvpListLX is set to 0.

The spatial motion vector predictor candidate derivation units 321 and 421 derive motion vector predictor candidates from neighboring blocks on the left side. In this process, a motion vector predictor mvLXA is derived with reference to the inter prediction information of the neighboring block on the left side (A0 or A1 of FIG. 11), i.e., a flag indicating whether or not a motion vector predictor candidate can be used, a motion vector, a reference index, and the like, and the derived mvLXA is added to the motion vector predictor candidate list mvpListLX (step S301 of FIG. 20). Also, X is 0 at the time of L0-prediction, and X is 1 at the time of L1-prediction (the same is true hereinafter). Subsequently, the spatial motion vector predictor candidate derivation units

321 and 421 derive a motion vector predictor candidate from a neighboring block on the upper side. In this process, the motion vector predictor mvLXB is derived with reference to inter prediction information of a neighboring block on the upper side (B0, B1, or B2 of FIG. 11). i.e., a flag indicating whether or not a motion vector predictor candidate can be used, a motion vector, a reference index, and the like, and mvLXB is added to the motion vector predictor candidate list mvpListLX if the derived mvLXA is not equal to the derived mvLXB (step S302 of FIG. 20). The processing of steps S301 and S302 of FIG. 20 is common except that positions of neighboring blocks to be referred to and the number of neighboring blocks to be referred to are different, and a flag availableFlagLXN indicating whether or not a motion vector predictor candidate of the coding block can be used, a motion vector mvLXN, and a reference index refIdxN (N represents A or B and the same is true hereinafter) are derived.

Subsequently, the temporal motion vector predictor candidate derivation units 322 and 422 derive motion vector predictor candidates from blocks in a picture whose time is different from that of the current target picture. In this process, a flag availableFlagLXCol indicating whether or not a motion vector predictor candidate of a coding block of a picture of a different time can be used, a motion vector mvLXCol, a reference index refIdxCol, and a reference list listCol are derived, and mvLXCol is added to the motion vector predictor candidate list mvpListLX (step S303 of FIG. 20).

Also, it is assumed that the processes of the temporal motion vector predictor candidate derivation units 322 and 422 can be omitted in units of sequences (SPS), pictures (PPS), or slices.

Subsequently, the history-based motion vector predictor candidate derivation units 323 and 423 add the history-based motion vector predictor candidates registered in the history-based motion vector predictor candidate list HmvpCandList to the motion vector predictor candidate list mvpListLX (step S304 of FIG. 20). Details of the registration processing procedure of step S304 will be described below using the flowchart of FIG. 29.

Subsequently, the motion vector predictor candidate replenishment units 325 and 425 add motion vector predictor candidates having a predetermined value such as (0, 0) until the motion vector predictor candidate list mvpListLX is satisfied (S305 of FIG. 20).

<Normal Merge Mode Derivation Unit (Normal Merge)>

Figure 18:
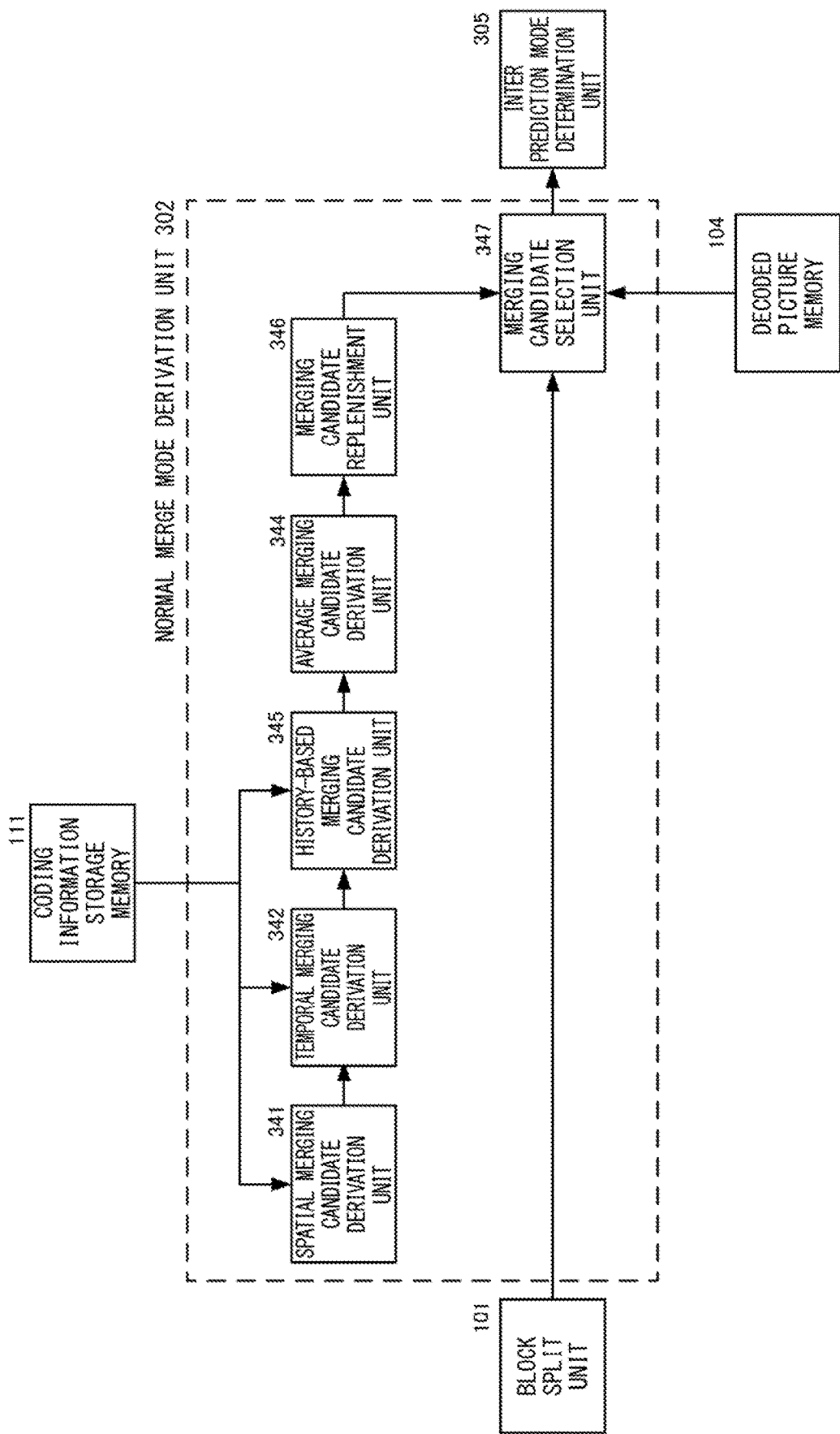
FIG. 18 is a block diagram of a detailed configuration of a normal merge mode derivation unit 302 of FIG. 16.

The normal merge mode derivation unit 302 of FIG. 18 includes a spatial merging candidate derivation unit 341, a temporal merging candidate derivation unit 342, an average merging candidate derivation unit 344, a history-based merging candidate derivation unit 345, a merging candidate replenishment unit 346, and a merging candidate selection unit 347.

Figure 24:
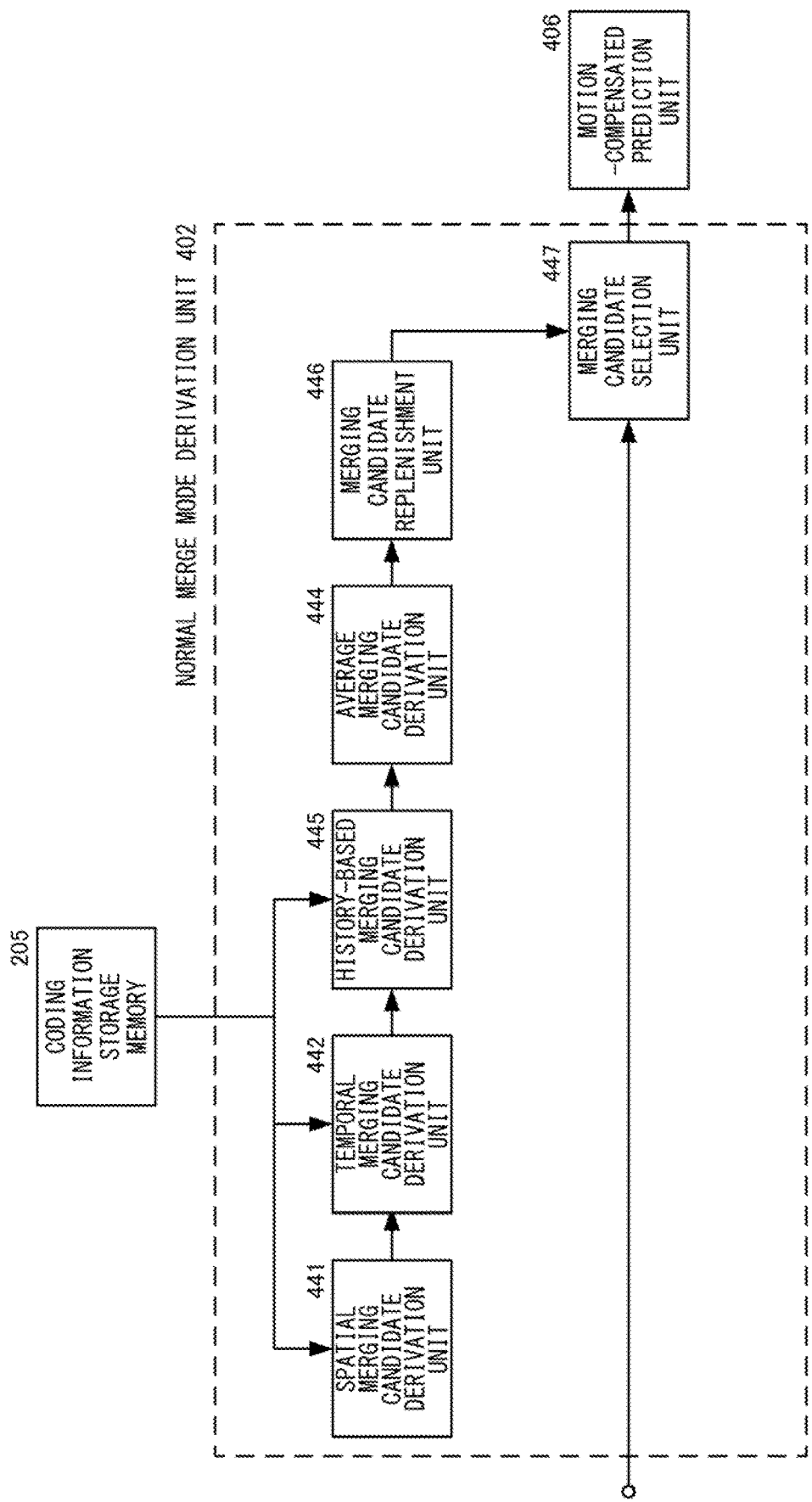
FIG. 24 is a block diagram of a detailed configuration of a normal merge mode derivation unit 402 of FIG. 22.

The normal merge mode derivation unit 402 of FIG. 24 includes a spatial merging candidate derivation unit 441, a temporal merging candidate derivation unit 442, an average merging candidate derivation unit 444, a history-based merging candidate derivation unit 445, a merging candidate replenishment unit 446, and a merging candidate selection unit 447.

Figure 21:
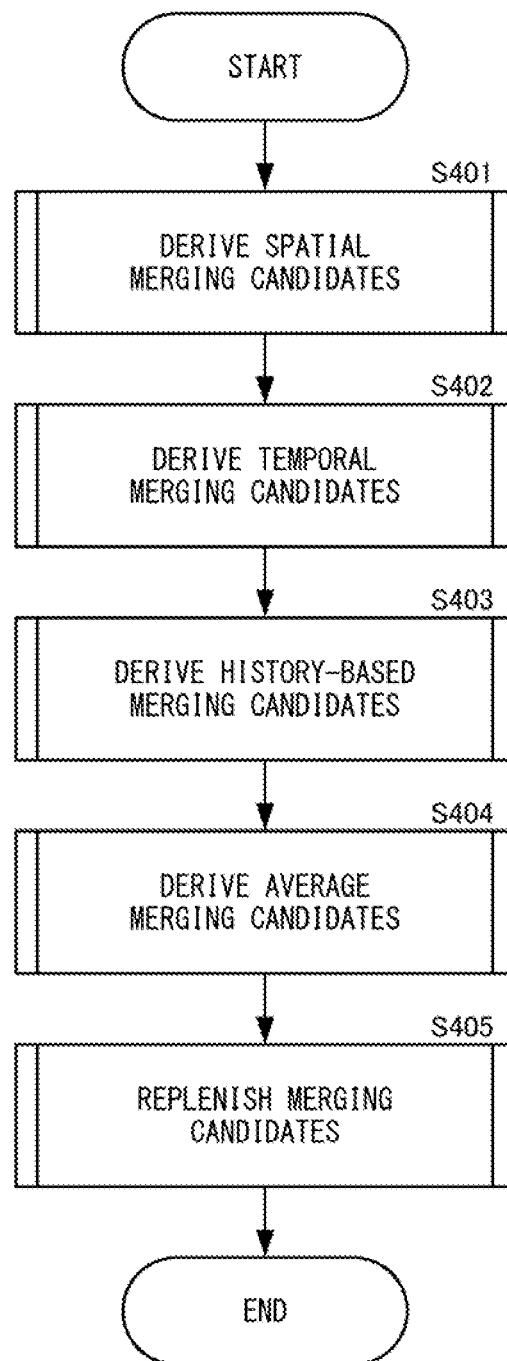
FIG. 21 is an explanatory flowchart showing a processing procedure of a normal merge mode derivation process.

FIG. 21 is an explanatory flowchart showing a procedure of a normal merge mode derivation process having a function common to the normal merge mode derivation unit 302 of the picture coding device and the normal merge mode derivation unit 402 of the picture decoding device according to the embodiment of the present invention.

Hereafter, various processes will be described step by step. Although a case in which a type of slice slice_type is a B slice will be described unless otherwise specified in the following description, the present invention can also be applied to the case of a P slice. However, when the type of slice slice_type is a P slice, because only the L0-prediction (Pred_L0) is provided as the inter prediction mode and L1-prediction (Pred_L1) and bi-prediction (Pred_BI) are absent, a process related to L1 can be omitted.

The normal merge mode derivation unit 302 and the normal merge mode derivation unit 402 have a merging candidate list mergeCandList. The merging candidate list mergeCandList has a list structure and is provided with a merge index indicating the location within the merging candidate list and a storage area where merging candidates corresponding to the index are stored as elements. The number of the merge index starts from 0, and merging candidates are stored in the storage area of the merging candidate list mergeCandList. In the subsequent process, the merging candidate of the merge index i registered in the merging candidate list mergeCandList is represented by mergeCandList[i]. In the present embodiment, it is assumed that at least six merging candidates (inter prediction information) can be registered in the merging candidate list mergeCandList. Further, a variable numCurrMergeCand indicating the number of merging candidates registered in the merging candidate list mergeCandList is set to 0.

A spatial merging candidate derivation unit 341 and a spatial merging candidate derivation unit 441 derive spatial merging candidates from blocks (B1, A1, B0, A0, and B2 of FIG. 11) adjacent to a left side and an upper side of a target block in the order of B1, A1, B0, A0, and B2 from the coding information stored in the coding information storage memory 111 of the picture coding device or the coding information storage memory 205 of the picture decoding device, and register the derived spatial merging candidates in the merging candidate list mergeCandList (step S401 of FIG. 21). Here, N indicating any one of spatial merging candidates B1, A1, B0, A0, and B2 and a temporal merging candidate Col is defined. A flag availableFlagN indicating whether or not inter prediction information of block N is available as a spatial merging candidate, a reference index refIdxL0N of L0 and a reference index refIdxL1N of L1 of spatial merging candidate N, an L0-prediction flag predFlagL0N indicating whether or not L0-prediction is to be performed, an L1-prediction flag predFlagL1N indicating whether or not L1-prediction is to be performed, a motion vector mvL0N of L0, and a motion vector mvL1N of L1 are derived. However, in the present embodiment, because the merging candidate is derived without referring to inter prediction information of a block included in a coding block serving as a target, a spatial merging candidate using the inter prediction information of the block included in the target coding block is not derived.

Subsequently, the temporal merging candidate derivation unit 342 and the temporal merging candidate derivation unit 442 derive temporal merging candidates from pictures of different times and register the derived temporal merging candidates in the merging candidate list mergeCandList (step S402 of FIG. 21). A lag availableFlagCol indicating whether or not the temporal merging candidate can be used, an L0-prediction flag predFlagL0Col indicating whether or not L0-prediction of the temporal merging candidate is performed, an L1-prediction flag predFlagL1Col indicating whether or not L1-prediction is performed, a motion vector mvL0Col of L0, and a motion vector mvL1Col of L1 are derived.

Also, it is assumed that the processes of the temporal merging candidate derivation unit 342 and the temporal merging candidate derivation unit 442 can be omitted in units of sequences (SPS), pictures (PPS), or slices.

Subsequently, the history-based merging candidate derivation unit 345 and the history-based merging candidate derivation unit 445 register history-based motion vector predictor candidates registered in the history-based motion vector predictor candidate list HmvpCandList in the merging candidate list mergeCandList (step S403 of FIG. 21).

Also, when the number of merging candidates numCurrMergeCand registered within the merging candidate list mergeCandList is smaller than the maximum number of merging candidates MaxNumMergeCand, the maximum number of merging candidates MaxNumMergeCand is set as an upper limit of the number of merging candidates numCurrMergeCand registered within the merging candidate list mergeCandList. and history-based merging candidates are derived and registered in the merging candidate list mergeCandList.

Subsequently, the average merging candidate derivation unit 344 and the average merging candidate derivation unit 444 derive an average merging candidate from the merging candidate list mergeCandList and add the derived average merging candidate to the merging candidate list mergeCandList (step S404 of FIG. 21).

Also, when the number of merging candidates numCurrMergeCand registered within the merging candidate list mergeCandList is smaller than the maximum number of merging candidates MaxNumMergeCand, the maximum number of merging candidates MaxNumMergeCand is set as an upper limit of the number of merging candidates numCurrMergeCand registered within the merging candidate list mergeCandList, and average merging candidates are derived and registered in the merging candidate list mergeCandList.

Here, the average merging candidate is a new merging candidate having a motion vector obtained by averaging motion vectors of a first merging candidate and a second merging candidate registered in the merging candidate list mergeCandList for each of the L0-prediction and the L1-prediction.

Subsequently, in the merging candidate replenishment unit 346 and the merging candidate replenishment unit 446, when the number of merging candidates numCurrMergeCand registered within the merging candidate list mergeCandList is smaller than the maximum number of merging candidates MaxNumMergeCand, the maximum number of merging candidates MaxNumMergeCand is set as an upper limit of the number of merging candidates numCurrMergeCand registered within the merging candidate list mergeCandList. and an additional merging candidate is derived and registered in the merging candidate list mergeCandList (step S405 of FIG. 21). In the P slice, a merging candidate for which a motion vector has a value of (0, 0) and the prediction mode is L0-prediction (Pred_L0) is added using the maximum number of merging candidates MaxNumMergeCand as the upper limit. In the B slice, a merging candidate for which a motion vector has a value of (0, 0) and the prediction mode is bi-prediction (Pred_BI) is added. A reference index when the merging candidate is added is different from the previously added reference index.

Subsequently, the merging candidate selection unit 347 and the merging candidate selection unit 447 select merging candidates from the merging candidates registered within the merging candidate list mergeCandList. The merging candidate selection unit 347 of the coding side selects a merging candidate by calculating a code amount and a distortion amount, and supplies a merge index indicating the selected merging candidate and inter prediction information of the merging candidate to the motion-compensated prediction unit 306 via the inter prediction mode determination unit 305. On the other hand, the merging candidate selection unit 447 of the decoding side selects a merging candidate on the basis of a decoded merge index and supplies the selected merging candidate to the motion-compensated prediction unit 406.

<Update of History-Based Motion Vector Predictor Candidate List>

Figure 26:
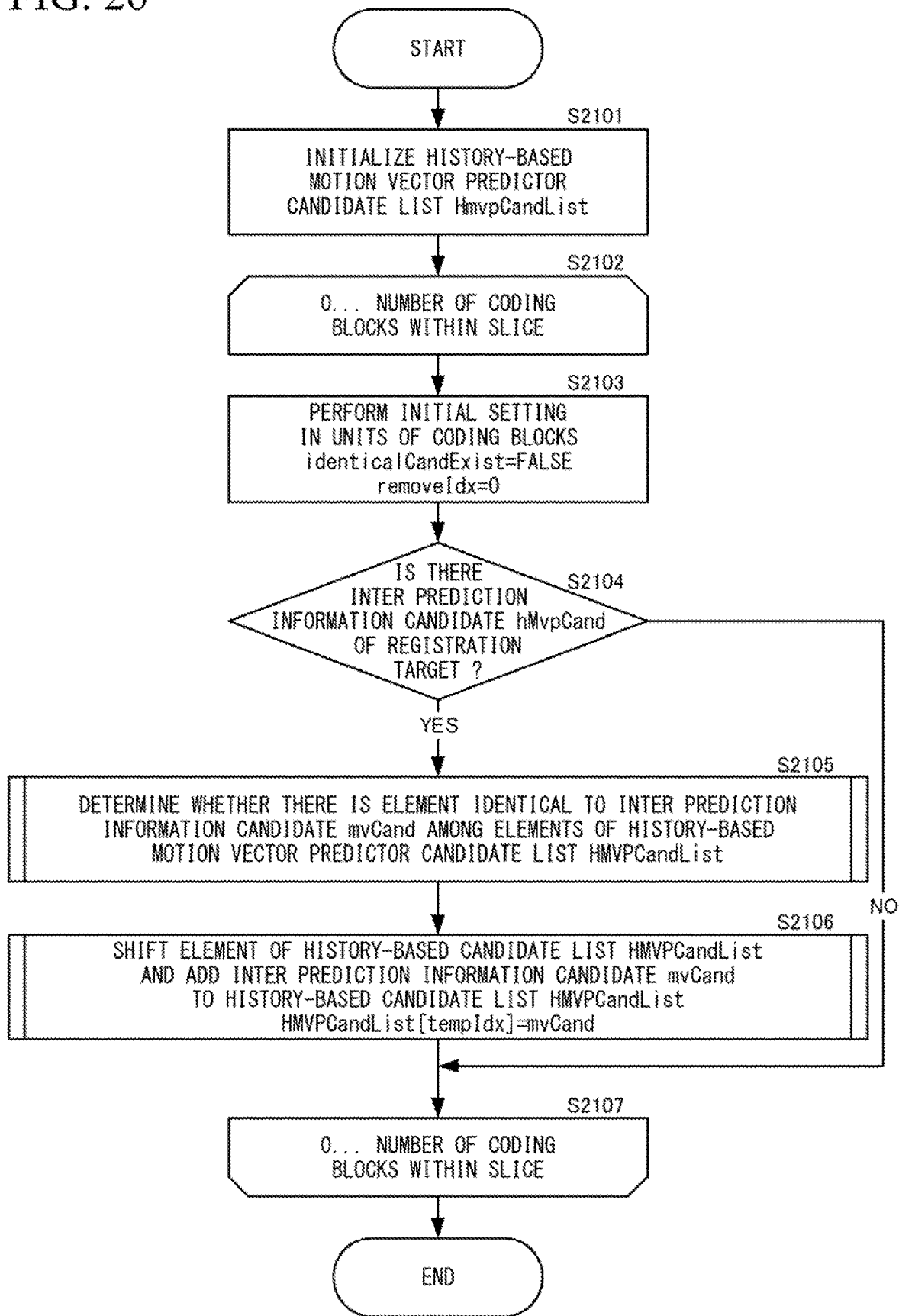
FIG. 26 is an explanatory diagram showing a processing procedure of initializing/updating a history-based motion vector predictor candidate list.

Next, an initialization method and an update method of the history-based motion vector predictor candidate list HmvpCandList provided in the coding information storage memory 111 of the coding side and the coding information storage memory 205 of the decoding side will be described in detail. FIG. 26 is an explanatory flowchart showing a processing procedure of initializing/updating a history-based motion vector predictor candidate list.

In the present embodiment, it is assumed that the history-based motion vector predictor candidate list HmvpCandList is updated in the coding information storage memory 111 and the coding information storage memory 205. A history-based motion vector predictor candidate list update unit may be installed in the inter prediction unit 102 and the inter prediction unit 203 to update the history-based motion vector predictor candidate list HmvpCandList.

The history-based motion vector predictor candidate list HmvpCandList is initially set at the beginning of the slice, the history-based motion vector predictor candidate list HmvpCandList is updated when the normal motion vector predictor mode or the normal merge mode has been selected by the prediction method determination unit 105 on the coding side, and the history-based motion vector predictor candidate list HmvpCandList is updated when the prediction information decoded by the bit strings decoding unit 201 is about the normal motion vector predictor mode or the normal merge mode on the decoding side.

The inter prediction information used when inter prediction is performed in the normal motion vector predictor mode or the normal merge mode is registered as an inter prediction information candidate hMvpCand in the history-based motion vector predictor candidate list HmvpCandList. The inter prediction information candidate hMvpCand includes a reference index refIdxL0 of L0, a reference index refIdxL1 of L1, an L0-prediction flag predFlagL0 indicating whether or not L0-prediction is performed, an L1-prediction flag predFlagL1 indicating whether or not L1-prediction is performed, a motion vector mvL0 of L0, and a motion vector mvL1 of L1.

When there is inter prediction information having the same value as an inter prediction information candidate hMvpCand among elements (i.e., inter prediction information) registered in the history-based motion vector predictor candidate list HmvpCandList provided in the coding information storage memory 111 of the coding side and the coding information storage memory 205 of the decoding side, the element is removed from the history-based motion vector predictor candidate list HmvpCandList. On the other hand, when there is no inter prediction information having the same value as an inter prediction information candidate hMvpCand, the element at the beginning of the history-based motion vector predictor candidate list HmvpCandList is removed, and the inter prediction information candidate hMvpCand is added to the end of the history-based motion vector predictor candidate list HmvpCandList.

The number of elements of the history-based motion vector predictor candidate list HmvpCandList provided in the coding information storage memory 111 of the coding side and the coding information storage memory 205 of the decoding side according to the present invention is assumed to be six.

First, the history-based motion vector predictor candidate list HmvpCandList is initialized in units of slices (step S2101 of FIG. 26). All elements of the history-based motion vector predictor candidate list HmvpCandList are empty at the beginning of the slice, and a value of the number of history-based motion vector predictor candidates (the current number of candidates) NumHmvpCand registered in the history-based motion vector predictor candidate list HmvpCandList is set to 0.

Also, the initialization of the history-based motion vector predictor candidate list HmvpCandList is performed in units of slices (a first coding block of a slice), but may be performed in units of pictures, tiles, or tree block rows.

Subsequently, the following process of updating the history-based motion vector predictor candidate list HmvpCandList is iteratively performed for each coding block within the slice (steps S2102 to S2107 of FIG. 26).

First, initial setting is performed for each coding block. A flag identicalCandExist indicating whether or not there is an identical candidate is set to a value of FALSE, and a removal target index removeIdx indicating a removal target candidate is set to 0 (step S2103 of FIG. 26).

It is determined whether or not there is an inter prediction information candidate hMvpCand of the registration target (step S2104 of FIG. 26). When the prediction method determination unit 105 of the coding side determines that the mode is the normal motion vector predictor mode or the normal merge mode or when the bit strings decoding unit 201 of the decoding side decodes the mode as the normal motion vector predictor mode or the normal merge mode, its inter prediction information is set as an inter prediction information candidate hMvpCand of the registration target. When the prediction method determination unit 105 of the coding side determines that the mode is the intra-prediction mode, the subblock-based motion vector predictor mode, or the subblock-based merge mode or when the bit strings decoding unit 201 of the decoding side decodes the mode as the intra-prediction mode, the subblock-based motion vector predictor mode, or the subblock-based merge mode, a process of updating the history-based motion vector predictor candidate list HmvpCandList is not performed, and the inter prediction information candidate hMvpCand of the registration target does not exist. When there is no inter prediction information candidate hMvpCand of the registration target, steps S2105 to S2106 are skipped (step S2104 of FIG. 26: NO). When there is an inter prediction information candidate hMvpCand of the registration target, the processing from step S2105 is performed (step S2104 of FIG. 26: YES).

Figure 27:
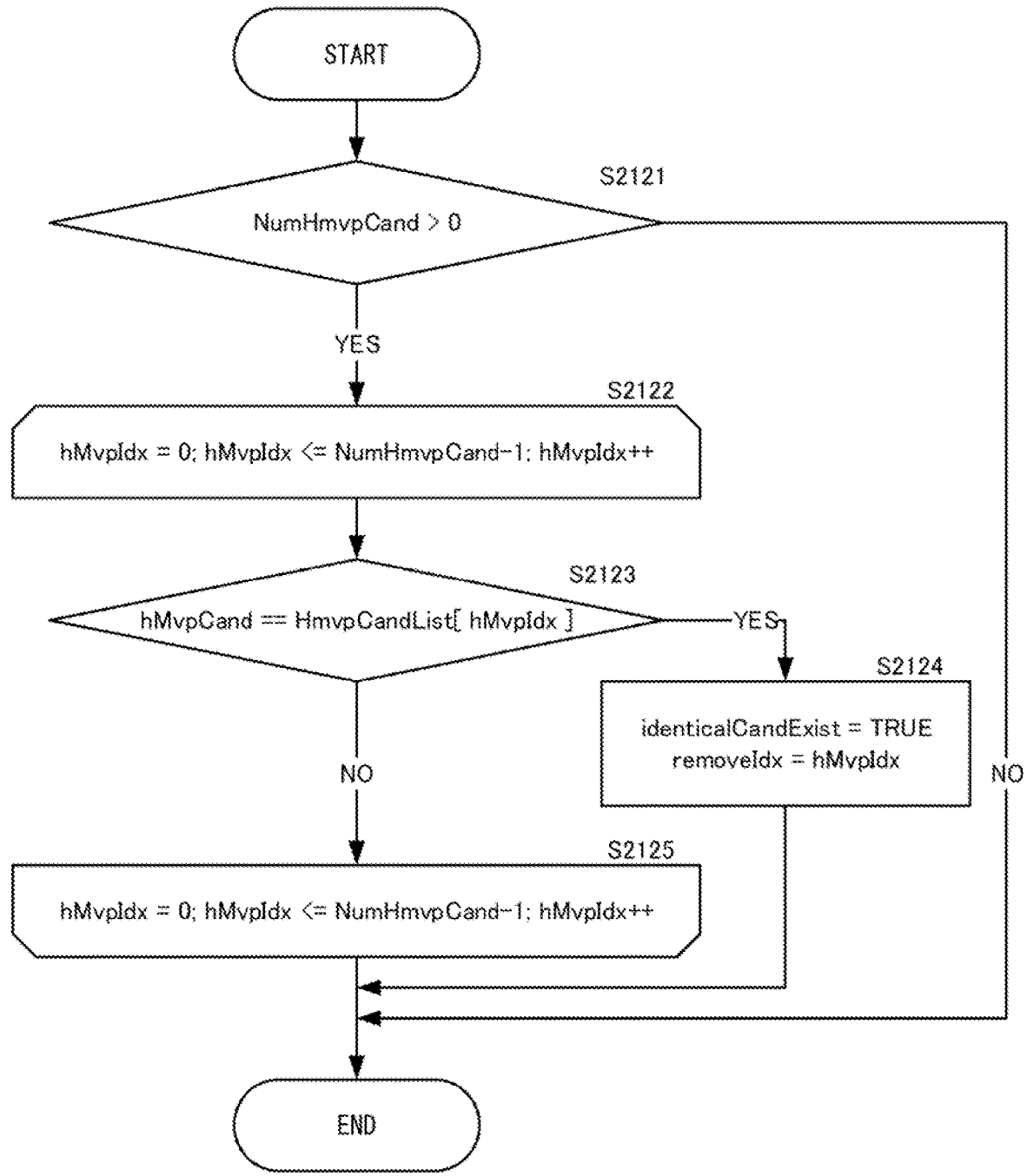
FIG. 27 is a flowchart of an identical element checking processing procedure in the processing procedure of initializing/updating a history-based motion vector predictor candidate list.

Subsequently, it is determined whether or not there is an element (inter prediction information) having the same value as the inter prediction information candidate hMvpCand of the registration target, i.e., an identical element, among elements of the history-based motion vector predictor candidate list HmvpCandList (step S2105 of FIG. 26). FIG. 27 is a flowchart of an identical element checking processing procedure. When a value of the number of history-based motion vector predictor candidates NumHmvpCand is 0 (step S2121 of FIG. 27: NO), the history-based motion vector predictor candidate list HmvpCandList is empty and there is no identical candidate, so steps S2122 to S2125 of FIG. 27 are skipped and the present identical element checking processing procedure is completed. When the value of the number of history-based motion vector predictor candidates NumHmvpCand is greater than 0 (YES in step S2121 of FIG. 27), the processing of step S2123 is iterated until the history-based motion vector predictor index hMvpIdx changes from 0 to NumHmvpCand−1 (steps S2122 to S2125 of FIG. 27). First, a comparison is made regarding whether or not an hMvpIdx$^{th}$ element HmvpCandList[hMvpIdx] when counted from a 0$^{th}$ element of the history-based motion vector predictor candidate list is identical to the inter prediction information candidate hMvpCand (step S2123 of FIG. 27). When they are the same (step S2123 of FIG. 27: YES), a flag identicalCandExist indicating whether or not there is an identical candidate is set to a value of TRUE and a removal target index removeIdx indicating a position of an element of a removal target is set to a current value of the history-based motion vector predictor index hMvpIdx, and the present identical element checking process ends. When they are not the same (step S2123 of FIG. 27: NO), hMvpIdx is incremented by 1. If the history-based motion vector predictor index hMvpIdx is less than or equal to NumHmvpCand−1, the processing from step S2123 is performed.

Figure 28:
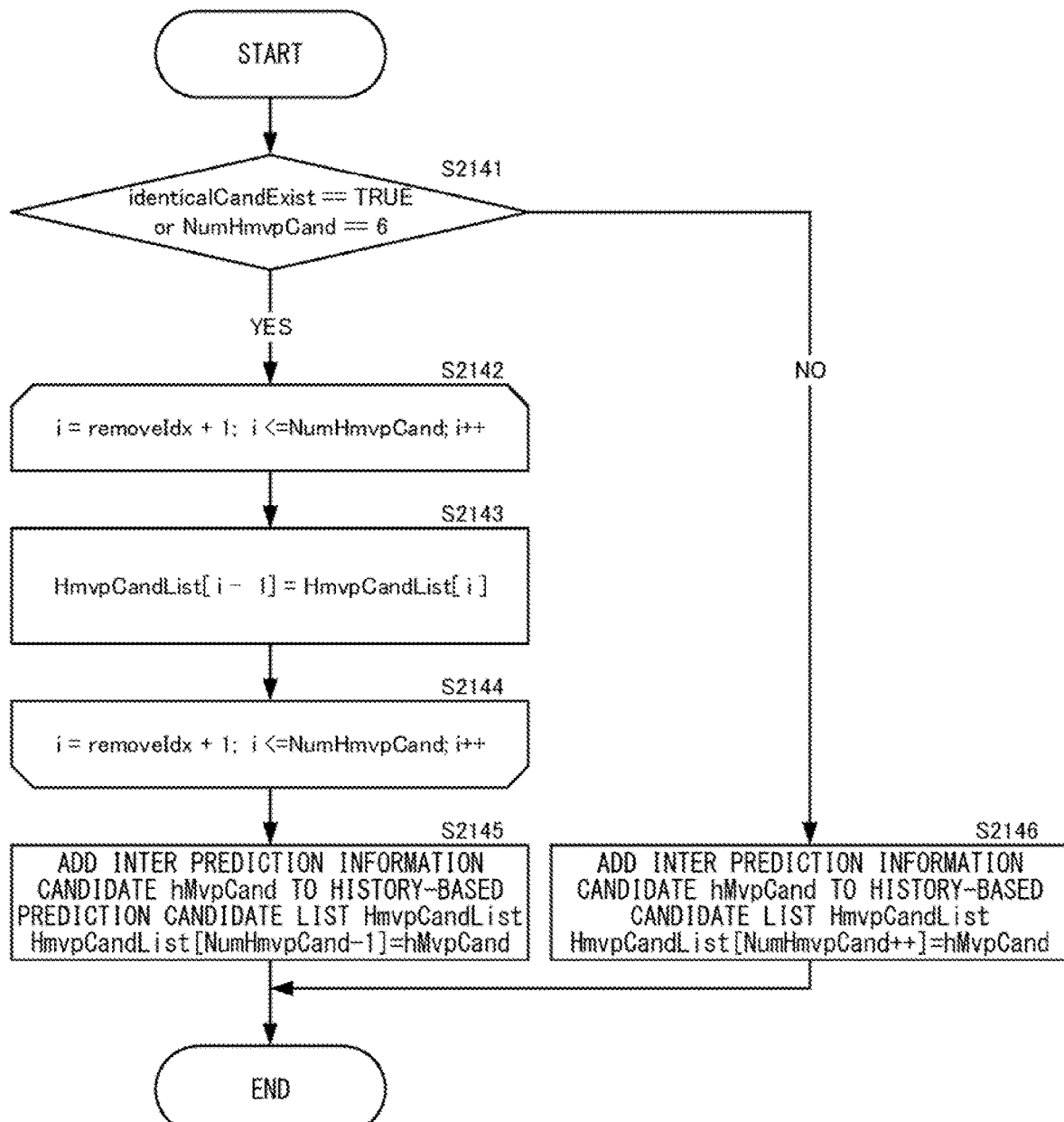
FIG. 28 is a flowchart of an element shift processing procedure in the processing procedure of initializing/updating a history-based motion vector predictor candidate list.

Referring to the flowchart of FIG. 26 again, a process of shifting and adding an element of the history-based motion vector predictor candidate list HmvpCandList is performed (step S2106 of FIG. 26). FIG. 28 is a flowchart of a processing procedure of shifting/adding an element of the history-based motion vector predictor candidate list HmvpCandList of step S2106 of FIG. 26. First, it is determined whether or not to add a new element after removing an element stored in the history-based motion vector predictor candidate list HmvpCandList or to add a new element without removing the element. Specifically, a comparison is made regarding whether or not the flag identicalCandExist indicating whether or not an identical candidate exists is TRUE or NumHmvpCand is six (step S2141 of FIG. 28). When either the condition that the flag identicalCandExist indicating whether or not an identical candidate exists is TRUE or the condition that the current number of candidates NumHmvpCand is six is satisfied (step S2141 of FIG. 28: YES), a new element is added after removing the element stored in the history-based motion vector predictor candidate list HmvpCandList. The initial value of index i is set to a value of removeIdx+1. The element shift process of step S2143 is iterated from this initial value to NumHmvpCand (steps S2142 to S2144 of FIG. 28). By copying the element of HmvpCandList[i] to HmvpCandList[i−1], the element is shifted forward (step S2143 of FIG. 28) and i is incremented by 1 (steps S2142 to S2144 of FIG. 28). Subsequently, the inter prediction information candidate hMvpCand is added to a (NumHmvpCand−1)$^{th}$ element HmvpCandList[NumHmvpCand−1] when counted from a & element that corresponds to the end of the history-based motion vector predictor candidate list (step S2145 of FIG. 28), and the present process of shifting/adding an element of the history-based motion vector predictor candidate list HmvpCandList ends. On the other hand, when neither the condition that the flag identicalCandExist indicating whether or not an identical candidate exists is TRUE nor the condition that the current number of candidates NumHmvpCand is six is satisfied (step S2141 of FIG. 28: NO), the inter prediction information candidate hMvpCand is added to the end of the history-based motion vector predictor candidate list without removing an element stored in the history-based motion vector predictor candidate list HmvpCandList (step S2146 of FIG. 28). Here, the end of the history-based motion vector predictor candidate list is a NumHmvpCand$^{th}$ element HmvpCandList[NumHmvpCand] when counted from a 0$^{th}$ element. Also, NumHmvpCand is incremented by 1, and the present process of shifting/adding an element of the history-based motion vector predictor candidate list HmvpCandList ends.

FIG. 31 is an explanatory diagram showing an example of a process of updating the history-based motion vector predictor candidate list. When a new element is added to the history-based motion vector predictor candidate list Hmvp-CandList in which six elements (inter prediction information) have been registered, the elements are compared with the new inter prediction information in order from a front element of the history-based motion vector predictor candidate list HmvpCandList (FIG. 31A). If the new element has the same value as a third element HMVP2 from the beginning of the history-based motion vector predictor candidate list HmvpCandList, the element HMVP2 is removed from the history-based motion vector predictor candidate list HmvpCandList and subsequent elements HMVP3 to HMVP5 are shifted forward (copied) one by one, and the new element is added to the end of the history-based motion vector predictor candidate list HmvpCandList (FIG. 31B) to complete the update of the history-based motion vector predictor candidate list HmvpCandList (FIG. 31C).

<History-Based Motion Vector Predictor Candidate Derivation Process>

Figure 29:
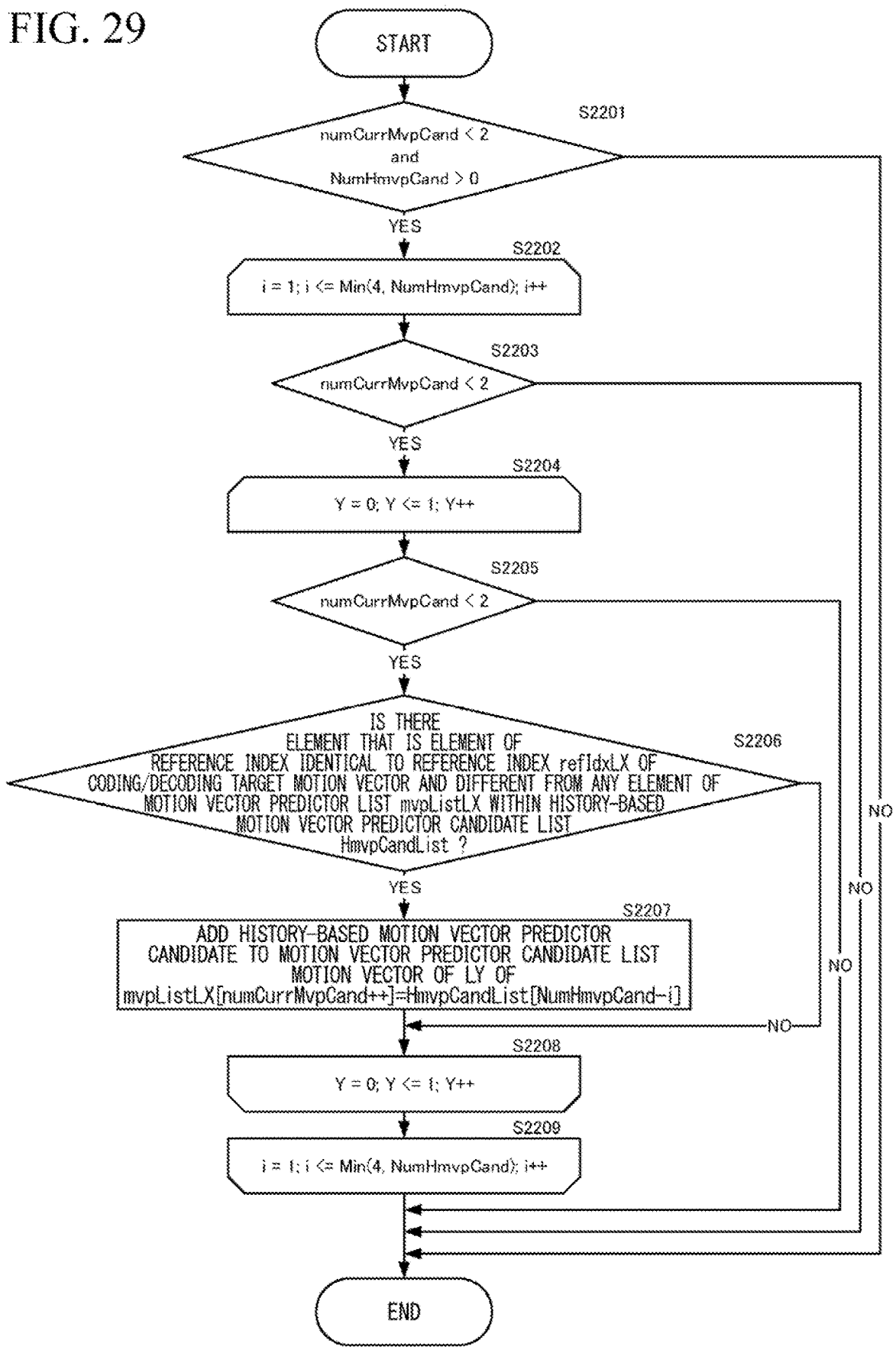
FIG. 29 is an explanatory flowchart showing a history-based motion vector predictor candidate derivation processing procedure.

Next, a method of deriving a history-based motion vector predictor candidate from the history-based motion vector predictor candidate list HmvpCandList, which is a processing procedure of step S304 of FIG. 20 that is a process common to the history-based motion vector predictor candidate derivation unit 323 of the normal motion vector predictor mode derivation unit 301 of the coding side and the history-based motion vector predictor candidate derivation unit 423 of the normal motion vector predictor mode derivation unit 401 of the decoding side, will be described in detail. FIG. 29 is an explanatory flowchart showing a history-based motion vector predictor candidate derivation processing procedure.

When the current number of motion vector predictor candidates numCurrMvpCand is greater than or equal to the maximum number of elements in the motion vector predictor candidate list mvpListLX (here, 2) or a value of the number of history-based motion vector predictor candidates NumHmvpCand is 0 (NO in step S2201 of FIG. 29), the processing of steps S2202 to S2209 of FIG. 29 is omitted, and the history-based motion vector predictor candidate derivation processing procedure ends. When the current number of motion vector predictor candidates numCurrMvpCand is smaller than 2, which is the maximum number of elements of the motion vector predictor candidate list mvpListLX, and the value of the number of history-based motion vector predictor candidates NumHmvpCand is greater than 0 (YES in step S2201 of FIG. 29), the processing of steps S2202 to S2209 of FIG. 29 is performed.

Subsequently, the processing of steps S2203 to S2208 of FIG. 29 is iterated until the index i changes from 1 to a smaller value of 4 and the number of history-based motion vector predictor candidates numCheckedHMVPCand (steps S2202 to S2209 of FIG. 29). When the current number of motion vector predictor candidates numCurrMvpCand is greater than or equal to 2, which is the maximum number of elements of the motion vector predictor candidate list mvpListLX (step S2203 of FIG. 29: NO), the processing of steps S2204 to S2209 in FIG. 29 is omitted, and the present history-based motion vector predictor candidate derivation processing procedure ends. When the current number of motion vector predictor candidates numCurrMvpCand is smaller than 2, which is the maximum number of elements of the motion vector predictor candidate list mvpListLX (step S2203 of FIG. 29: YES), the processing from step S2204 of FIG. 29 is performed.

Subsequently, the processing of steps S2205 to S2207 is performed for Y=0 and 1 (L0 and L1)(steps S2204 to S2208 of FIG. 29). When the current number of motion vector predictor candidates numCurrMvpCand is greater than or equal to 2, which is the maximum number of elements of the motion vector predictor candidate list mvpListLX (step S2205 of FIG. 29: NO the processing of steps S2206 to S2209 of FIG. 29 is omitted, and the present history-based motion vector predictor candidate derivation processing procedure ends. When the current number of motion vector predictor candidates numCurrMvpCand is smaller than 2, which is the maximum number of elements of the motion vector predictor candidate list mvpListLX (step S2205 of FIG. 29: YES), the processing from step S2206 of FIG. 29 is performed.

Subsequently, in the case of an element that has a reference index identical to the reference index refIdxLX of a coding/decoding target motion vector and that is different from any element of the motion vector predictor list mvpListLX within the history-based motion vector predictor candidate list HmvpCandList (YES in step S2206 of FIG. 29), the motion vector of LY of the history-based motion vector predictor candidate HmvpCandList[NumHmvp-Cand−i] is added to a numCurrMvpCand$^{th}$ element mvpListLX[numCurrMvpCand] when counted from a 0$^{th}$ element of the motion vector predictor candidate list (step S2207 of FIG. 29), and the current number of motion vector predictor candidates numCurrMvpCand is incremented by one. When there is no element that has a reference index identical to the reference index refIdxLX of a coding/decoding target motion vector and that is different from any element of the motion vector predictor list mvpListLX within the history-based motion vector predictor candidate list HmvpCandList (NO in step S2206 of FIG. 29), the additional processing of step S2207 is skipped.

The above processing of steps S2205 to S2207 of FIG. 29 is performed for both L0 and L1 (steps S2204 to S2208 of FIG. 29). When the index i is incremented by 1 and the index i is less than or equal to a smaller value of 4 and the number of history-based motion vector predictor candidates NumHmvpCand, the processing from step S2203 is performed again (steps S2202 to S2209 of FIG. 29).

<History-Based Merging Candidate Derivation Process>

Figure 30:
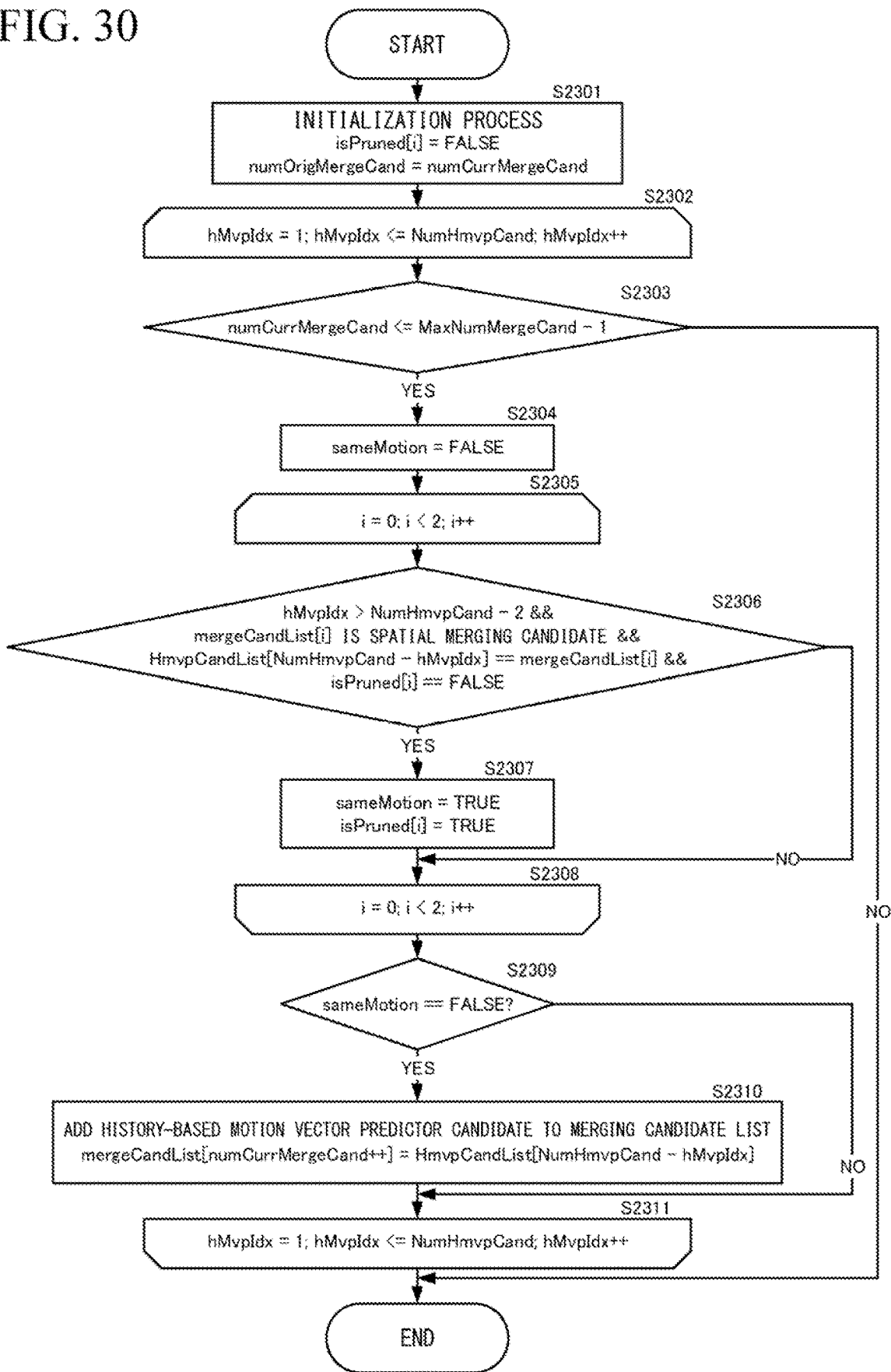
FIG. 30 is an explanatory flowchart showing a history-based merging candidate derivation processing procedure.

Next, a method of deriving history-based merging candidates from the history-based merging candidate list Hmvp-CandList, which is the processing procedure of step S404 of FIG. 21 which is a process common to the history-based merging candidate derivation unit 345 of the normal merge mode derivation unit 302 of the coding side and the history-based merging candidate derivation unit 445 of the normal merge mode derivation unit 402 of the decoding side, will be described in detail. FIG. 30 is an explanatory flowchart showing the history-based merging candidate derivation processing procedure.

First, an initialization process is performed (step S2301 of FIG. 30). Each (numCurrMergeCand−1)$^{th}$ element from 0 of isPruned[i] is set to a value of FALSE, and a variable numOrigMergeCand is set to the number of elements num-CurrMergeCand registered in the current merging candidate list.

Subsequently, the initial value of the index hMvpIdx is set to 1, and an addition process of steps S2303 to S2310 of FIG. 30 is iterated until the index hMvpIdx changes from the initial value to NumHmvpCand (steps S2302 to S2311 of FIG. 30). If the number of elements numCurrMergeCand registered in the current merging candidate list is not smaller than or equal to (the maximum number of merging candidates MaxNumMergeCand−1), merging candidates are added to all elements of the merging candidate list, so that the present history-based merging candidate derivation process ends (NO in step S2303 of FIG. 30). When the number of elements numCurrMergeCand registered in the current merging candidate list is smaller than or equal to (the maximum number of merging candidates MaxNumMergeCand−1) (YES in step S2303 of FIG. 30), the processing from step S2304 is performed.

First, a value of FALSE is set in sameMotion (step S2304 in FIG. 30). Subsequently, the initial value of the index i is set to 0, and the processing of steps S2306 and S2307 of FIG. 30 is performed from this initial value to 1 (S2305 to S2308 of FIG. 30).

Next, a comparison is made regarding whether or not a (NumHmvpCand-hMvpIdx)$^{th}$ element HmvpCandList [NumHmvpCand-hMvpIdx] when counted from 0 of the history-based motion vector predictor candidate list is the same as an i$^{th}$ element mergeCandList[i] when counted from 0 of the merging candidate list (step S2306 in FIG. 30). Here, the fact that the values of the merging candidates are the same indicates that values of all components (an inter prediction mode, a reference index, and a motion vector) of the merging candidates are the same. However, the processing of step S2306 is limited to a case in which hMvpIdx is larger than NumHmvpCand−2, mergeCandList[i] is a spatial merging candidate, and isPruned[i] is FALSE. If the values are the same (YES in step S2306 of FIG. 30), TRUE is set for both sameMotion and isPruned[i] (step S2307 of FIG. 30). If the values are not the same (NO in step S2306 of FIG. 30), the processing of step S2307 is skipped. When the iterative processing of steps S2305 to S2308 of FIG. 30 is completed, a comparison is made regarding whether or not sameMotion is FALSE (step S2309 in FIG. 30), a (NumHmvpCand-hMvpIdx)$^{th}$ element HmvpCandList [NumHmvpCand-hMvpIdx] when counted from 0 of the history-based motion vector predictor candidate list is added to a numCurrMergeCand$^{th}$ element mergeCandList[numCurrMergeCand] of the merging candidate list when sameMotion is FALSE (YES in step S2309 in FIG. 30), and numCurrMergeCand is incremented by 1 (step S2310 of FIG. 30). The index hMvpIdx is incremented by 1 (step S2302 in FIG. 30), and the iterative processing of steps S2302 to S2311 of FIG. 30 is performed.

When the checking of all elements of the history-based motion vector predictor candidate list is completed or when merging candidates are added to all elements of the merging candidate list, the present history-based merging candidate derivation process is completed.

<Motion-Compensated Prediction Process>

The motion-compensated prediction unit 306 acquires a position and a size of a block that is a current target of a prediction process in coding. Also, the motion-compensated prediction unit 306 acquires inter prediction information from the inter prediction mode determination unit 305. A reference index and a motion vector are derived from the acquired inter prediction information, and a prediction signal is generated after a picture signal of a position to which a reference picture identified by the reference index within the decoded picture memory 104 is moved from a position identical to that of a picture signal of a prediction block by an amount of motion vector is acquired.

A motion-compensated prediction signal is supplied to a prediction method determination unit 105 using a prediction signal acquired from one reference picture as a motion-compensated prediction signal when the inter prediction mode in the inter prediction is prediction from a single reference picture such as L0-prediction or L1-prediction and using a prediction signal obtained by weighted-averaging prediction signals acquired from two reference pictures as a motion-compensated prediction signal when the prediction mode is prediction from two reference pictures such as an inter prediction mode of Bi-prediction. Although a weighted average ratio of bi-prediction is 1:1 here, a weighted average may be performed using another ratio. For example, a weighting ratio may increase as the picture interval between a picture, which is a prediction target, and a reference picture decreases. Also, the weighting ratio may be calculated using a corresponding table between combinations of picture intervals and weighting ratios.

The motion-compensated prediction unit 406 has a function similar to that of the motion-compensated prediction unit 306 of the coding side. The motion-compensated prediction unit 406 acquires inter prediction information from the normal motion vector predictor mode derivation unit 401, the normal merge mode derivation unit 402, the sub-block-based motion vector predictor mode derivation unit 403, and the subblock-based merge mode derivation unit 404 via the switch 408. The motion-compensated prediction unit 406 supplies an obtained motion-compensated prediction signal to the decoding picture signal superimposition unit 207.

<About Inter Prediction Mode>

A process of performing prediction from a single reference picture is defined as uni-prediction. In the case of uni-prediction, prediction using either one of two reference pictures registered in reference lists L0 and L1 such as L0-prediction or L1-prediction is performed.

Figure 32:
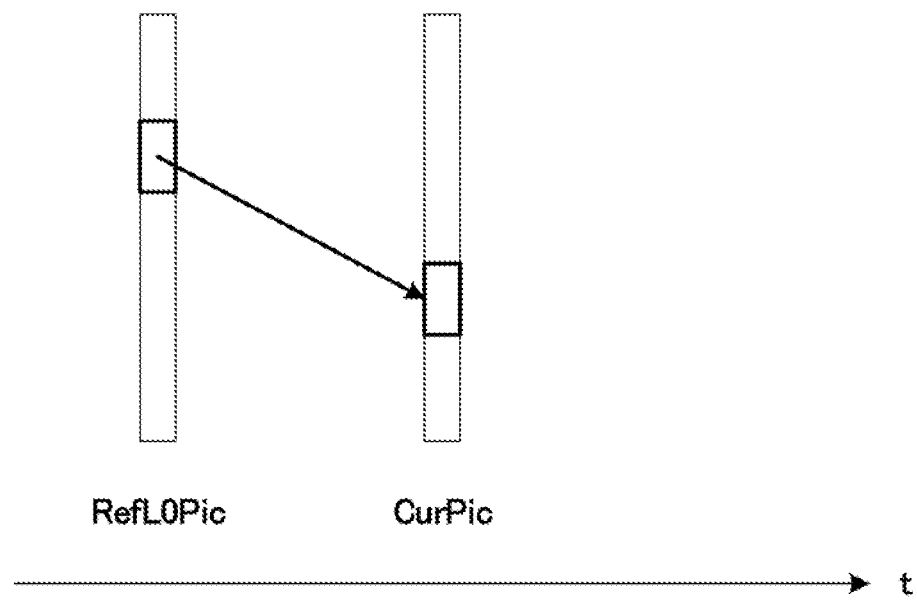
FIG. 32 is an explanatory diagram showing motion-compensated prediction when a clock time of a reference picture (RefL0Pic) of L0 is earlier than that of a target picture (CurPic) as L0-prediction.
Figure 33:
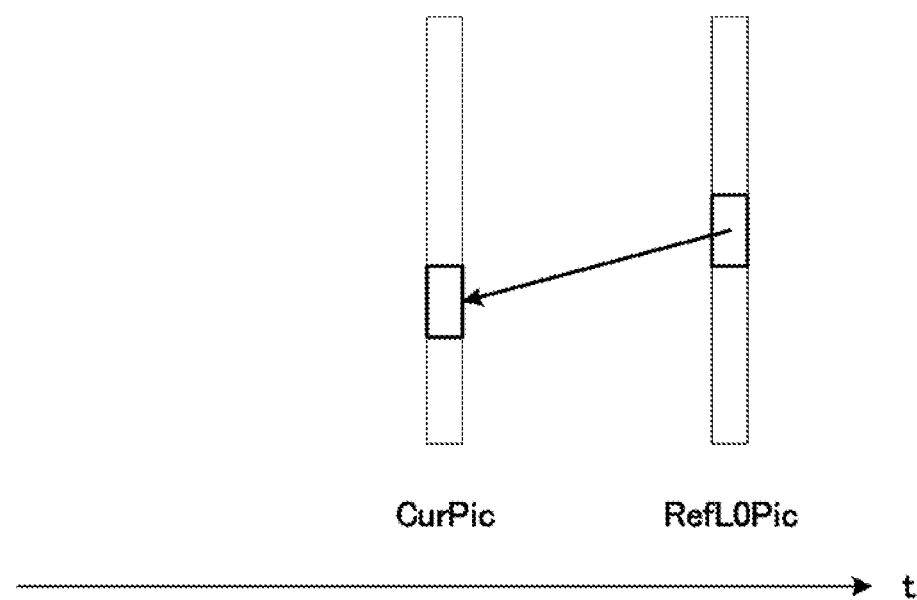
FIG. 33 is an explanatory diagram showing motion-compensated prediction when a clock time of a reference picture of L0-prediction is later than that of a target picture as L0-prediction.

FIG. 32 shows the case of uni-prediction in which a clock time of a reference picture (RefL0Pic) of L0 is earlier than that of a target picture (CurPic). FIG. 33 shows the case of uni-prediction in which a clock time of a reference picture of the L0-prediction is later than that of a target picture. Likewise, the reference picture of L0-prediction of FIGS. 32 and 33 can be replaced with a reference picture (RefL1Pic) of L1-prediction to perform uni-prediction.

Figure 34:
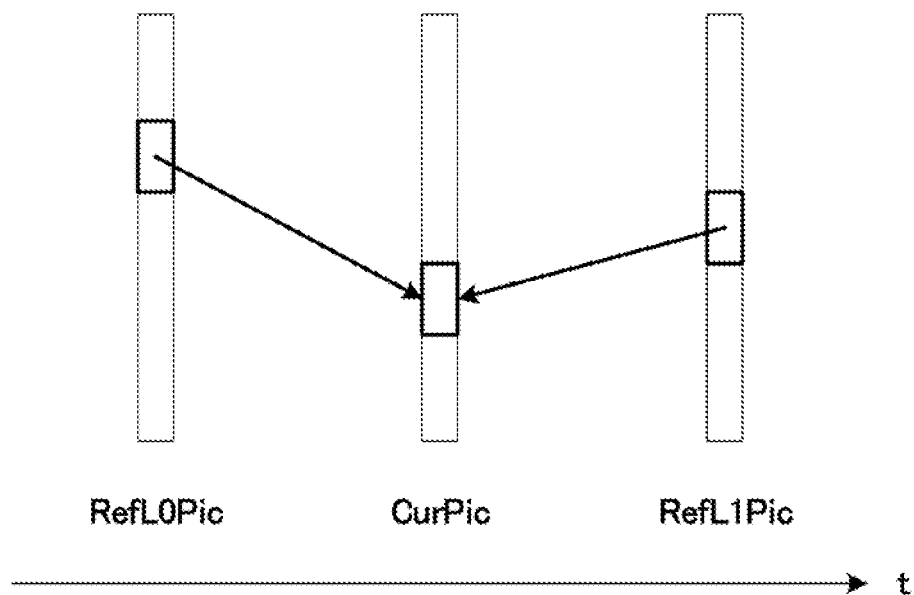
FIG. 34 is an explanatory diagram showing a prediction direction of motion-compensated prediction when a clock time of a reference picture of L0-prediction is earlier than that of a target picture and a clock time of a reference picture of L1-prediction is later than that of a target picture as bi-prediction.
Figure 35:
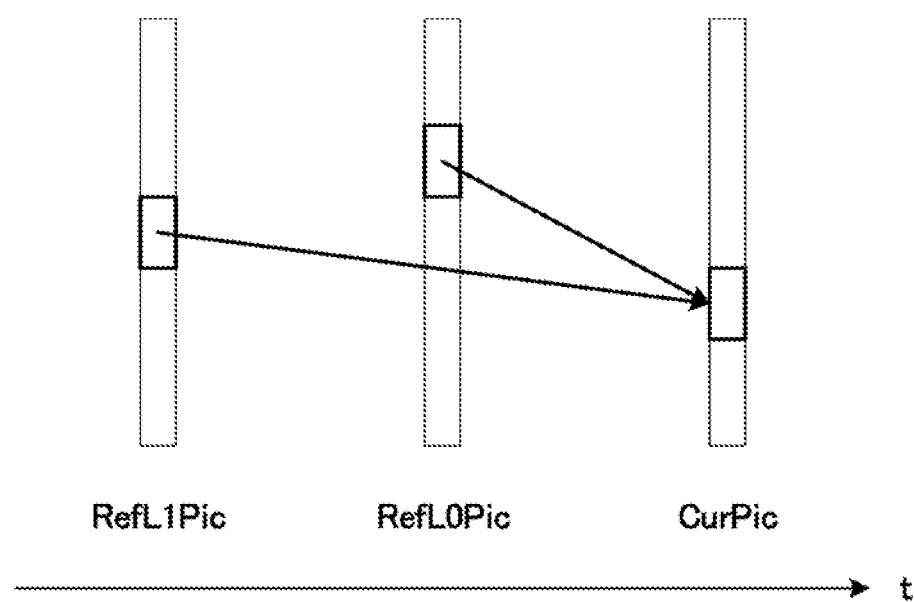
FIG. 35 is an explanatory diagram showing a prediction direction of motion-compensated prediction when a clock time of a reference picture of L0-prediction and a clock time of a reference picture of L1-prediction are earlier than that of a target picture as bi-prediction.
Figure 36:
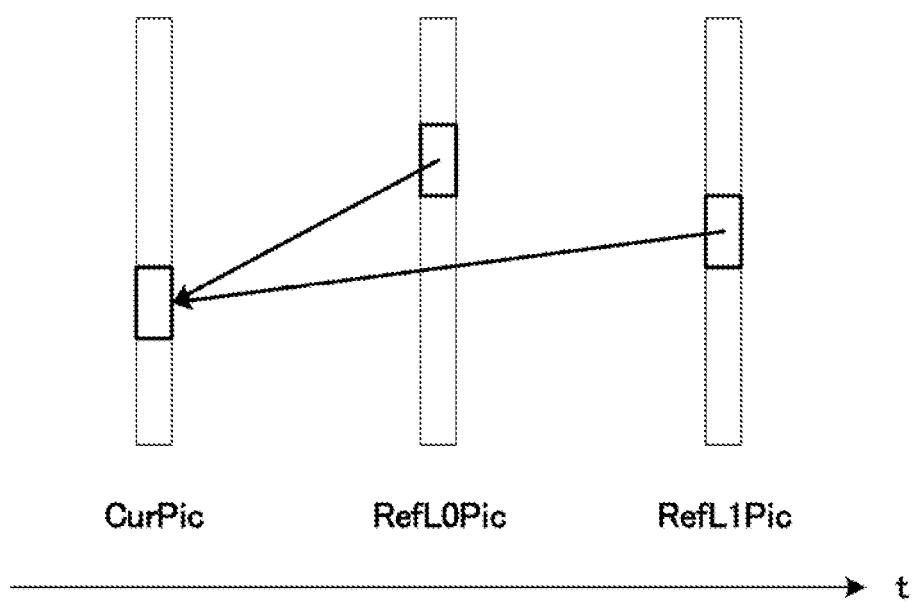
FIG. 36 is an explanatory diagram showing a prediction direction of motion-compensated prediction when a clock time of a reference picture of L0-prediction and a clock time of a reference picture of L1-prediction are later than that of a target picture as bi-prediction.

The process of performing prediction from two reference pictures is defined as bi-prediction, and the bi-prediction is represented as Bi-prediction using both L0-prediction and L1-prediction. FIG. 34 shows the case of bi-prediction in which a clock time of a reference picture of L0-prediction is earlier than that of a target picture and a clock time of a reference picture of L1-prediction is later than that of the target picture. FIG. 35 shows the case of bi-prediction in which clock times of the reference picture of L0-prediction and the reference picture of L1-prediction are earlier than that of a target picture. FIG. 36 shows the case of bi-prediction in which a clock time of a reference picture of L0-prediction and a clock time of a reference picture of L1-prediction are later than that of a target picture.

As described above, a relationship between a type of prediction of L0/L1 and time can be used without being limited to L0 which is in the past direction and L1 which is in the future direction. In the case of bi-prediction, each of L0-prediction and L1-prediction may be performed using the same reference picture. Also, it is determined whether to perform motion-compensated prediction according to uni-prediction or bi-prediction on the basis of, for example, information (for example, a flag) indicating whether to use L0-prediction and whether to use L1-prediction.

<About Reference Index>

In the embodiment of the present invention, it is possible to select an optimum reference picture from a plurality of reference pictures in motion-compensated prediction to improve the accuracy of motion-compensated prediction. Thus, the reference picture used in the motion-compensated prediction is used as a reference index, and the reference index is coded in the bitstream together with the motion vector difference.

<Motion Compensation Process Based on Normal Motion Vector Predictor Mode>

As shown in the inter prediction unit 102 of the coding side of FIG. 16, when inter prediction information from the normal motion vector predictor mode derivation unit 301 has been selected in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 of the decoding side of FIG. 22, when the switch 408 has been connected to the normal motion vector predictor mode derivation unit 401 in the decoding process, the motion-compensated prediction unit 406 acquires inter prediction information from the normal motion vector predictor mode derivation unit 401, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Normal Merge Mode>

Also, as shown in the inter prediction unit 102 in the coding side of FIG. 16, when inter prediction information has been selected from the normal merge mode derivation unit 302 in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 in the decoding side of FIG. 22, when the switch 408 has been connected to the normal merge mode derivation unit 402 in the decoding process, the motion-compensated prediction unit 406 acquires inter prediction information from the normal merge mode derivation unit 402, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Subblock-Based Motion Vector Predictor Mode>

Also, as shown in the inter prediction unit 102 on the coding side of FIG. 16, when inter prediction information from the subblock-based motion vector predictor mode derivation unit 303 has been selected in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 in the decoding side of FIG. 22, when the switch 408 has been connected to the subblock-based motion vector predictor mode derivation unit 403 in the decoding process, the motion-compensated prediction unit 406 acquires inter prediction information from the subblock-based motion vector predictor mode derivation unit 403, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Subblock-Based Merge Mode>

Also, as shown in the inter prediction unit 102 on the coding side of FIG. 16, when inter prediction information from the subblock-based merge mode derivation unit 304 has been selected in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 in the decoding side of FIG. 22, when the switch 408 has been connected to the subblock-based merge mode derivation unit 404 in the decoding process, the motion-compensated prediction unit 406 acquires inter prediction information from the subblock-based merge mode derivation unit 404, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Affine Transform Prediction>

In the normal motion vector predictor mode and the normal merge mode, motion compensation of an affine model can be used on the basis of the following flags. The following flags are reflected in the following flags on the basis of inter prediction conditions determined by the inter prediction mode determination unit 305 in the coding process and are coded in a bitstream. In the decoding process, it is determined whether to perform the motion compensation of the affine model on the basis of the following flags in the bitstream.

sps_affine_enabled_flag represents whether or not motion compensation of the affine model can be used in inter prediction. If sps_affine_enabled_flag is 0, suppression is performed so that it is not motion compensation of an affine model in units of sequences. Also, inter_affine_flag and cu_affine_type_flag are not transmitted in CU (coding block) syntax of a coding video sequence. If sps_affine_enabled_flag is 1, motion compensation of an affine model can be used in a coding video sequence.

sps_affine_type_flag represents whether or not motion compensation of a six-parameter affine model can be used in inter prediction. If sps_affine_type_flag is 0, suppression is performed so that it is not motion compensation of the six-parameter affine model. Also, cu_affine_type_flag is not transmitted in CU syntax of a coding video sequence. If sps_affine_type_flag is 1, motion compensation of the six-parameter affine model can be used in the coding video sequence. When sps_affine_type_flag does not exist, it is assumed to be 0.

When a P or B slice is decoded, if inter_affine_flag is 1 in the current target CU, motion compensation of the affine model is used to generate a motion-compensated prediction signal of the current target CU. If inter_affine_flag is 0, the affine model is not used in the current target CU. When inter_affine_flag does not exist, it is assumed to be 0.

When a P or B slice is decoded, if cu_affine_type_flag is 1 in the current target CU, motion compensation of a six-parameter affine model is used to generate a motion-compensated prediction signal of the current target CU. If cu_affine_type_flag is 0, motion compensation of a four-parameter affine model is used to generate a motion-compensated prediction signal of the current target CU.

In motion compensation of an affine model, because a reference index and a motion vector are derived in units of subblocks, a motion-compensated prediction signal is generated using a reference index or a motion vector which is a target in units of subblocks.

A four-parameter affine model is a mode in which the motion vector of the subblock is derived from four parameters of horizontal components and vertical components of motion vectors of the two control points and motion compensation is performed in units of subblocks.

In the present embodiment, reference order when the history-based motion vector predictor candidate list is used may be further configured to be reverse order, which is the reverse of storage order. Here, when the motion information is stored from the end side of the history-based motion vector predictor candidate list and the motion information is sequentially stored so that the motion information at the beginning side of the history-based motion vector predictor candidate list is arranged to be older than that at the end side thereof, the storage state is similar to that of the present embodiment. Also, when the motion information is sequentially stored so that the motion information at the beginning side of the history-based motion vector predictor candidate list is arranged to be newer than that at the end side thereof, the storage state is a reverse storage state, which is the reverse of the storage state shown in the present embodiment. In the case of the above-described reverse storage state, the reference order is set as the reverse of storage order, so that, when reference content as shown in the present embodiment, i.e., the history-based motion vector predictor candidate list, is referred to, it is possible to refer to motion information in order from oldest motion information to newly added motion information. Furthermore, a configuration in which a case in which the reference order is used as an order having the same direction as the storage order and a case in which the reference order is used as an order having a direction opposite to the storage order are distinguished when the history-based motion vector predictor candidate list is used may be adopted. That is, a configuration in which a case in which the motion information stored in the history-based motion vector predictor candidate list can be referred to in order from oldest motion information to newly added motion information and a case in which the motion information stored in the history-based motion vector predictor candidate list can be referred to in order from newly added motion information to oldest motion information are distinguished when the history-based motion vector predictor candidate list is used may be adopted.

Also, a configuration in which a process of retrieving an element having the same information from the history-based motion vector predictor candidate list and removing the retrieved element is not performed when a new element is added to the history-based motion vector predictor candidate list may be adopted.

Further, a configuration in which a process of retrieving an element having the same information from the history-based motion vector predictor candidate list and preventing the element having the same information from being set as a normal motion vector predictor candidate is not performed when the normal motion vector predictor candidate is derived using the history-based motion vector predictor candidate list HmvpCandList in the normal motion vector predictor mode may be adopted.

<History-Based Motion Vector Predictor Candidate List>

Here, a configuration and an operation of the history-based motion vector predictor candidate list will be described.

Figure 41:
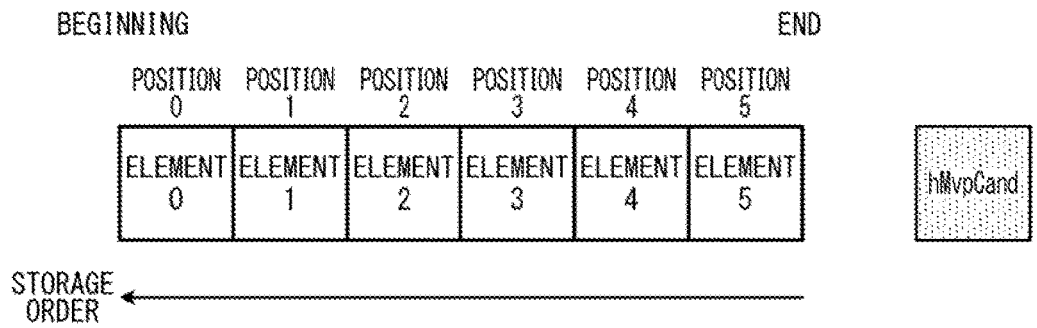
FIG. 41 is an explanatory diagram showing a configuration of a history-based motion vector predictor candidate list.

As shown in FIG. 41, the inter prediction information used in inter prediction in a coding target block is set as an inter prediction information candidate hMvpCand to be registered, and the inter prediction information is registered in a history-based motion vector predictor candidate list HmvpCandList as a history used in the past. In FIG. 41, the history-based motion vector predictor candidate list has a list structure capable of storing six elements, and a first-in first-out (FIFO) scheme in which the elements are extracted in order from a previously stored element is used as a basic storage operation.

Here, although an example in which the maximum number of elements capable of being stored in HmvpCandList is six as an agreement between the coding side and the decoding side will be described, the maximum number is not particularly limited and may be six or more. Also, the maximum number of elements capable of being stored in HmvpCandList may be configured to be five or less. For example, HmvpCandList may be configured with the maximum number of elements equivalent to the maximum number of elements of inter prediction information candidates such as the maximum number of elements of the motion vector predictor candidate list mvpListLX the maximum number of merging candidates, and the maximum number of subblock-based merging candidates. Also, HmvpCandList may be configured in cooperation with the maximum number of elements of inter prediction information candidates in each mode.

A configuration in which the maximum number of elements of HmvpCandList is included in a syntax element of a bitstream and therefore is delivered from the coding side to the decoding side may be adopted.

As shown in FIG. 41, HmvpCandList can store six elements from position 0, which is the beginning of the list, to position 5, which is the end of the list, and can embed elements from position 0 to position 5. These positions 0 to 5 are managed as history-based motion vector predictor indices hMvpIdx. For example, position 0 can be expressed as hMVpIdx[0] and position 5 can be expressed as hMVpIdx[5]. The number of storage elements of HmvpCandList is managed by NumHmvpCand, and the increase/decrease in the number of storage elements is managed in the range of 0 to 6, which is the maximum number of elements.

Figure 42:
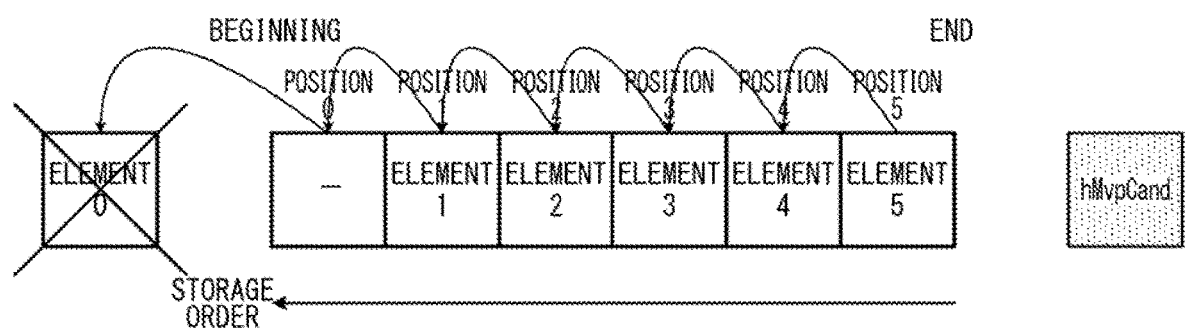
FIG. 42 is an explanatory diagram showing a state in which an element at the beginning of the history-based motion vector predictor candidate list is removed at the time of addition to the history-based motion vector predictor candidate list.
Figure 43:
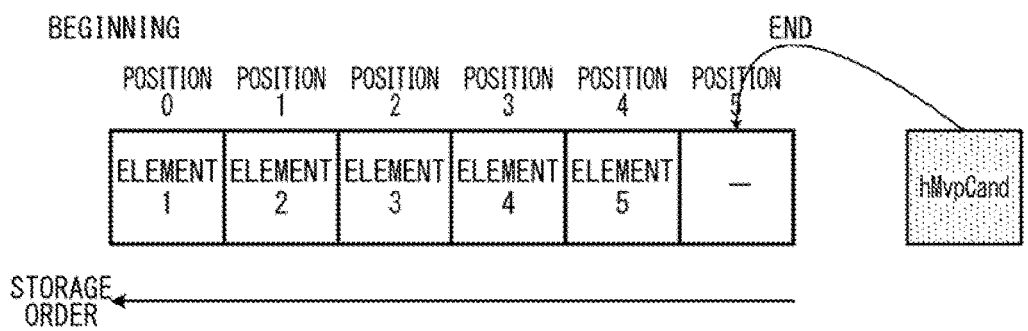
FIG. 43 is an explanatory diagram showing a state in which each element is shifted within the history-based motion vector predictor candidate list at the time of addition to the history-based motion vector predictor candidate list.
Figure 44:
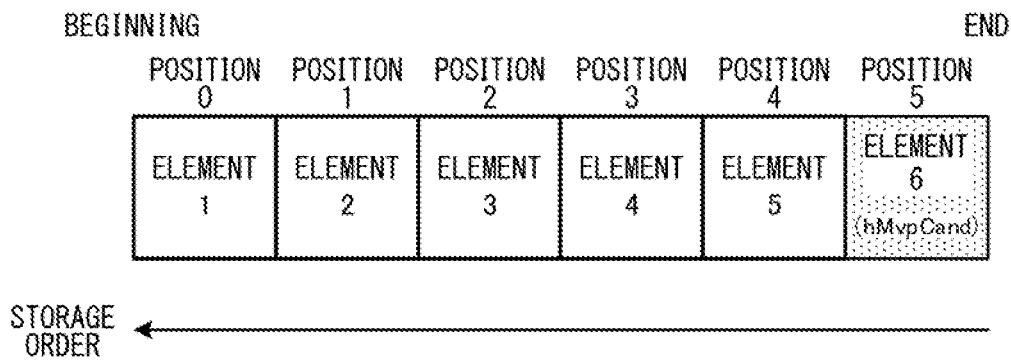
FIG. 44 is an explanatory diagram showing a state in which a new element is added at the time of addition to the history-based motion vector predictor candidate list.

A case in which a new element is added from the end side in a state in which a maximum number of elements are stored in HmvpCandList will be described. As shown in FIG. 42, when the inter prediction information candidate hMvpCand is intended to be newly registered as a history, the element at position 0, which is the beginning, is removed, and the positions of respective elements are shifted one by one in a beginning direction. As a result of the shift, the number of storage elements is decremented by one as shown in FIG. 43, and therefore a new element can be stored at position 5 of the end. Therefore, a new element is added to HmvpCandList as shown in FIG. 44 by storing the inter prediction information candidate hMvpCand at position 5 of the end.

Modified Example (Part 1)

As a modified example of the first embodiment, a configuration in which a process is performed on the history-based motion vector predictor candidate list as shown below is adopted.
<Identical Candidate Retrieval in the History-Based Motion Vector Predictor Candidate List>

Figure 45:
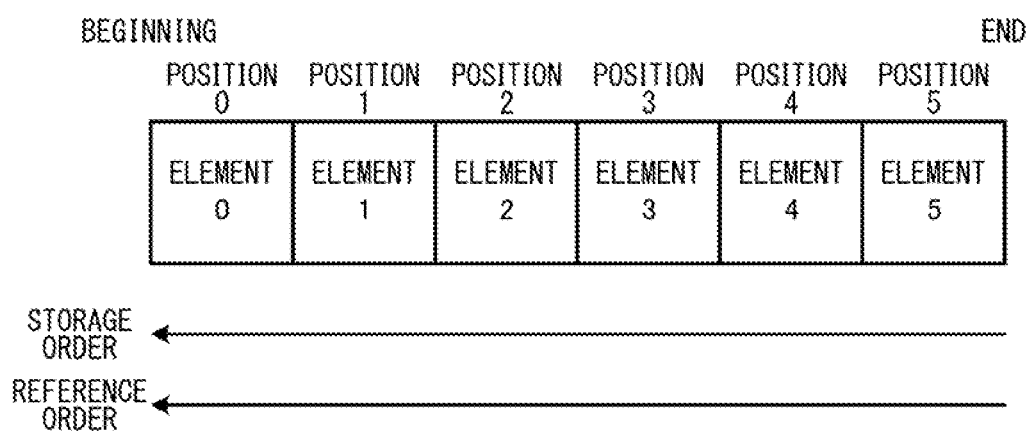
FIG. 45 is a diagram for describing reference order of the history-based motion vector predictor candidate list.
Figure 46:
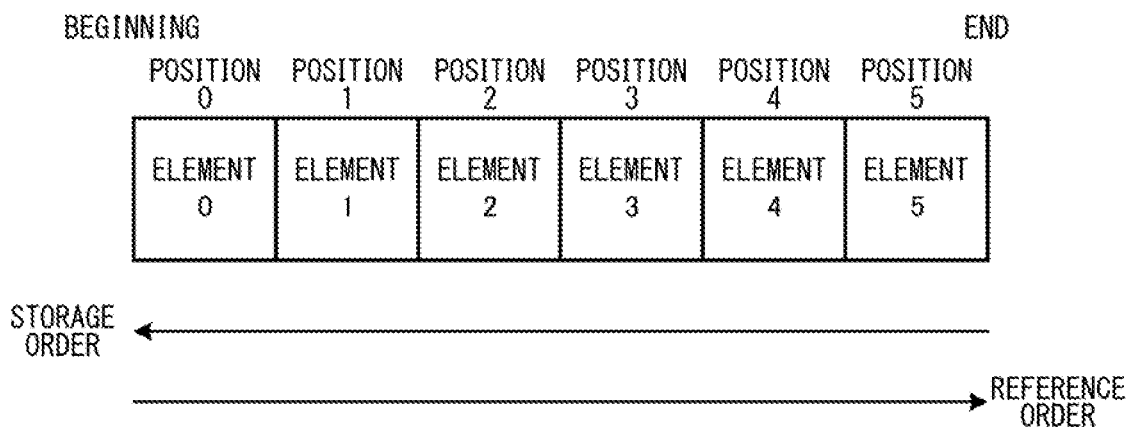
FIG. 46 is a diagram for describing reference order of the history-based motion vector predictor candidate list.

When the history-based motion vector predictor candidate list HmvpCandList is used in the reference order as shown in FIG. 45, an element (inter prediction information) is removed from the history-based motion vector predictor candidate list HmvpCandList when there is inter prediction having the same value as an inter prediction information candidate hMvpCand to be registered within the inter prediction information registered in the history-based motion vector predictor candidate list HmvpCandList. A process of removing an identical candidate is hereafter referred to as an identical candidate removal process. A configuration in which the identical candidate removal process is not performed when an element is added to the history-based motion vector predictor candidate list HmvpCandList is adopted. Also, a configuration is adopted in which the identical candidate removal process is not performed when the history-based motion vector predictor candidate list HmvpCandList is used with reference in reverse order, which is the reverse of storage order in which a new element is added to the end of the history-based motion vector predictor candidate list as shown in FIG. 46.

Figure 38:
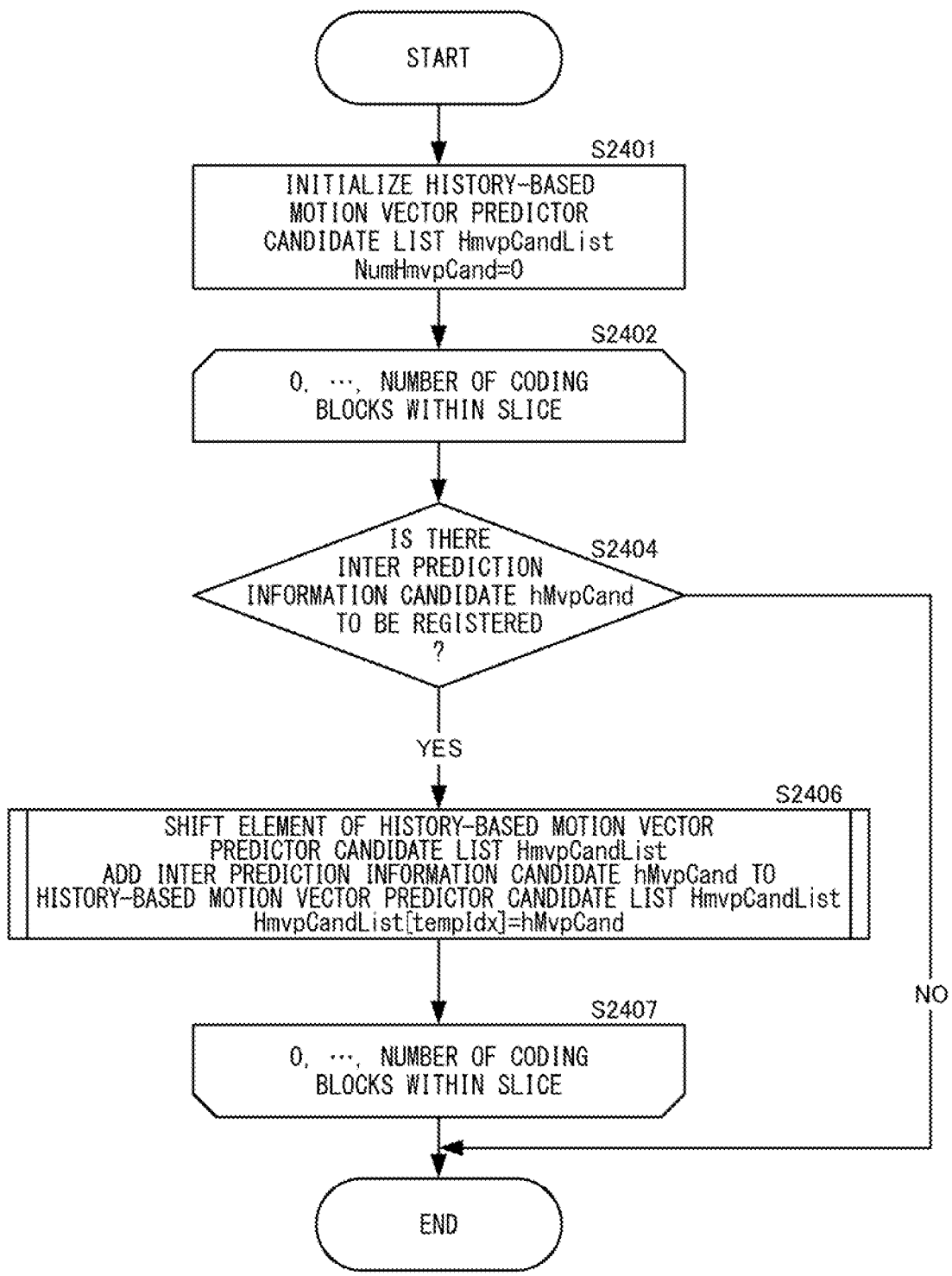
FIG. 38 is a flowchart for describing a history-based motion vector predictor candidate derivation processing procedure in the case of a configuration in which an identical candidate removal process is not performed, and a history-based motion vector predictor candidate list is used with reference to motion information in order from oldest motion information to newly added motion information.

FIG. 38 is a flowchart for describing a history-based motion vector predictor candidate derivation processing procedure in the case of a configuration in which reference is performed in reverse order, which is the reverse of storage order in which motion information is added from the end side, motion information is used, which is a history-based motion vector predictor candidate stored in the history-based motion vector predictor candidate list HmvpCandList with reference in order from oldest motion information to newly added motion information, and an identical candidate removal process is not performed.

The inter prediction information used when inter prediction is performed in the normal prediction vector mode or the normal merge mode is set as inter prediction information candidates hMvpCand to be registered, and the inter prediction information candidates hMvpCand to be registered are added in order from an empty position nearest to the beginning side regardless of whether or not there is inter prediction having the same value as the inter prediction information candidate hMvpCand to be registered within inter prediction information registered in the history-based motion vector predictor candidate list HmvpCandList provided in the coding information storage memory 111 of the coding side and the coding information storage memory 205 of the decoding side. When HmvpCandList is filled until the maximum number of elements is reached, an element (inter prediction information) at the beginning of the history-based motion vector predictor candidate list HmvpCandList is removed, and the inter prediction information candidate hMvpCand to be registered is added at the end of the history-based motion vector predictor candidate list HmvpCandList. The number of elements of the history-based motion vector predictor candidate list HmvpCandList provided in the coding information storage memory 111 of the coding side and the coding information storage memory 205 of the decoding side of the present embodiment is assumed to be 6. First, the initial setting is performed in units of slices. The history-based motion vector predictor candidate list HmvpCandList is initialized at the beginning of the slice, and a value of the number of history-based motion vector predictor candidates NumHmvpCand registered in the history-based motion vector predictor candidate list HmvpCandList is set to 0 (step S2401 of FIG. 38).

Subsequently, a process of updating the history-based motion vector predictor candidate list HmvpCandList for each coding block within the slice is iteratively performed (steps S2402 to S2407 of FIG. 38). It is determined whether or not there is an inter prediction information candidate hMvpCand which is a registration target in the history-based motion vector predictor candidate list HmvpCandList (step S2404 in FIG. 38). When the prediction method determination unit 105 of the coding side determines that the mode is the normal motion vector predictor mode or the normal merge mode or when the bit strings decoding unit of the decoding side has performed decoding in the normal motion vector predictor mode or the normal merge mode, the inter prediction mode is assumed to be hMvpCand. When the prediction method determination unit 105 of the coding side determines that the mode is the intra prediction mode, the subblock-based motion vector predictor mode, or the subblock-based merge mode, or when the bit strings decoding unit of the decoding side has performed decoding in the intra prediction mode, the subblock-based motion vector predictor mode, or the subblock-based merge mode, there is no inter prediction information candidate hMvpCand which is a registration target without performing the process of updating the history-based motion vector predictor candidate list HmvpCandList. When there is no inter prediction information candidate hMvpCand which is a registration target, step S2406 is skipped (step S2404 of FIG. 38: NO). When there is an inter prediction information candidate hMvpCand which is a registration target, the processing from step S2406 is performed (step S2404 of FIG. 38: YES).

Next, a process of shifting and adding an element of the history-based motion vector predictor candidate list HmvpCandList is performed (step S2406 of FIG. 38).

When the process as shown in FIG. 38 is performed, it is possible to omit a process of checking and removing an identical candidate and a variable setting or comparison process for executing the process, and to reduce an amount of processing.

Also, even if an identical candidate removal process is not performed with respect to the history-based motion vector predictor candidate list when an element is added to the history-based motion vector predictor candidate list HmvpCandList, it is possible to reduce a probability that an identical candidate will be added to the motion vector predictor candidate list by referring to motion information in order from oldest motion information to newly added motion information.

Modified Example (Part 2)

As a modified example of the first embodiment, a processing procedure of shifting and adding an element of the history-based motion vector predictor candidate list HmvpCandList in step S2406 of FIG. 38 is configured as follows.

Figure 39:
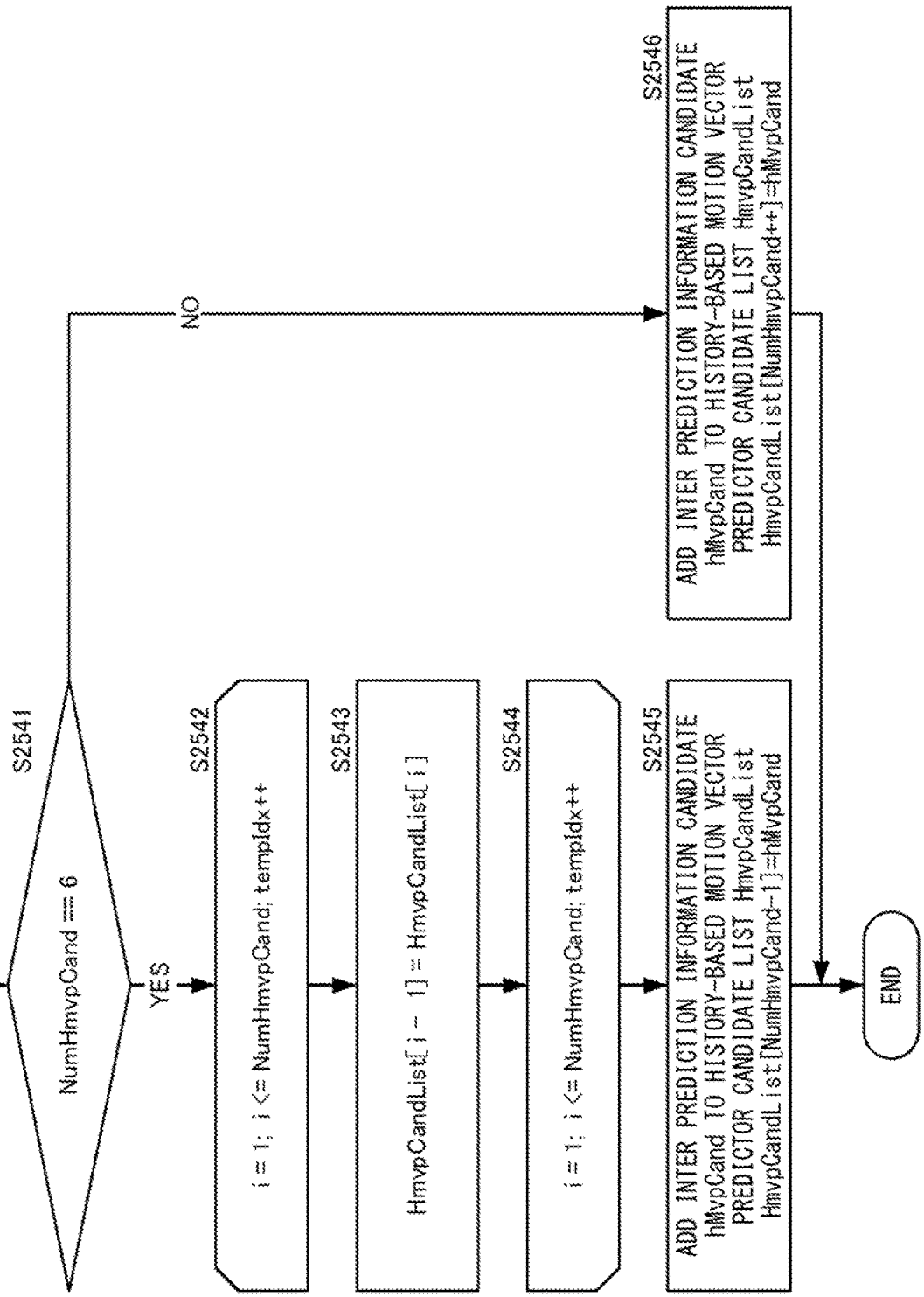
FIG. 39 is a flowchart of a processing procedure of shifting and adding an element of a history motion vector predictor candidate list.

FIG. 39 is a flowchart of the processing procedure of shifting and adding an element of the history-based motion vector predictor candidate list HmvpCandList in step S2406 of FIG. 38.

First, it is determined whether a new element is to be added after an element at the beginning stored in the history-based motion vector predictor candidate list HmvpCandList is removed or whether a new element is to be added without removing the element. Specifically, a comparison is made regarding whether or not NumHmvpCand is 6 (step S2541 of FIG. 39). When NumHmvpCand is 6 (step S2541 of FIG. 39: YES), a new element is to be added after an element at the beginning stored in the history-based motion vector predictor candidate list HmvpCandList is removed. The initial value of index i is set to a value of 1. The element shift process of step S2543 is iterated from this initial value to NumHmvpCand (steps S2542 to S2544 of FIG. 39). By copying elements of HmvpCandList[i] to HmvpCandList[i−1], the elements are shifted forward (step S2543 of FIG. 39) and i is incremented by 1 (steps S2542 and S2544 of FIG. 39). Subsequently, the inter prediction information candidate hMvpCand is added to a (NumHmvpCand−1)$^{th}$ element HmvpCandList[NumHmvpCand−1] when counted from 0, which corresponds to the end of the history-based motion vector predictor candidate list (step S2545 of FIG. 39), and a process of shifting and adding an element of the history-based motion vector predictor candidate list HmvpCandList ends. On the other hand, when NumHmvpCand is not 6 (step S2541 of FIG. 39: NO), a new element is added without removing the element stored in the history-based motion vector predictor candidate list HmvpCandList. The inter prediction information candidate hMvpCand is added to a (NumHmvpCand−1)$^{th}$ element HmvpCandList[NumHmvpCand] when counted from 0, which corresponds to the end of the history-based motion vector predictor candidate list, and NumHmvpCand is incremented by 1 (step S2546 of FIG. 39), and the process of shifting and adding an element of the history-based motion vector predictor candidate list HmvpCandList ends.

By performing the process as shown in FIG. 39, it is possible to omit a process of checking and removing an identical candidate and a variable setting or comparison process for executing the process, and to reduce an amount of processing.

Modified Example (Part 3)

In the present embodiment, a case of a configuration has been described in which an identical candidate removal process is not performed, the history-based motion vector predictor candidate list HmvpCandList is used with reference in reverse order, which is the reverse of storage order in which new motion information is added from the end side and using motion information is used, which is a history-based motion vector predictor candidate stored in HmvpCandList with reference in order from oldest motion information to newly added motion information.

In the modified example of the rust embodiment, a configuration is adopted in which a forward mode, in which reference from newly added motion information to old motion information is performed in a direction in which the reference order is the same as the storage order in which motion information is added from the end, and a reverse mode, in which reference from oldest motion information to newly added motion information is performed in a direction in which the reference order is the reverse of the storage order in which new motion information is added from the end side, are provided, and the mode is switched between the forward mode and the reverse mode using history reference flag information for switching the reference order of the history-based motion vector predictor candidate list HmvpCandList. A history reference flag of the history reference flag information is included in a syntax element of a bitstream and transmitted to the decoding side, and the decoding side is configured to be able to acquire and decode the bitstream including the history reference flag in the syntax element.

Second Embodiment

As a second embodiment, the following configuration is adopted when a motion vector predictor candidate list mvpListLX is derived. In particular, a configuration is adopted in which a process of determining whether or not an identical motion vector predictor is included in a motion vector predictor candidate list is not performed in a process of adding a motion vector predictor candidate from a history-based motion vector predictor candidate list to the motion vector predictor candidate list using the history-based motion vector predictor candidate list HmvpCandList with reference to information from the beginning in reverse order, which is the reverse of storage order, in which information is newly added from the end thereof when the motion vector predictor candidate list mvpListLX is derived.

Hereinafter, a history-based motion vector predictor candidate derivation process of the present embodiment will be described.

<History-Based Motion Vector Predictor Candidate Derivation Process that does not Involve Identical Candidate Removal Process>

Here, a history-based motion vector predictor candidate derivation process that does not involve an identical candidate removal process will be described.

Figure 47:
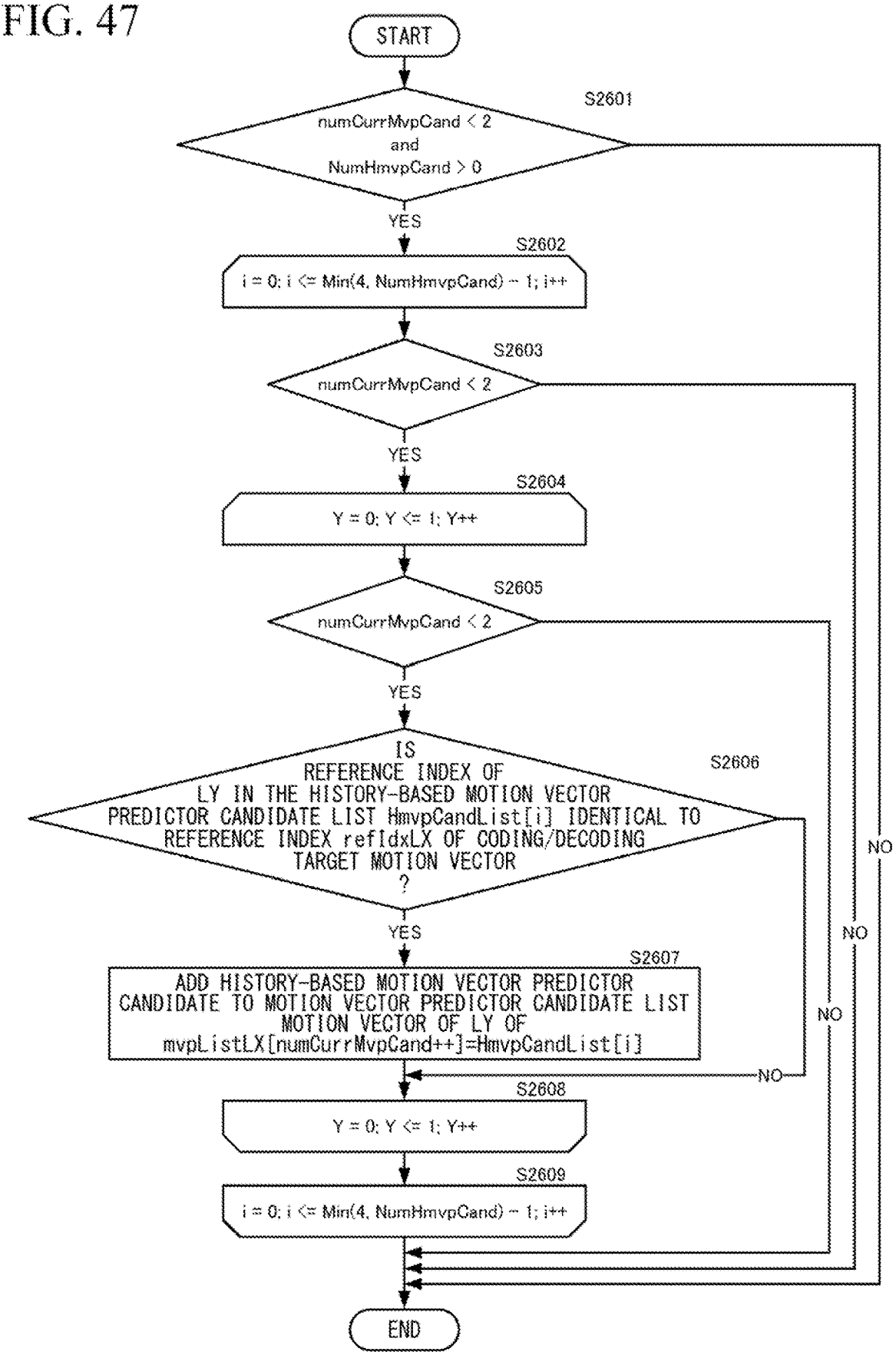
FIG. 47 is a flowchart for describing a history-based motion vector predictor candidate derivation processing procedure in the case of a configuration in which an identical candidate removal process is not performed, and a history-based motion vector predictor candidate list is used with reference in reverse order, which is the reverse of storage order.

FIG. 47 is a flowchart for describing a history-based motion vector predictor candidate derivation processing procedure in the case of a configuration in which the identical candidate removal process is not performed using the history-based motion vector predictor candidate list HmvpCandList with reference in reverse order, which is the reverse of storage order, when the motion vector predictor candidate list mvpListLX is derived.

When the current number of motion vector predictor candidates numCurrMvpCand is larger than or equal to the maximum number of elements (here, 2) in the motion vector predictor list mvpListLX or a value of the number of history-based motion vector predictor candidates NumHmvpCand is 0 (step S2601 of FIG. 47: NO), the processing of steps S2602 to S2609 of FIG. 47 is omitted, and the history-based motion vector predictor candidate derivation processing procedure ends. When the current number of motion vector predictor candidates numCurrMvpCand is smaller than 2, which is the maximum number of elements of the motion vector predictor list mvpListLX (step S2601 of FIG. 47: YES), the processing of steps S2602 to S2609 of FIG. 47 is performed.

Subsequently, the processing of steps S2603 to S2608 of FIG. 47 is iterated until the index i changes from 0 to a value obtained by subtracting 1 from a smaller value of between 4 and the number of history-based motion vector predictor candidates NumHmvpCand (steps S2602 to S2609 of FIG. 47). When the current number of motion vector predictor candidates numCurrMvpCand is larger than or equal to 2, which is the maximum number of elements of the motion vector predictor list mvpListLX (step S2603 of FIG. 47: NO), the processing of steps S2604 to S2609 of FIG. 47 is omitted, and the present history-based motion vector predictor candidate derivation processing procedure ends. When the current number of motion vector predictor candidates numCurrMvpCand is smaller than 2, which is the maximum number of elements of the motion vector predictor list mvpListLX (step S2603 of FIG. 47: YES), the processing from step S2604 of FIG. 47 is performed.

Subsequently, the processing of steps S2605 to S2607 is performed with respect to an index Y which is 0 and 1 (L0 and L)(steps S2604 to S2608 of FIG. 47). When the current number of motion vector predictor candidates numCurrMvpCand is larger than or equal to 2, which is the maximum number of elements of the motion vector predictor list mvpListLX (step S2605 of FIG. 47: NO), the processing of steps S2606 to S2609 of FIG. 47 is omitted, and the present history-based motion vector predictor candidate derivation processing procedure ends. When the current number of motion vector predictor candidates numCurrMvpCand is smaller than 2, which is the maximum number of elements of the motion vector predictor list mvpListLX (step S2605 of FIG. 47: YES), the processing from step S2606 of FIG. 47 is performed.

Subsequently, when an element of a reference index of LY in the history-based motion vector predictor candidate list HmvpCandList[i] is an element of a reference index which is the same as a reference index refIdxLX of a coding/decoding target motion vector (step S2606 of FIG. 47: YES), a motion vector of LY of the history-based motion vector predictor candidate HmvpCandList[i] is added to a numCurrMvpCand$^{th}$ element mvpListLX[numCurrMvpCand] when counted from 0 of the motion vector predictor candidate list (step S2607 in FIG. 47), and the current number of motion vector predictor candidates numCurrMvpCand is incremented by 1. When the element of the reference index of LY in the history-based motion vector predictor candidate list HmvpCandList[i] is not an element of a reference index which is the same as the reference index refIdxLX of the coding/decoding target motion vector (step S2606 of FIG. 47: NO), an addition process of step S2607 is skipped.

The above processing of steps S2605 to S2607 of FIG. 47 is performed at both L0 and L1 (steps S2604 to S2608 of FIG. 47).

When the index i is incremented by 1 (steps S2602 and S2609 of FIG. 47) and the index i is smaller than or equal to a value obtained by subtracting 1 from a smaller value of 4 and the number of history-based motion vector predictor candidates NumHmvpCand, the processing from step S2603 is performed again (steps S2602 to S2609 of FIG. 47).

It is possible to omit a process of checking and removing an identical candidate and a variable setting or comparison process for executing the process, and to reduce an amount of processing by preventing an identical candidate removal process from being performed in a process of performing addition from the history-based motion vector predictor candidate list to the motion vector predictor candidate list by performing the history-based motion vector predictor candidate derivation process as described above.

Also, it is possible to add various types of motion information to the motion vector predictor candidate list by enabling motion information, which is a history-based motion vector predictor candidate stored in HmvpCandList, to be referred to in order from oldest motion information to newly added motion information.

Furthermore, even if an identical candidate removal process is not performed with respect to the history-based motion vector predictor candidate list in a process of performing addition from the history-based motion vector predictor candidate list to the motion vector predictor candidate list, it is possible to reduce a probability that an identical candidate will be added to the motion vector predictor candidate list by referring to motion information in order from oldest motion information to newly added motion information.

Modified Example (Part 1)

In the second embodiment, a case of a configuration has been described in which an identical candidate removal process is not performed using the history-based motion vector predictor candidate list HmvpCandList with reference from the beginning in reverse order, which is the reverse of storage order in which information is newly added from the end when the motion vector predictor candidate list mvpListLX is derived.

In the modified example of the second embodiment, as shown below, a configuration is adopted in which an identical candidate removal process is performed as it is so that reference from oldest motion information to newly added motion information is performed by referring to motion information from the beginning in reverse order, which is the reverse of storage order in which motion information is newly added from the end only with respect to reference order of the history-based motion vector predictor candidate list HmvpCandList.

Figure 48:
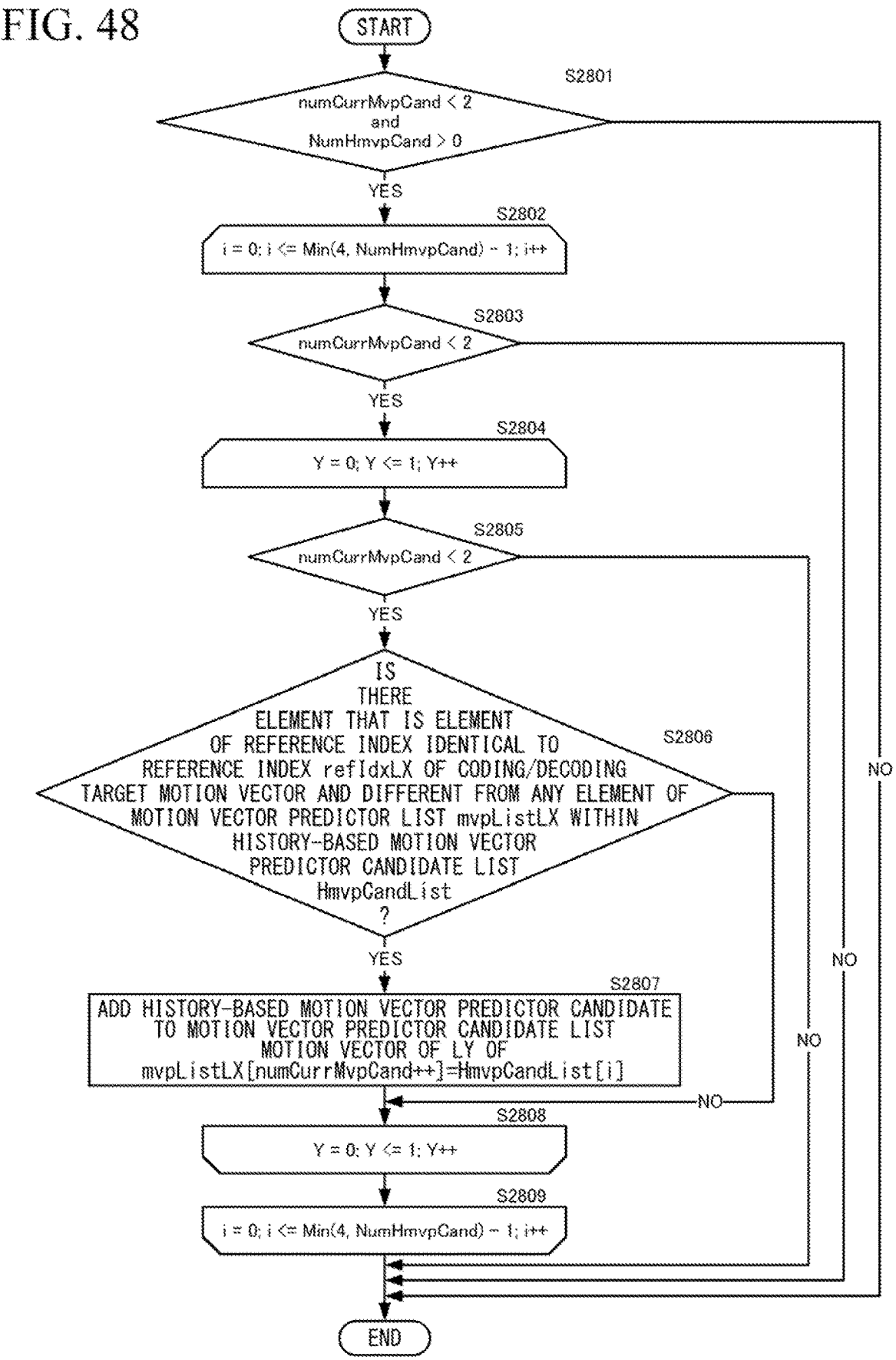
FIG. 48 is a flowchart for describing a history-based motion vector predictor candidate derivation processing procedure in the case of a configuration in which an identical candidate removal process is performed using a history-based motion vector predictor candidate list with reference in reverse order, which is the reverse of storage order.

FIG. 48 is a flowchart for describing a history-based motion vector predictor candidate derivation processing procedure in the case of a configuration in which an identical candidate removal process is not performed using a history-based motion vector predictor candidate list HmvpCandList with reference in reverse order, which is the reverse of storage order.

When the current number of motion vector predictor candidates numCurrMvpCand is larger than or equal to the maximum number of elements (here, 2) in the motion vector predictor list mvpListLX or a value of the number of history-based motion vector predictor candidates NumHmvpCand is 0 (step S2801 of FIG. 48: NO), the processing of steps S2802 to S2809 of FIG. 48 is omitted, and the history-based motion vector predictor candidate derivation processing procedure ends. When the current number of motion vector predictor candidates numCurrMvpCand is smaller than 2, which is the maximum number of elements of the motion vector predictor list mvpListLX (step S2801 of FIG. 48: YES), the processing of steps S2802 to S2809 of FIG. 48 is performed.

Subsequently, the processing of steps S2803 to S2808 of FIG. 48 is iterated until the index i changes from 0 to a value obtained by subtracting 1 from a smaller value of between 4 and the number of history-based motion vector predictor candidates NumHmvpCand (steps S2802 to S2809 of FIG. 48). When the current number of motion vector predictor candidates numCurrMvpCand is larger than or equal to 2, which is the maximum number of elements of the motion vector predictor list mvpListLX (step S2803 of FIG. 48: NO), the processing of steps S2804 to S2809 of FIG. 48 is omitted, and the present history-based motion vector predictor candidate derivation processing procedure ends.

When the current number of motion vector predictor candidates numCurrMvpCand is smaller than 2, which is the maximum number of elements of the motion vector predictor list mvpListLX (step S2803 of FIG. 48: YES), the processing from step S2804 of FIG. 48 is performed.

Subsequently, the processing of steps S2805 to S2807 is performed with respect to an index Y which is 0 and 1 (L0 and L1)(steps S2804 to S2808 of FIG. 48). When the current number of motion vector predictor candidates numCurrMvpCand is larger than or equal to 2, which is the maximum number of elements of the motion vector predictor list mvpListLX (step S2805 of FIG. 48: NO), the processing of steps S2806 to S2809 of FIG. 48 is omitted, and the present history-based motion vector predictor candidate derivation processing procedure ends. When the current number of motion vector predictor candidates numCurrMvpCand is smaller than 2, which is the maximum number of elements of the motion vector predictor list mvpListLX (step S2805 of FIG. 48: YES), the processing from step S2806 of FIG. 48 is performed.

Subsequently, when an element of a reference index of LY of the history-based motion vector predictor candidate list HmvpCandList[i] is an element that has a reference index identical to a reference index refIdxLX of a coding/decoding target motion vector and that is different from any element of the motion vector predictor index mvpListLX (step S2806 of FIG. 48: YES), a motion vector of LY of the history-based motion vector predictor candidate HmvpCandList[i] is added to a numCurrMvpCand$^{th}$ element mvpListLX[numCurrMvpCand] when counted from 0 of the motion vector predictor candidate list (step S2807 of FIG. 48), and the current number of motion vector predictor candidates numCurrMvpCand is incremented by 1. When the element of the reference index of LY of the history-based motion vector predictor candidate list HmvpCandList[i] is not an element that has a reference index identical to the reference index refIdxLX of the coding/decoding target motion vector and that is different from any element of the motion vector predictor index mvpListLX (step S2806 of FIG. 48: NO), an addition process of step S2807 is skipped.

The above processing of steps S2805 to S2807 of FIG. 48 are performed at both L0 and L1 (steps S2804 to S2808 of FIG. 48).

When the index i is incremented by 1 and the index i is smaller than or equal to a value obtained by subtracting 1 from a smaller value of 4 and the number of history-based motion vector predictor candidates NumHmvpCand, the processing from step S2803 is performed again (steps S2802 to S2809 of FIG. 48).

An identical candidate removal process is configured to be performed as it is by performing the history-based motion vector predictor candidate derivation process as described above, and the motion information which is the history-based motion vector predictor candidate stored in HmvpCandList is enabled to be referred to in order from oldest motion information to newly added motion information, so that it is possible to add more various types of motion information to the motion vector predictor candidate list.

Modified Example (Part 2)

As a modified example of the second embodiment, when the motion vector predictor candidate list mvpListLX is derived, a processing procedure of shifting and adding an element of the history-based motion vector predictor candidate list HmvpCandList in step S2406 of FIG. 38 is configured as shown in FIG. 39. Because the description of FIG. 39 is similar to the above description, the description of FIG. 39 will be omitted.

By performing the process as shown in FIG. 39, it is possible to omit a process of checking and removing an identical candidate and a variable setting or comparison process for executing the process, and to reduce an amount of processing.

Modified Example (Part 3)

In the second embodiment, a case of a configuration has been described in which an identical candidate removal process is not performed, the history-based motion vector predictor candidate list HmvpCandList is used with reference in reverse order, which is the reverse of storage order in which new motion information is added from the end side when the motion vector predictor candidate list mvpListLX is derived, and motion information is used, which is a history-based motion vector predictor candidate stored in HmvpCandList with reference in order from oldest motion information to newly added motion information. In the modified example of the second embodiment, a configuration is adopted in which a forward mode, in which reference from newly added motion information to old motion information is performed in a direction in which the reference order is the same as the storage order in which motion information is added from the end, and a reverse mode, in which reference from oldest motion information to newly added motion information is performed in a direction in which the reference order is the reverse of the storage order in which new motion information is added from the end side, are provided, and the mode is switched between the forward mode and the reverse mode using history reference flag information for switching the reference order of the history-based motion vector predictor candidate list HmvpCandList. A history reference flag of the history reference flag information is included in a syntax element of a bitstream and transmitted to the decoding side, and the decoding side is configured to be able to acquire and decode the bitstream including the history reference flag in the syntax element.

Third Embodiment

As a third embodiment, the following configuration is adopted when a merging candidate list is derived. In particular, reference order when a history-based motion vector predictor candidate list is used is changed so that the history-based motion vector predictor candidate list is used with reference in order from oldest motion information to newly added motion information. Also, when a new element is added to a merging candidate list, a change is made so that a process of retrieving an element having the same information from the history-based motion vector predictor candidate list and removing the element is not performed. Further, in the normal merge mode, when a normal merging candidate is derived using a history-based motion vector predictor candidate list HmvpCandList, a change is made so that a process of retrieving an element having the same information from the history-based motion vector predictor candidate list and preventing the element having the same information from being set as a normal merging candidate is not performed.

<History-Based Merging Candidate Derivation Process that does not Involve Identical Candidate Removal Process>

Here, the history-based merging candidate derivation process that does not involve the same candidate removal process will be described.

Figure 40:
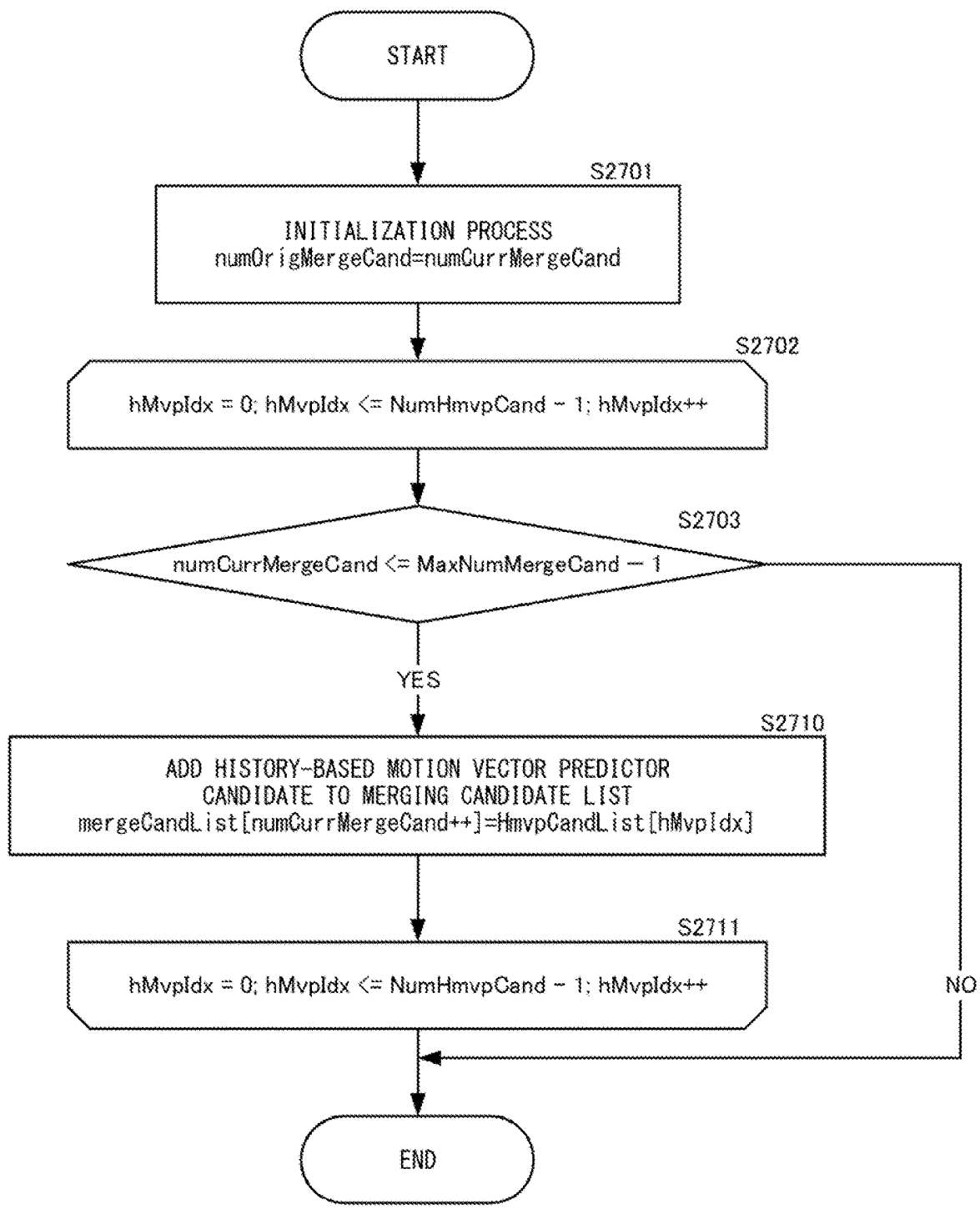
FIG. 40 is a flowchart for describing a history-based merging candidate derivation processing procedure in the case of a configuration in which an identical candidate removal process is not performed, and a history-based motion vector predictor candidate list is used with reference to motion information in order from oldest motion information to newly added motion information.

FIG. 40 is a flowchart for describing a history-based merging candidate derivation processing procedure in the case of a configuration in which an identical candidate removal process is not performed using a history-based motion vector predictor candidate list HmvpCandList with reference to motion information in order from oldest motion information to newly added motion information.

First, an initialization process is performed (step S2701 of FIG. 40). The number of elements numCurrMergeCand registered in the current merging candidate list is set as a variable numOrigMergeCand.

An initial value of an index hMvpIdx is set to 0, and an addition process of steps S2703 to S2710 of FIG. 40 is iterated from this initial value to NuMHmvpCand−1 (steps S2702 to S2711 of FIG. 40). When the number of elements registered in the current merging candidate list numCurrMergeCand is not smaller than or equal to (the maximum number of merging candidates MaxNumMergeCand−1), merging candidates are added to all elements in the merging candidate list, so that the present history-based merging candidate derivation process ends (step S2703 of FIG. 40: NO). When the number of elements numCurrMergeCand registered in the current merging candidate list is smaller than or equal to (the maximum number of merging candidates MaxNumMergeCand−1), the processing from step S2710 is performed (step S2703 of FIG. 40: YES). A hMvpIdx$^{th}$ element HmvpCandList[hMvpIdx] of the history-based motion vector predictor candidate list is added to a numCurrMergeCand$^{th}$ element mergeCandList[numCurrMergeCand] of the merging candidate list, and numCurrMergeCand is incremented by 1 (step S2710 of FIG. 40). The index hMvpIdx is incremented by 1 (step S2702 of FIG. 40), and the iterative processing of steps S2702 to S2711 of FIG. 40 is performed.

When the confirmation of all the elements of the history-based motion vector predictor candidate list is completed or the merging candidates are added to all the elements of the merging candidate list, the present history-based merging candidate derivation process ends.

The identical candidate removal process is prevented from being performed in a process of performing addition from the history-based motion vector predictor candidate list to the merging candidate list by performing the history-based merging candidate derivation process as described above, so that it is possible to omit a process of checking and removing an identical candidate and a variable setting or comparison process for executing the process, and to reduce an amount of processing.

Also, it is possible to add various types of motion information to the merging candidate list by enabling motion information, which is a history-based motion vector predictor candidate stored in HmvpCandList, to be referred to in order from oldest motion information to newly added motion information.

Furthermore, even if an identical candidate removal process is not performed with respect to the history-based motion vector predictor candidate list in a process of performing addition from the history-based motion vector predictor candidate list to the merging candidate list, it is possible to reduce a probability that an identical candidate will be added to the merging candidate list by referring to motion information in order from oldest motion information to newly added motion information.

Modified Example (Part 1)

As a modified example of the third embodiment, a configuration is adopted in which an identical candidate removal process is not performed when an element is added to the history-based motion vector predictor candidate list HmvpCandList as shown in FIG. 38 when a merging candidate list is derived. Because the description of FIG. 38 is similar to the above description, the description of FIG. 38 will be omitted.

By performing the process as shown in FIG. 38, it is possible to omit a process of checking and removing an identical candidate and a variable setting or comparison process for executing the process, and to reduce an amount of processing.

Also, even if an identical candidate removal process is not performed with respect to the history-based motion vector predictor candidate list when an element is added to the history-based motion vector predictor candidate list HmvpCandList, it is possible to reduce a probability that an identical candidate will be added to the merging candidate list by enabling motion information to be referred to in order from the oldest motion information to newly added motion information.

Modified Example (Part 2)

As a modified example of the third embodiment, a processing procedure of shifting and adding an element of the history-based motion vector predictor candidate list HmvpCandList of step S2406 of FIG. 38 when a merging candidate list is derived is configured as shown in FIG. 39. Because the description of FIG. 39 is similar to the above description, the description of FIG. 39 will be omitted.

By performing the process as shown in FIG. 39, it is possible to omit a process of checking and removing an identical candidate and a variable setting or comparison process for executing the process, and to reduce an amount of processing.

Modified Example (Part 3)

In the third embodiment, a case of a configuration has been described in which an identical candidate removal process is not performed using motion information, which is a history-based motion vector predictor candidate stored in HmvpCandList, with reference to motion information in order from oldest motion information to newly added motion information when the merging candidate list is derived.

In the modified example of the third embodiment, a configuration is adopted in which a forward mode, in which reference from newly added motion information to old motion information is performed, and a reverse mode, in which reference from oldest motion information to newly added motion information is performed, are provided, and the mode is switched between the forward mode and the reverse mode using history reference flag information for switching the reference order of the history-based motion vector predictor candidate list HmvpCandList. A history reference flag of the history reference flag information is included in a syntax element of a bitstream and transmitted to the decoding side, and the decoding side is configured to be able to acquire and decode the bitstream including the history reference flag in the syntax element.

Two or more of all the embodiments described above may be combined.

In all the embodiments described above, a bitstream output by the picture coding device has a specific data format so that the bitstream can be decoded in accordance with the coding method used in the embodiment. Also, a picture decoding device corresponding to the picture coding device can decode the bitstream of the specific data format.

When a wired or wireless network is used to exchange a bitstream between the picture coding device and the picture decoding device, the bitstream may be converted into a data format suitable for a transmission form of a communication path and may be transmitted. In this case, a transmission device for converting the bitstream output from the picture coding device into coded data of a data format suitable for the transmission form of the communication path and transmitting the coded data to the network and a reception device for receiving the coded data from the network, restoring the coded data to the bitstream, and supplying the bitstream to the picture decoding device are provided. The transmission device includes a memory that buffers the bitstream output by the picture coding device, a packet processing unit that packetizes the bitstream, and a transmission unit that transmits packetized coded data via the network. The reception device includes a reception unit that receives the packetized coded data via the network, a memory that buffers the received coded data, and a packet processing unit that generates a bitstream by performing packet processing on the coded data and supplies the bitstream to the picture decoding device.

Also, a display device may be provided by adding a display unit that displays a picture decoded by the picture decoding device to the configuration. In this case, the display unit reads a decoded picture signal generated by the decoding picture signal superimposition unit 207 and stored in the decoded picture memory 208 and displays the decoded picture signal on a screen.

Also, an imaging device may be provided by adding an imaging unit that inputs a captured picture to the picture coding device to the configuration. In this case, the imaging unit inputs a captured picture signal to the block split unit 101.

Figure 37:
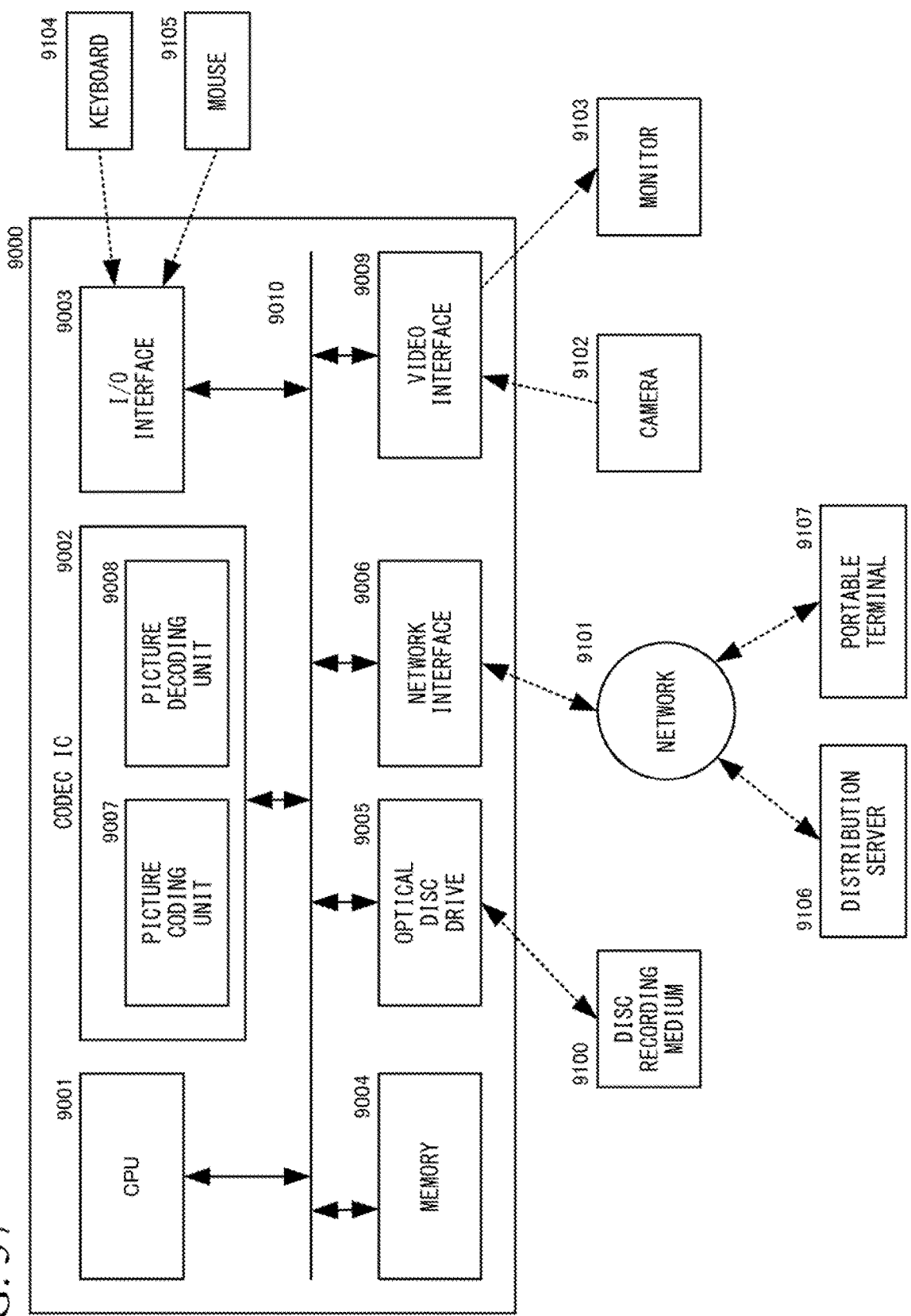
FIG. 37 is an explanatory diagram showing an example of a hardware configuration of a coding/decoding device according to an embodiment of the present invention.

FIG. 37 shows an example of a hardware configuration of the coding/decoding device according to the present embodiment. The coding/decoding device includes the configuration of the picture coding device and the picture decoding device according to the embodiment of the present invention. A related coding/decoding device 9000 includes a CPU 9001, a codec IC 9002, an I/O interface 9003, a memory 904, an optical disc drive 9005, a network interface 9006, and a video interface 9009, and the respective parts are connected by a bus 9010.

A picture coding unit 9007 and a picture decoding unit 9008 are typically implemented as the codec IC 9002. A picture coding process of the picture coding device according to the embodiment of the present invention is executed by the picture coding unit 9007, and a picture decoding process in the picture decoding device according to the embodiment of the present invention is performed by the picture decoding unit 9008. The I/O interface 9003 is implemented by, for example, a USB interface, and is connected to an external keyboard 9104, a mouse 9105, and the like. The CPU 9001 controls the coding/decoding device 9000 so that a user-desired operation is executed on the basis of a user operation input via the I/O interface 9003. User operations using the keyboard 9104, the mouse 9105, and the like include the selection of a coding or decoding function to be executed, setting of coding quality, designation of an input/output destination of a bitstream, designation of an input/output destination of a picture, and the like.

When the user desires an operation of reproducing a picture recorded on a disc recording medium 9100, the optical disc drive 9005 reads a bitstream from the disc recording medium 91 that has been inserted and transmits the read bitstream to the picture decoding unit 9008 of the codec IC 9002 via the bus 9010. The picture decoding unit 9008 executes a picture decoding process on the input bitstream in the picture decoding device according to the embodiment of the present invention and transmits a decoded picture to an external monitor 9103 via the video interface 9009. The coding/decoding device 9000 includes a network interface 9006 and can be connected to an external distribution server 9106 and a portable terminal 9107 via a network 9101. When the user desires to reproduce the picture recorded on the distribution server 9106 or the portable terminal 9107 instead of the picture recorded on the disc recording medium 9100, the network interface 9006 acquires a bitstream from the network 9101 instead of reading the bitstream from the input disc recording medium 9100. When the user desires to reproduce the picture recorded in the memory 9004, the picture decoding process in the picture decoding device according to the embodiment of the present invention is executed on the bitstream recorded in the memory 9004.

When the user desires to perform an operation of coding a picture captured by the external camera 9102 and recording the coded picture in the memory 9004, the video interface 9009 inputs the picture from the camera 9102 and transmits the picture to the picture coding unit 9007 of the codec IC 9002 via the bus 9010. The picture coding unit 9007 executes a picture coding process on a picture input via the video interface 9009 in the picture coding device according to the embodiment of the present invention to create a bitstream. Then, the bitstream is transmitted to the memory 9004 via the bus 9010. When the user desires to record a bitstream on the disc recording medium 9100 instead of the memory 9004, the optical disc drive 9005 writes the bitstream to the disc recording medium 9100 which has been inserted.

It is also possible to implement a hardware configuration that includes a picture coding device without including a picture decoding device or a hardware configuration that includes a picture decoding device without including a picture coding device. Such a hardware configuration is implemented, for example, by replacing the codec IC 9002 with the picture coding unit 9007 or the picture decoding unit 9008.

The above processes related to coding and decoding may be implemented as a transmission, storage, and reception device using hardware and may be implemented by firmware stored in a read only memory (ROM), a flash memory, or the like, or software of a computer or the like. A firmware program and a software program thereof may be provided by recording the programs on a recording medium capable of being read by a computer or the like, or may be provided from a server through a wired or wireless network, or may be provided as data broadcasts of terrestrial or satellite digital broadcasting.

The present invention has been described above on the basis of the embodiments. The embodiments are examples and it will be understood by those skilled in the art that various modifications are possible in combinations of the respective components and processing processes and such modifications are within the scope of the present invention.

REFERENCE SIGNS LIST

- 100 Picture coding device
- 101 Block split unit
- 102 Inter prediction unit
- 103 Intra prediction unit
- 104 Decoded picture memory
- 105 Prediction method determination unit
- 106 Residual generation unit
- 107 Orthogonal transform/quantization unit
- 108 Bit strings coding unit
- 109 Inverse quantization/inverse orthogonal transform unit
- 110 Decoding picture signal superimposition unit
- 111 Coding information storage memory
- 200 Picture decoding device
- 201 Bit strings decoding unit
- 202 Block split unit
- 203 Inter prediction unit
- 204 Intra prediction unit
- 205 Coding information storage memory
- 206 Inverse quantization/inverse orthogonal transform unit
- 207 Decoding picture signal superimposition unit
- 208 Decoded picture memory

DRAWINGS

[FIG. 38]
開始 START
S2401 INITIALIZE HISTORY-BASED MOTION VECTOR PREDICTOR CANDIDATE LIST HmvpCandLis NumHmvpCand=0
S2402 0, . . . , NUMBER OF CODING BLOCKS WITHIN SLICE
S2404 IS THERE INTER PREDICTION INFORMATION CANDIDATE hMvpCad TO BE REGISTERED?
S2406 SHIFT ELEMENT OF HISTORY-BASED MOTION VECTOR PREDICTOR CANDIDATE LIST HmvpCmdList
ADD INTER PREDICTION INFORMATION CANDIDATE hMvpCad TO HISTORY-BASED MOTION VECTOR PREDICTOR CANDIDATE LIST HmvpCandList
HmvpCandList[tempIdx]=hMvpCand
S2407 0, . . . . NUMBER OF CODING BLOCKS WITHIN SLICE
終了 END
[FIG. 39]
開始 START
S2545 ADD INTER PREDICTION INFORMATION CANDIDATE hMvpCand TO HISTORY-BASED MOTION VECTOR PREDICTOR CANDIDATE LIST HmvpCandList
HmvpCandList[NumHmvpCand−1]=hMvpCand
S2546 ADD INTER PREDICTION INFORMATION CANDIDATE hMvpCand TO HISTORY-BASED MOTION VECTOR PREDICTOR CANDIDATE LIST HmvpCandList
HmvpCandList[NumHmvpCand++]=hMvpCand
終了 END
[FIG. 40]
開始 START
S2701 INITIALIZATION PROCESS
numOrigMerpCand=numCurrMargeCand
S2710 ADD HISTORY-BASED MOTION VECTOR PREDICTOR CANDIDATE TO MERGING CANDIDATE LIST
mergeCandList[numCurrMergeCand++]=HmvpCandList[hMvpIdx]
終了 END
[FIG. 41]
先頭 BEGINNING
末尾 END
位置 POSITION
要素 ELEMENT
納格順 STORAGE ORDER
[FIG. 42]
先頭 BEGINNING
末尾 END
位置 POSITION
要素 ELEMENT
格格順 STORAGE ORDER
[FIG. 43]
先頭 BEGINNING
末尾 END
位置 POSITION
要素 ELEMENT
格格順 STORAGE ORDER
[FIG. 44]
先頭 BEGINNING
末尾 END
位置 POSITION
要素 ELEMENT
格納順 STORAGE ORDER
[FIG. 45]
先頭 BEGINNING
末尾 END
位置 POSITION
要素 ELEMENT
格納順 STORAGE ORDER
参照順 REFERENCE ORDER
[FIG. 46]
先頭 BEGINNING
末尾 END
位置 POSITION
要素 ELEMENT
格納順 STORAGE ORDER
参照順 REFERENCE ORDER
[FIG. 47]
開始 START
S2606 IS REFERENCE INDEX OF LY IN THE HISTORY-BASED MOTION VECTOR PREDICTOR CANDIDATE LIST HmvpCandList[i] IDENTICAL TO REFERENCE INDEX refIdxLX OF CODING/DECODING TARGET MOTION VECTOR?
S2607 ADD HISTORY-BASED MOTION VECTOR PREDICTOR CANDIDATE TO MOTION VECTOR PREDICTOR CANDIDATE UST
MOTION VECTOR OF LY OF
mvpListLX[numCurrMvpCand++]=HmvpCandList[i]
終了 END
[FIG. 48]
開始 START
S206 IS THERE ELEMENT THAT IS ELEMENT OF REFERENCE INDEX IDENTICAL TO REFERENCE INDEX refIdxLX OF CODING/DECODING TARGET MOTION VECTOR AND DIFFERENT FROM ANY ELEMENT OF MOTION VECTOR PREDICTOR LIST mvpListLX WITHIN HISTORY-BASED MOTION VECTOR PREDICTOR CANDIDATE LIST HmvpCandList?

S2807 ADD HISTORY-BASED MOTION VECTOR PREDICTOR CANDIDATE TO MOTION VECTOR PREDICTOR CANDIDATE LIST
MOTION VECTOR OF LY OF
mvpListLX[numCurrMvpCand++]=HmvpCandList[i]
※「 END

The invention claimed is:

1. A moving-picture coding device comprising:
a spatial motion information candidate derivation unit configured to add a spatial motion information candidate to a motion information candidate list, the spatial motion information candidate derived from motion information of a block neighboring a coding target block in a space domain; and
a history-based motion information candidate derivation unit configured to add a history-based motion information candidate registered in a history-based motion information candidate list to the motion information candidate list,
wherein the history-based motion information candidate derivation unit adds the history-based motion information candidate to the motion information candidate list in order from oldest motion information to newly added motion information among the motion information registered in the history-based motion information candidate list without making a comparison of the motion information with the spatial motion information candidate.

2. A moving-picture coding method comprising:
a first process of adding a spatial motion information candidate to a motion information candidate list, the spatial motion information candidate derived from motion information of a block neighboring a coding target block in a space domain; and
a second process of adding a history-based motion information candidate registered in a history-based motion information candidate list to the motion information candidate list,
wherein the second process includes adding the history-based motion information candidate to the motion information candidate list in order from oldest motion information to newly added motion information among the motion information registered in the history-based motion information candidate list without making a comparison of the motion information with the spatial motion information candidate.

3. A non-transitory computer-readable medium having stored thereon instructions that, when executed by at least one processor, cause the at least one processor to perform moving-picture coding, the moving-picture coding comprising:
a spatial motion information candidate derivation unit configured to add a spatial motion information candidate to a motion information candidate list, the spatial motion information candidate derived from motion information of a block neighboring a coding target block of a space domain; and
a history-based motion information candidate derivation unit configured to add a history-based motion information candidate registered in a history-based motion information candidate list to the motion information candidate list,
wherein the history-based motion information candidate derivation unit adds the history-based motion information candidate to the motion information candidate list in order from oldest motion information to newly added motion information among the motion information registered in the history-based motion information candidate list without making a comparison of the motion information with the spatial motion information candidate.

4. A moving-picture decoding device comprising:
a spatial motion information candidate derivation unit configured to add a spatial motion information candidate to a motion information candidate list, the spatial motion information candidate derived from motion information of a block neighboring a decoding target block in a space domain; and
a history-based motion information candidate derivation unit configured to add a history-based motion information candidate registered in a history-based motion information candidate list to the motion information candidate list,
wherein the history-based motion information candidate derivation unit adds the history-based motion information candidate to the motion information candidate list in order from oldest motion information to newly added motion information among the motion information registered in the history-based motion information candidate list without making a comparison of the motion information with the spatial motion information candidate.

5. A moving-picture decoding method comprising:
a first process of adding a spatial motion information candidate to a motion information candidate list, the spatial motion information candidate derived from motion information of a block neighboring a decoding target block in a space domain; and
a second process of adding a history-based motion information candidate registered in a history-based motion information candidate list to the motion information candidate list,
wherein the second process includes adding the history-based motion information candidate to the motion information candidate list in order from oldest motion information to newly added motion information among the motion information registered in the history-based motion information candidate list without making a comparison of the motion information with the spatial motion information candidate.

6. A non-transitory computer-readable medium having stored thereon instructions that, when executed by at least one processor, cause the at least one processor to perform moving-picture decoding program for causing a computer to operate as:
a spatial motion information candidate derivation unit configured to add a spatial motion information candidate to a motion information candidate list, the spatial motion information candidate derived from motion information of a block neighboring a decoding target block in a space domain; and
a history-based motion information candidate derivation unit configured to add a history-based motion information candidate registered in a history-based motion information candidate list to the motion information candidate list,
wherein the history-based motion information candidate derivation unit adds the history-based motion information candidate to the motion information candidate list in order from oldest motion information to newly added motion information among the motion information registered in the history-based motion information candidate list without making a comparison of the motion information with the spatial motion information candidate.

* * * * *